(12) United States Patent　　(10) Patent No.:　　US 8,176,143 B2
Maruyama　　　　　　　　　　　　(45) Date of Patent:　　May 8, 2012

(54) WEB SERVICE PROVIDING APPARATUS

(75) Inventor: Teruyuki Maruyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1488 days.

(21) Appl. No.: 10/665,347

(22) Filed: Sep. 22, 2003

(65) Prior Publication Data

US 2004/0128349 A1　　Jul. 1, 2004

(30) Foreign Application Priority Data

| Sep. 20, 2002 | (JP) | 2002-275976 |
| Sep. 20, 2002 | (JP) | 2002-275978 |
| Sep. 20, 2002 | (JP) | 2002-275985 |
| Sep. 19, 2003 | (JP) | 2003-327268 |
| Sep. 19, 2003 | (JP) | 2003-327269 |
| Sep. 19, 2003 | (JP) | 2003-327270 |

(51) Int. Cl.
 *G06F 15/16* (2006.01)
(52) U.S. Cl. ........ 709/218; 709/217; 709/219; 709/223; 709/224; 358/1.15; 358/1.18
(58) Field of Classification Search .................. 709/223, 709/217–219, 224; 358/1.15, 1.18
See application file for complete search history.

(56) References Cited

U.S. PATENT DOCUMENTS

| 5,793,966 | A | * | 8/1998 | Amstein et al. ............... 709/203 |
| 6,052,763 | A | | 4/2000 | Maruyama |
| 6,119,176 | A | | 9/2000 | Maruyama |
| 6,298,397 | B1 | | 10/2001 | Maruyama |
| 6,317,786 | B1 | * | 11/2001 | Yamane et al. ............... 709/224 |
| 6,687,829 | B1 | | 2/2004 | Miyamoto et al. |
| 6,778,289 | B1 | * | 8/2004 | Iwata ............................ 358/1.15 |
| 6,831,754 | B1 | * | 12/2004 | Delaney ....................... 358/1.15 |
| 7,167,258 | B2 | * | 1/2007 | Yamamoto ................... 358/1.15 |
| 7,471,407 | B2 | * | 12/2008 | Ferlitsch ...................... 358/1.15 |
| 2002/0118397 | A1 | | 8/2002 | Maruyama |
| 2003/0231345 | A1 | * | 12/2003 | Azami .......................... 358/1.18 |
| 2004/0133656 | A1 | * | 7/2004 | Butterworth et al. ......... 709/219 |

FOREIGN PATENT DOCUMENTS

JP　　05-274424　　10/1993

(Continued)

OTHER PUBLICATIONS

U.S. Appl. No. 10/792,540, filed Mar. 4, 2004, Nakamura et al.

(Continued)

*Primary Examiner* — Yves Dalencourt
*Assistant Examiner* — Michael C Lai
(74) *Attorney, Agent, or Firm* — Oblon, Spivak, McClelland, Maier & Neustadt, L.L.P.

(57) ABSTRACT

A Web service providing apparatus is disclosed for controlling a sequence of processes to cause a Web service providing apparatus to copy or print out a target document stored therein to another Web service providing apparatus in cooperation with the Web service providing apparatuses and a terminal connected to each other via a communication network. The Web service providing apparatus includes a server processing part controlling receipt of a process request from a connected requesting apparatus and transmission of a process response corresponding to the process request to the requesting apparatus in accordance with a predetermined protocol; a condition acquisition control part controlling acquisition of target information designated by the process request based on a first processable condition; and a service providing part performing the requested process and sending a result of the process to the server processing part.

8 Claims, 56 Drawing Sheets

FOREIGN PATENT DOCUMENTS

| | | |
|---|---|---|
| JP | 9-181893 | 7/1997 |
| JP | 10-326288 | 12/1998 |
| JP | 10-341327 | 12/1998 |
| JP | 11-225261 | 8/1999 |
| JP | 2000-6496 | 1/2000 |
| JP | 2000-332923 | 11/2000 |
| JP | 2001-256025 | 9/2001 |
| JP | 2001-257827 | 9/2001 |
| JP | 2002-123828 | 4/2002 |
| JP | 2002-223211 | 8/2002 |
| JP | 2002-244823 | 8/2002 |

OTHER PUBLICATIONS

U.S. Appl. No. 10/891,154, filed Jul. 15, 2004, Mihira et al.
U.S. Appl. No. 10/915,437, Aug. 11, 2004, Maruyama.
U.S. Appl. No. 10/936,585, filed Sep. 9, 2004, Araumi et al.

* cited by examiner

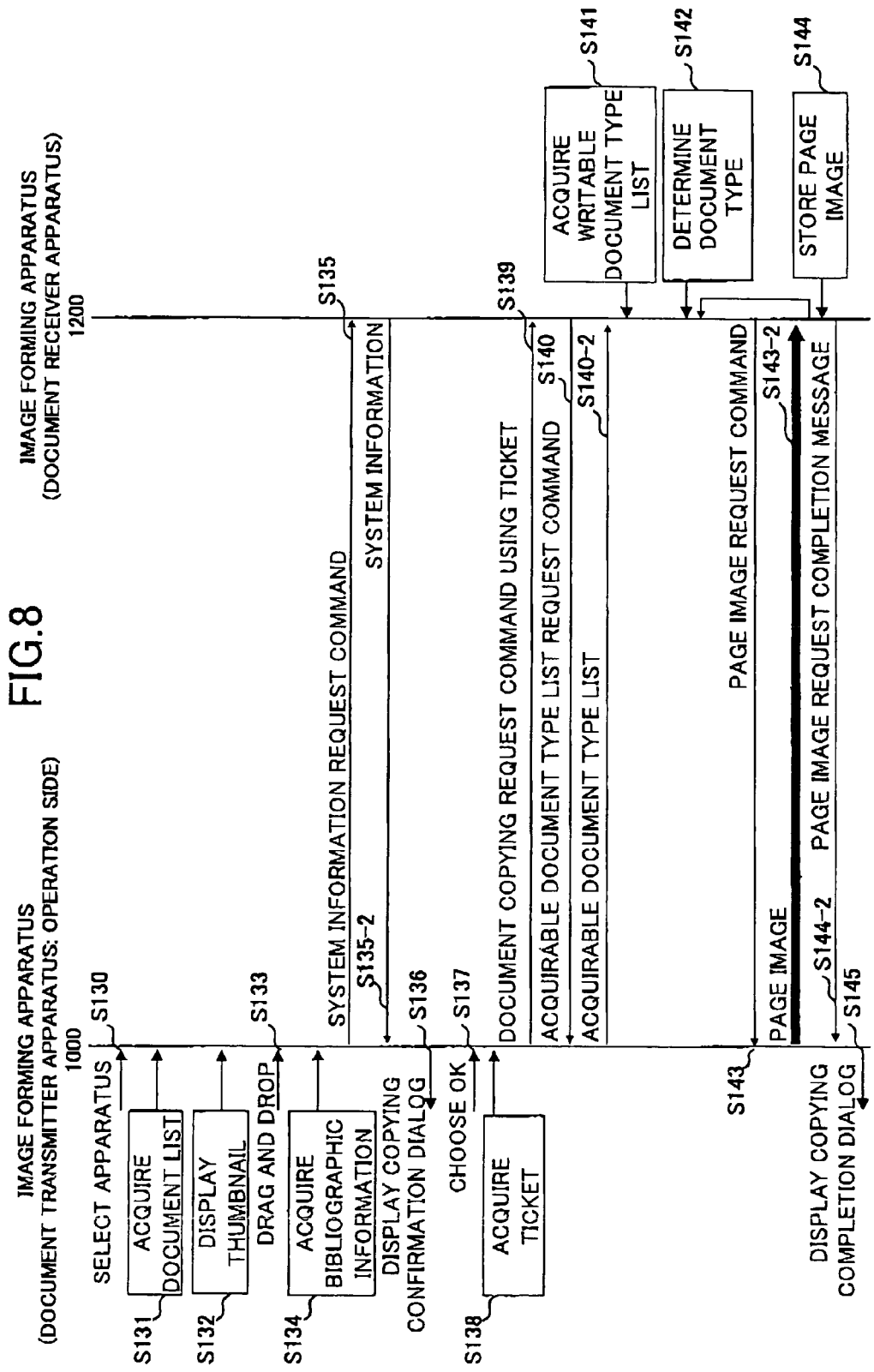

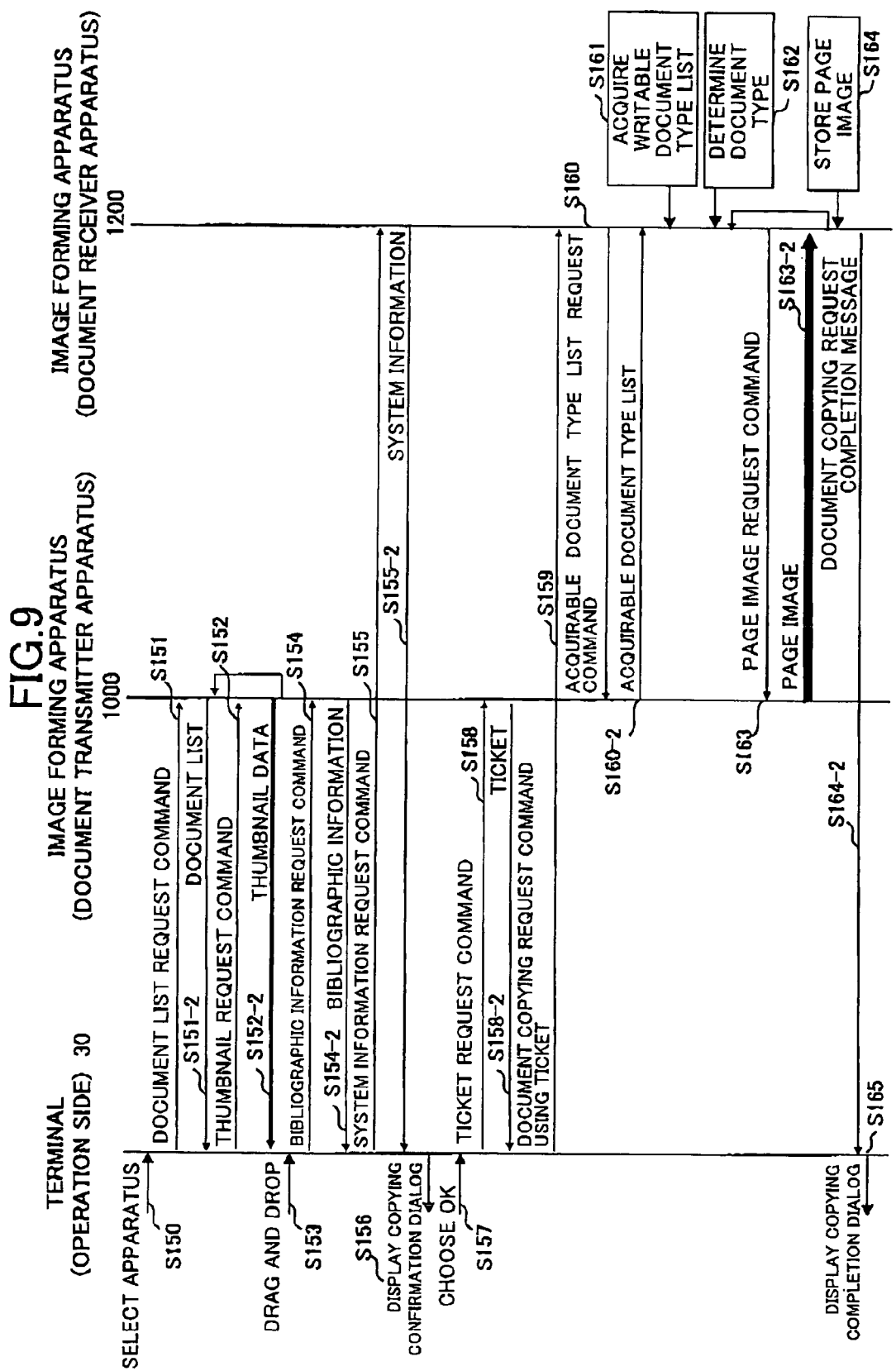

FIG.10

```
31
POST /netdoc HTTP/1.0
Content-Type: text/xml; charset=UTF-8
Content-Length: nnnn
SOAPAction: "http://foo.bar.com/netdoc/documentmanagement"  — 32

<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = http://schemas.xmlsoap.org/soap/encoding/
>
 <SOAP-ENV:Header/>
 <SOAP-ENV:Body>                           35
  <ns:documentmanagement>            36
   <ticketId>123</ticketId>
   <operation>getFileByTicket</operation>  — 37
  </ns:documentmanagement>
 </SOAP-ENV:Body>
</SOAP-ENV:Envelope>
```

33 SOAP HEADER

34 SOAP BODY

FIG.11

42
HTTP/1.0 200 OK
Content-Type: text/xml; charset=UTF-8
Content-Length: nnnn

<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>            } 43 SOAP HEADER
<SOAP-ENV:Body>   45
<ns:documentmanagementResponse>
<result>success</result>   46
</ns:documentmanagementResponse>
</SOAP-ENV:Body>
</SOAP-ENV:Envelope>   } 44 SOAP BODY

FIG.12

```
 31
{
POST /netdoc HTTP/1.0
Content-Type: text/xml; charset=UTF-8
Content-Length: nnnn
SOAPAction: "http://foo.bar.com/netdoc/documentmanagement"     32

<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = http://schemas.xmlsoap.org/soap/encoding/
>
<SOAP-ENV:Header/>
<SOAP-ENV:Body>
<ns:documentmanagement>      35
  <operation>getFileVariation</operation>      50
</ns:documentmanagement>
</SOAP-ENV:Body>
</SOAP-ENV:Envelope>
```

33 SOAP HEADER

34 SOAP BODY

FIG.13

```
HTTP/1.0 200 OK ―42
Content-Type: text/xml; charset=UTF-8
Content-Length: nnnn <SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>                                                                    ⎱ 43 SOAP HEADER
<SOAP-ENV:Body>
 <ns:documentmanagementResponse>
  <type>
   <format>Tiff</format>              ⎱
   <imageType>1bit/dot</imageType>    ⎰ 52
   <binary>600 x 600</binary>
  </type>
  <type>
   <format>Jpeg</format>              ⎱
   <imageType>8bit/dot</imageType>    ⎰ 53
   <binary>300 x 300</binary>
  </type>
  <type>
   <format>Jpeg2000</format>          ⎱
   <imageType>8bit/dot</imageType>    ⎰ 54
   <binary>600 x 600</binary>
  </type>
 </ns:documentmanagementResponse>
</SOAP-ENV:Body>                                                      ⎱ 44 SOAP BODY
</SOAP-ENV:Envelope>
```

FIG.14

```
POST /netdoc HTTP/1.0
Content-Type: text/xml; charset=UTF-8    } 31
Content-Length: nnnn
SOAPAction: "http://foo.bar.com/netdoc/documentmanagement"  ─── 32

<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = http://schemas.xmlsoap.org/soap/encoding/
>                                                                          } 33 SOAP HEADER
<SOAP-ENV:Header/>
<SOAP-ENV:Body>
<ns:documentmanagement>  ─── 35
  <type>
    <format>Jpeg</format>
    <imageType>8bit/dot</imageType>        } 59
    <binary>300 x 300</binary>
  </type>
  <operation>getFile(TicketID)</operation>  ─── 60
</ns:documentmanagement>
</SOAP-ENV:Body>                                                            } 34 SOAP BODY
</SOAP-ENV:Envelope>
```

FIG.15

```
HTTP/1.0 200 OK  —42
Content-Type: Multipart/Related; boundary=XX_boundary; type=text/xml;  —66
Content-Description: This is the optional message description.         —61

--XX_boundary  —66
Content-Type: text/xml; charset=UTF-8
Content-Length: nnnn

<?xml version='1.0' ?>
<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>
<SOAP-ENV:Body>
 <ns:documentmanagementResponse>
  <result>success</result>  —63
 </ns:documentmanagementResponse>
</SOAP-ENV:Body>
</SOAP-ENV:Envelope>

--XX_boundary  —66
Content-Type: image/tiff
Content-Transfer-Encoding: binary
Content-Length: mmmm           —65
······binary Tiff image······
--XX_boundary—  —66
```

- 62 TEXT DATA INFORMATION
- 43 SOAP HEADER
- 44 SOAP BODY
- 64 IMAGE DATA INFORMATION

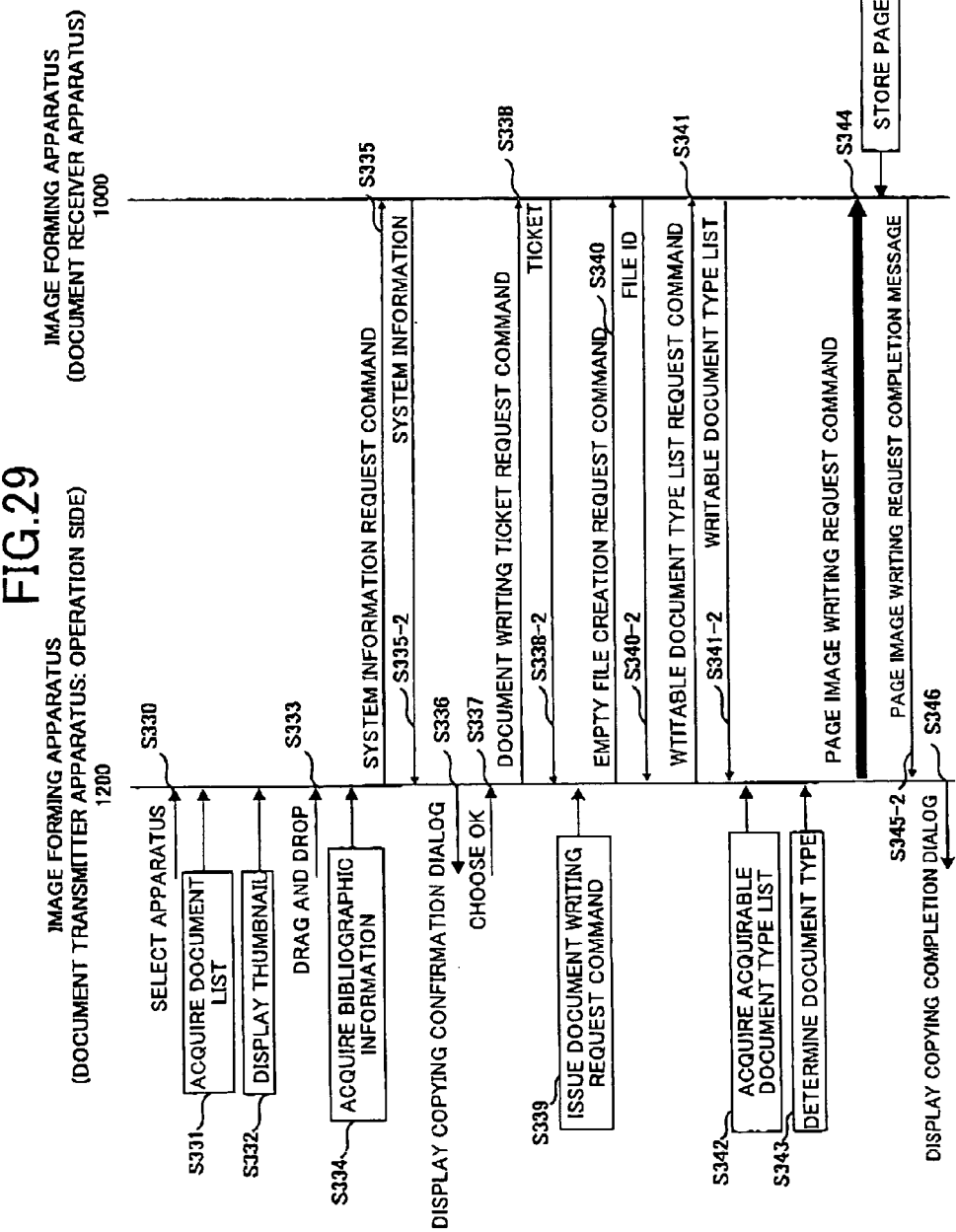

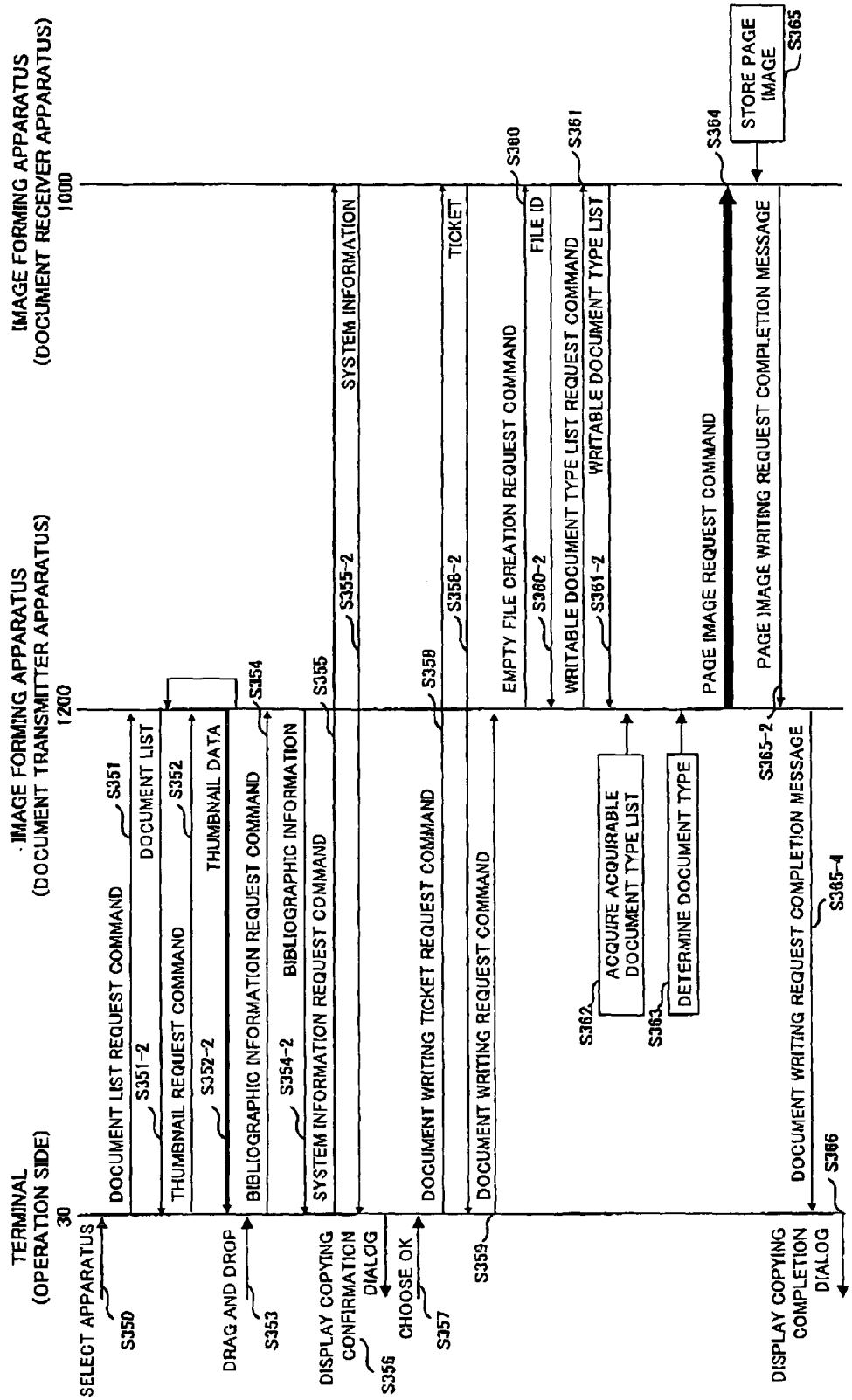

FIG.31

```
31
POST /netdoc HTTP/1.0
Content-Type: text/xml; charset=UTF-8
Content-Length: nnnn
SOAPAction: "http://foo.bar.com/netdoc/documentmanagement"  ~32

<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = http://schemas.xmlsoap.org/soap/encoding/
>                                                                        } 33 SOAP HEADER
<SOAP-ENV:Header/>
<SOAP-ENV:Body>
 <ns:documentmanagement> ~35
  <ticketId>456</ticketId> ~36
  <operation>insertFileByTicket</operation> ~37
 </ns:documentmanagement>
</SOAP-ENV:Body>                                                         } 34 SOAP BODY
</SOAP-ENV:Envelope>
```

FIG.32

```
HTTP/1.0 200 OK  ~42
Content-Type: text/xml; charset=UTF-8
Content-Length: nnnn <SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>                                                                        } 43 SOAP HEADER
<SOAP-ENV:Body>
 <ns:documentmanagementResponse>  ~45
  <result>success</result>  ~46
 </ns:documentmanagementResponse>
</SOAP-ENV:Body>                                                         } 44 SOAP BODY
</SOAP-ENV:Envelope>
```

FIG.33

```
┌ 31
POST /netdoc HTTP/1.0
Content-Type: text/xml; charset=UTF-8
Content-Length: nnnn
SOAPAction: "http://foo.bar.com/netdoc/documentmanagement" ─── 32

<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = http://schemas.xmlsoap.org/soap/encoding/
>
 <SOAP-ENV:Header/>
 <SOAP-ENV:Body>
  <ns:documentmanagement> ─── 35
   <operation>getFileVariation</operation> ─── 50
  </ns:documentmanagement>
 </SOAP-ENV:Body>
</SOAP-ENV:Envelope>
```

} 33 SOAP HEADER

} 34 SOAP BODY

FIG.34

```
HTTP/1.0 200 OK          ⎯⎯42
Content-Type: text/xml; charset=UTF-8
Content-Length: nnnn <SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>
 <SOAP-ENV:Body>                                              ⎫
  <ns:documentmanagementResponse>                             │
   <type>                              ⎫                     │
    <format>Tiff</format>               │                     │
    <imageType>1bit/dot</imageType>     ⎬ 52                  │
    <binary>600 x 600</binary>          │                     │
   </type>                              ⎭                     │
   <type>                              ⎫                     ⎬ 44 SOAP BODY
    <format>Jpeg</format>               │                     │
    <imageType>8bit/dot</imageType>     ⎬ 53                  │
    <binary>300 x 300</binary>          │                     │
   </type>                              ⎭                     │
   <type>                              ⎫                     │
    <format>Jpeg2000</format>           │                     │
    <imageType>8bit/dot</imageType>     ⎬ 54                  │
    <binary>600 x 600</binary>          │                     │
   </type>                              ⎭                     │
  </ns:documentmanagementResponse>                            │
 </SOAP-ENV:Body>                                             ⎭
</SOAP-ENV:Envelope>
```

43 SOAP HEADER

44 SOAP BODY

FIG.35

```
POST /netdoc HTTP/1.0                                                    ~31
Content-Type: Multipart/Related; boundary=XX_boundary; type=text/xml;  ~81
Content-Description: This is the optional message description.

--XX_boundary ~86
Content-Type: text/xml; charset=UTF-8   ⎫
Content-Length: nnnn                    ⎬ 82 TEXT DATA INFORMATION ~32
SOAPAction: "http://foo.bar.com/netdoc/documentmanagement"  ⎭

<SOAP-ENV:Envelope
  xmlns:SOAP-ENV = "http://schemas.xmlsoap.org/soap/envelope/"
  xmlns:ns = "http://foo.bar.com/netdoc/"
  SOAP-ENV:encodingStyle = http://schemas.xmlsoap.org/soap/encoding/  ⎤
>                                                                     ⎥
<SOAP-ENV:Header/>                                                    ⎬ 33 SOAP HEADER
<SOAP-ENV:Body>       ~35                                             ⎦
  <ns:documentmanagement>   ~80                                       ⎤
    <operation>putFile(FileID)</operation>                            ⎥
  </ns:documentmanagement>                                            ⎬ 34 SOAP BODY
</SOAP-ENV:Body>                                                      ⎥
</SOAP-ENV:Envelope>                                                  ⎦

--XX_boundary ~86
Content-Type: image/tiff                ⎤
Content-Transfer-Encoding: binary       ⎥
Content-Length: mmmm                    ⎬ 84 IMAGE DATA INFORMATION
......binary Tiff image...... ~85       ⎥
--XX_boundary ~86                       ⎦
```

FIG.36

```
HTTP/1.0 200 OK  ~42
Content-Type: text/xml; charset=UTF-8
Content-Length: nnnn <SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>                                                                        } 43 SOAP HEADER
<SOAP-ENV:Body>
 <ns:documentmanagementResponse>  ~87
  <result>success</result>  ~88
 </ns:documentmanagementResponse>
</SOAP-ENV:Body>                                                         } 44 SOAP BODY
</SOAP-ENV:Envelope>
```

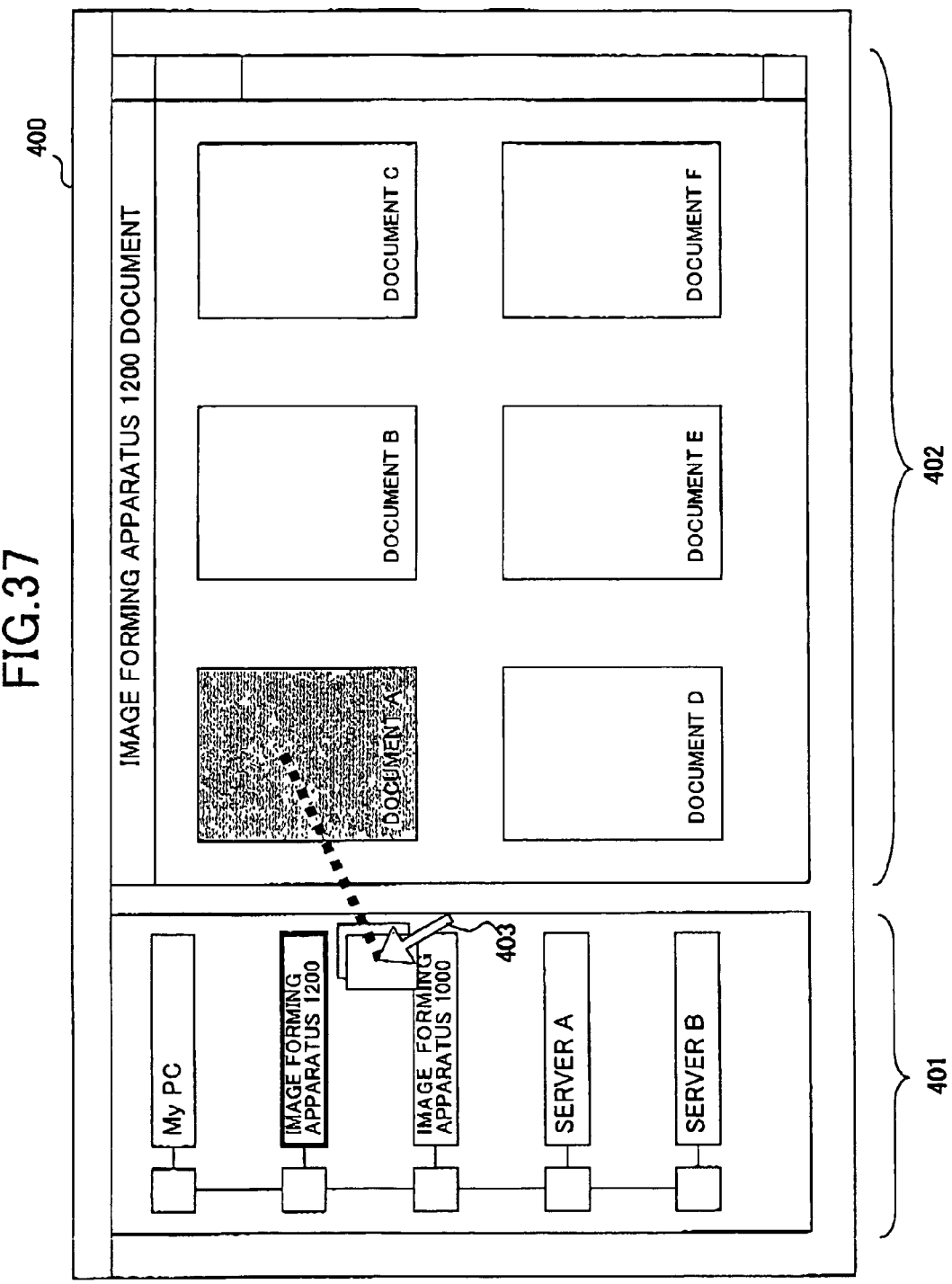

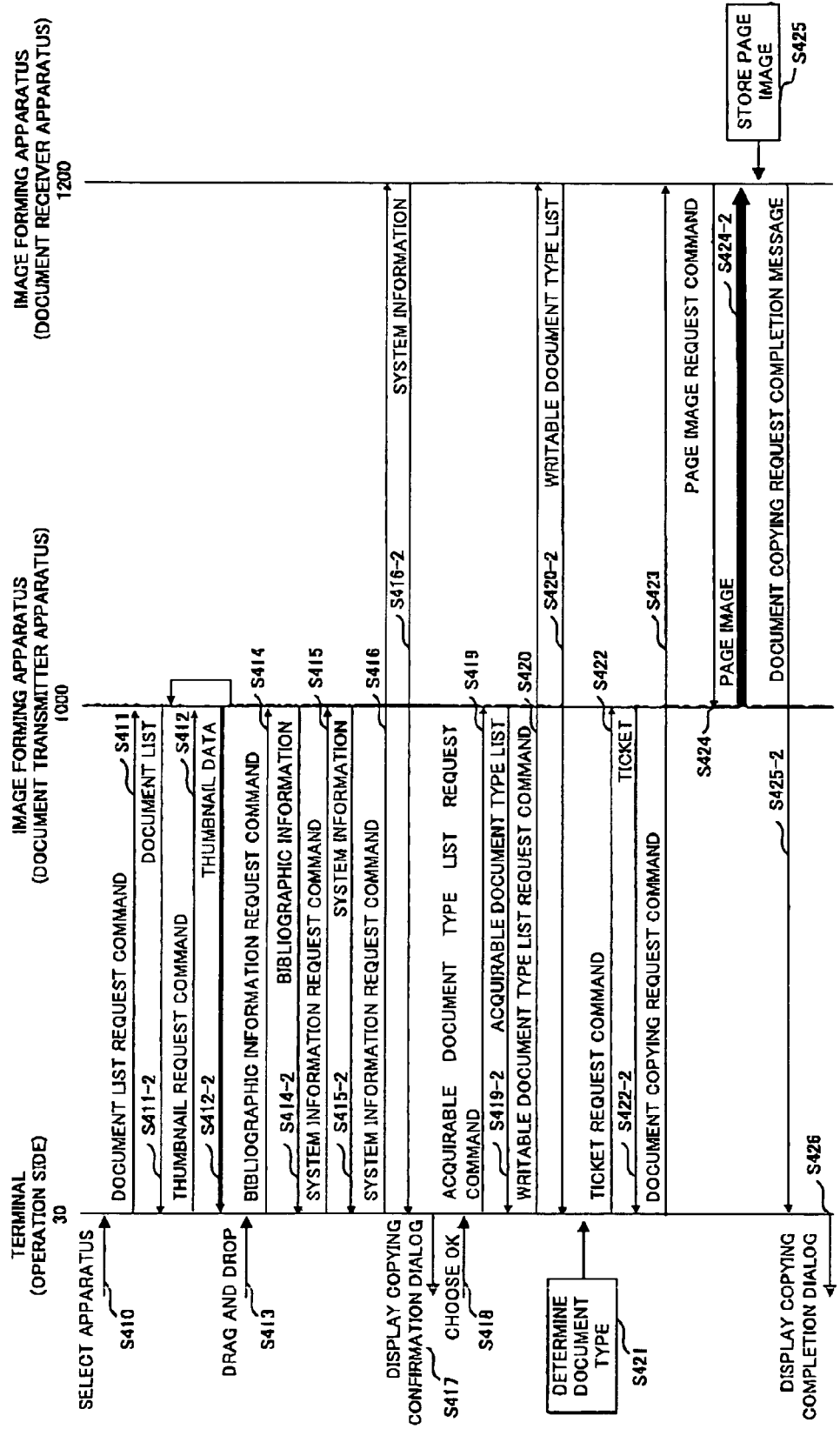

FIG.45

```
31
POST /netdoc HTTP/1.0
Content-Type: text/xml; charset=UTF-8
Content-Length: nnnn
SOAPAction: "http://foo.bar.com/netdoc/documentmanagement"  ～32

<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = http://schemas.xmlsoap.org/soap/encoding/
>
 <SOAP-ENV:Header/>
 <SOAP-ENV:Body>      35
  <ns:documentmanagement>
   <operation>getFileVariation</operation>  ～50
  </ns:documentmanagement>
 </SOAP-ENV:Body>
</SOAP-ENV:Envelope>
```

33 SOAP HEADER

34 SOAP BODY

FIG.46

```
HTTP/1.0 200 OK    42
Content-Type: text/xml; charset=UTF-8
Content-Length: nnnn <SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>
<SOAP-ENV:Body>
  <ns:documentmanagementResponse>
    <type>
      <format>Tiff</format>                          } 52
      <imageType>1bit/dot</imageType>
      <binary>600 x 600</binary>
    </type>
    <type>
      <format>Jpeg</format>                          } 53
      <imageType>8bit/dot</imageType>
      <binary>300 x 300</binary>
    </type>
    <type>
      <format>Jpeg2000</format>                      } 54
      <imageType>8bit/dot</imageType>
      <binary>600 x 600</binary>
    </type>
  </ns:documentmanagementResponse>
</SOAP-ENV:Body>
</SOAP-ENV:Envelope>
```

43 SOAP HEADER

44 SOAP BODY

FIG.47

```
31
POST /netdoc HTTP/1.0
Content-Type: text/xml; charset=UTF-8
Content-Length: nnnn
SOAPAction: "http://foo.bar.com/netdoc/documentmanagement" —— 32

<SOAP-ENV:Envelope
 xmlns:SOAP-ENV = "http://schemas.xmlsoap.org/soap/envelope/"    ⎫
 xmlns:ns = "http://foo.bar.com/netdoc/"                          ⎬ 33 SOAP HEADER
 SOAP-ENV:encodingStyle = http://schemas.xmlsoap.org/soap/encoding/⎭
>
<SOAP-ENV:Header/>
<SOAP-ENV:Body>                                    ⎫
  <ns:documentmanagement> —— 35                    ⎪
    <ticketId>456</ticketId> —— 36                 ⎬ 34 SOAP BODY
    <operation>insertFileByTicket</operation> —— 37⎪
  </ns:documentmanagement>                         ⎪
</SOAP-ENV:Body>                                   ⎭
</SOAP-ENV:Envelope>
```

FIG.48

```
42
HTTP/1.0 200 OK
Content-Type: text/xml; charset=UTF-8
Content-Length: nnnn <SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>                                                                    } 43 SOAP HEADER
<SOAP-ENV:Body>
 <ns:documentmanagementResponse>  45
  <result>success</result>  46
 </ns:documentmanagementResponse>
</SOAP-ENV:Body>                                                     } 44 SOAP BODY
</SOAP-ENV:Envelope>
```

FIG.49

```
31
POST /netdoc HTTP/1.0
Content-Type: Multipart/Related; boundary=XX_boundary; type=text/xml;
Content-Length: nnnn
SOAPAction: "http://foo.bar.com/netdoc/documentmanagement"  —— 32

<SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = http://schemas.xmlsoap.org/soap/encoding/
>
<SOAP-ENV:Header/>                                          } 33 SOAP HEADER
<SOAP-ENV:Body>
 <ns:documentmanagement>  —— 35
  <type>
   <format>Jpeg</format>
   <imageType>8bit/dot</imageType>    } 59
   <binary>300 x 300</binary>
  </type>
  <operation>getFile(TicketID)</operation>  —— 60
 </ns:documentmanagement>
</SOAP-ENV:Body>                                            } 34 SOAP BODY
</SOAP-ENV:Envelope>
```

FIG.50

```
HTTP/1.0 200 OK  ―42
Content-Type: Multipart/Related; boundary=XX_boundary; type=text/xml;  ―61
Content-Description: This is the optional message description.

--XX_boundary  ―66
Content-Type: text/xml; charset=UTF-8
Content-Length: nnnn
                                                                    ⎫
<?xml version='1.0' ?>                                              ⎪
<SOAP-ENV:Envelope                                                  ⎪
  xmlns:SOAP-ENV = "http://schemas.xmlsoap.org/soap/envelope/"      ⎪
  xmlns:ns = "http://foo.bar.com/netdoc/"                           ⎬ 62 TEXT DATA INFORMATION
  SOAP-ENV:encodingStyle = "http://schemas.xmlsoap.org/soap/encoding/" ⎪
>                                                                   ⎪
<SOAP-ENV:Body>                                      ⎫              ⎪  43 SOAP HEADER
  <ns:documentmanagementResponse>  ―63               ⎪              ⎪
    <result>success</result>                         ⎬ 44 SOAP BODY ⎪
  </ns:documentmanagementResponse>                   ⎪              ⎪
</SOAP-ENV:Body>                                     ⎭              ⎪
</SOAP-ENV:Envelope>                                                ⎭

--XX_boundary  ―66                                                  ⎫
Content-Type: image/tiff                                            ⎪
Content-Transfer-Encoding: binary                                   ⎬ 64 IMAGE DATA INFORMATION
Content-Length: mmmm  ―65                                           ⎪
.....binary Tiff image.......                                       ⎪
--XX_boundary--  ―66                                                ⎭
```

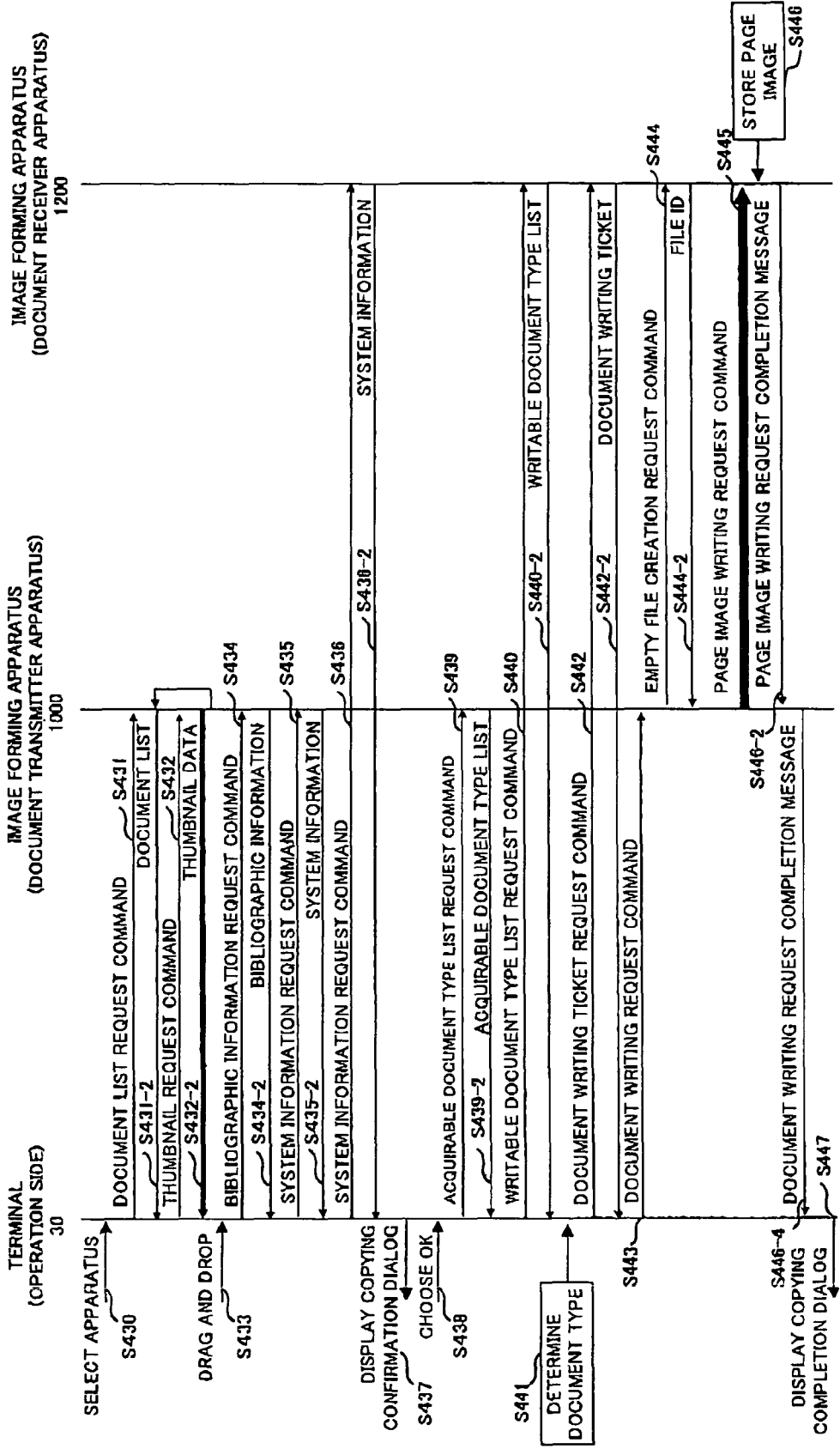

FIG.52

```
31
POST /netdoc HTTP/1.0                                    86
Content-Type: Multipart/Related; boundary=XX_boundary; type=text/xml;  — 81
Content-Description: This is the optional message description.

--XX_boundary  — 86
Content-Type: text/xml; charset=UTF-8          ⎫
Content-Length: nnnn                           ⎬ 82 TEXT DATA INFORMATION
SOAPAction: "http://foo.bar.com/netdoc/documentmanagement"  /32
⎫
<SOAP-ENV:Envelope                                              ⎪
 xmlns:SOAP-ENV = "http://schemas.xmlsoap.org/soap/envelope/"   ⎪
 xmlnsns = "http://foo.bar.com/netdoc/"                         ⎪
 SOAP-ENV:encodingStyle = http://schemas.xmlsoap.org/soap/encoding/ ⎬ 33 SOAP HEADER
>                                                               ⎪
<SOAP-ENV:Header/>    35                                        ⎪
<SOAP-ENV:Body>                                        ⎫        ⎪
 <ns:documentmanagement>                               ⎪        ⎭
  <operation>putFile(FileID)</operation>  — 80         ⎬ 34 SOAP BODY
 </ns:documentmanagement>                              ⎪
</SOAP-ENV:Body>                                       ⎭
</SOAP-ENV:Envelope>

--XX_boundary  — 86                              ⎫
Content-Type: image/tiff                         ⎪
Content-Transfer-Encoding: binary                ⎬ 84 IMAGE DATA INFORMATION
Content-Length: mmmm        — 85                 ⎪
······binary Tiff image······                    ⎭
--XX_boundary--  — 86
```

FIG.53

```
42
HTTP/1.0 200 OK
Content-Type: text/xml; charset=UTF-8
Content-Length: nnnn <SOAP-ENV:Envelope
 xmlns:SOAP-ENV = "http://schemas.xmlsoap.org/soap/envelope/"
 xmlns:ns = "http://foo.bar.com/netdoc/"
 SOAP-ENV:encodingStyle = "http://schemas.xmlsoap.org/soap/encoding/"
>                                                                        ⎫
<SOAP-ENV:Body>                                                          ⎬ 43 SOAP HEADER
 <ns:documentmanagementResponse>  ── 87                                  ⎭
  <result>success</result>  ── 88                                        ⎫
 </ns:documentmanagementResponse>                                        ⎬ 44 SOAP BODY
</SOAP-ENV:Body>                                                         ⎭
</SOAP-ENV:Envelope>
```

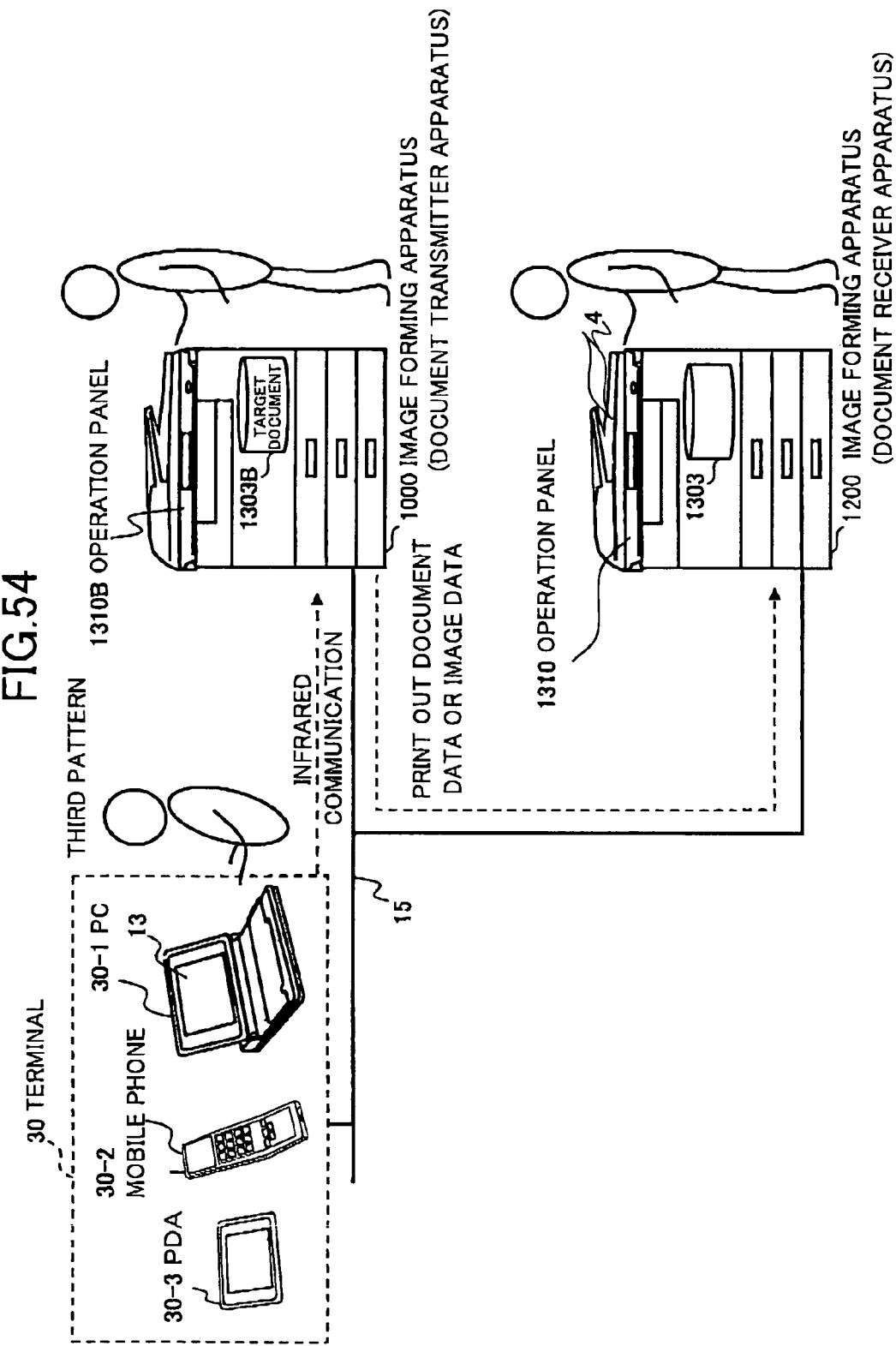

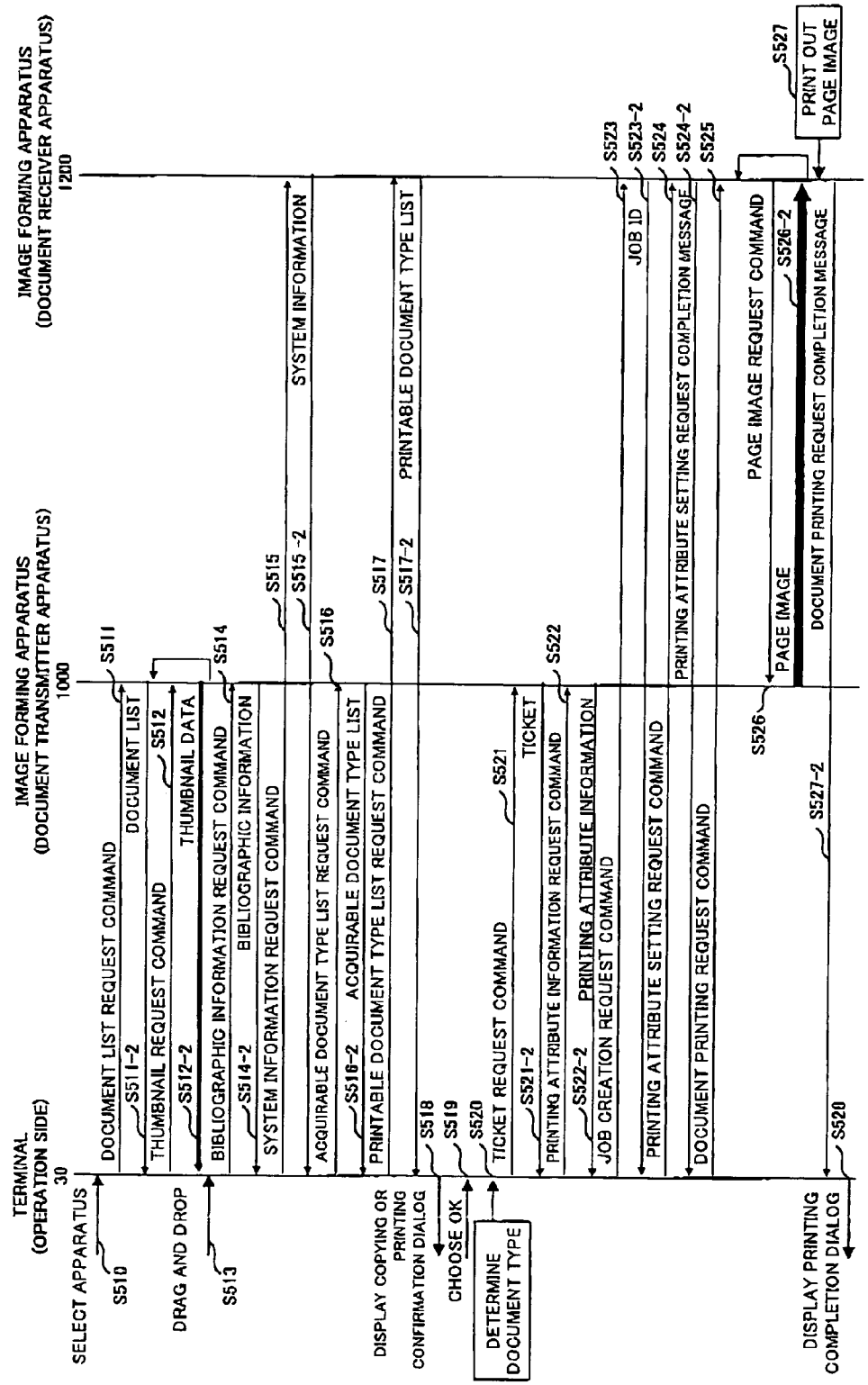

WEB SERVICE PROVIDING APPARATUS

CROSS-REFERENCE TO RELATED APPLICATIONS

The present application claims priority under 35 U.S.C. §119 to Japanese Patent Priority Application Nos. 2002-275976 filed Sep. 20, 2002, 2002-275978 filed Sep. 20, 2002 filed Sep. 20, 2002, and 2002-275985 filed Sep. 20, 2002, the entire contents of which are hereby incorporated by reference. The present application also claims priority under 35 U.S.C. §119 to Japanese Patent Priority Application Nos. 2003-327268, 2003-327269, and 2003-327270, which were filed Sep. 19, 2003.

BACKGROUND OF THE INVENTION

1. Field of the Invention

The present invention generally relates to a Web service providing apparatus, and more particularly to a Web service providing apparatus that can perform various processes, such as copying and printing, on a document or an image stored in another connected apparatus through cooperation with apparatuses connected to the Web service providing apparatus via a network in flexible manners, that is, even if a user is in front of any of the connected apparatuses and operates the apparatus.

In addition, the present invention relates to a Web service providing method performed by such a Web service providing apparatus.

2. Description of the Related Art

In the prior art associated with processing for image data through cooperation with image forming apparatuses connected to each other via a network, Japanese Laid-Open Patent Application No. 2000-6496 discloses an image forming apparatus, which can be connected to information output apparatuses via a network, designed to prevent quality degradation of an output image even if any of the information output apparatuses in the network outputs the image.

However, since the disclosed image forming apparatus is intended to cause other apparatuses connected thereto via a network to output image data, the disclosed invention does not cover other types of information processing that are performed through cooperation with the connected apparatuses. Accordingly, the conventional image forming apparatus, if a multifunctional product having various functions not limited to image processing is connected to the image forming apparatus via the network, cannot control cooperation to perform such various processes that the multifunctional product can provide. Hence, the conventional image forming apparatus has disadvantages in that the image forming apparatus cannot make full use of such various functions of the connected multifunctional product.

SUMMARY OF THE INVENTION

It is a general object of the present invention to provide a Web service providing apparatus in which one or more of the above-mentioned problems are eliminated.

A more specific object of the present invention is to provide a Web service providing apparatus that can properly perform various processes, such as a copying operation and a printing operation, on a document or an image stored in another connected apparatus through cooperation with apparatuses connected to the Web service providing apparatus via a network even if a user is in front of any of the connected apparatuses and operates the apparatus.

In addition, another more specific object of the present invention is to provide a Web service providing method performed by such a Web service providing apparatus.

In order to achieve the above-mentioned objects, there is provided according to one aspect of the present invention a Web service providing apparatus, including: a server processing part controlling receipt of a process request to request a process from a requesting apparatus connected to the Web service providing apparatus via a communication line and transmission of a process response corresponding to the process request to the requesting apparatus in accordance with a predetermined protocol; a condition acquisition control part, in response to an instruction from the server processing part, controlling acquisition of target information designated by the process request from a management apparatus managing the target information based on a first processable condition under which the target information is processable to the management apparatus and the Web service providing apparatus; and a service providing part performing the requested process on the target information and sending a result of the process to the server processing part.

According to one aspect of the present invention, the above-mentioned Web service providing apparatus can control acquisition of a first processable condition, under which target information designated by a process request can be processed by the Web service providing apparatus and a management apparatus, corresponding to the type of the target information.

Also, the predetermined protocol is, for example, a Simple Object Access Protocol (SOAP).

In an embodiment of the present invention, the Web service providing apparatus may further include: a program including the condition acquisition control part and the service providing part; a control service managing a hardware resource used in the process; and an operating system controlling the program and the control service.

According to one aspect of the present invention, the above-mentioned Web service providing apparatus, which works as a computer, can directly control hardware resources for image processing.

In an embodiment of the present invention, the Web service providing apparatus may further include a client processing part, in response to an instruction issued by the condition acquisition control part, controlling transmission of a process request to the management apparatus and receipt of a process response from the management apparatus in accordance with the predetermined protocol.

According to one aspect of the present invention, the condition acquisition control part can properly control communication of process requests and process responses through a processable condition to a management apparatus and the Web service providing apparatus.

In an embodiment of the present invention, the condition acquisition control part may include: a sequence control part controlling a sequence of processes to acquire a second processable condition regarding the target information from the management apparatus and internally acquire a third processable condition regarding the target information in the Web service providing apparatus; and a condition determination part determining the first processable condition based on the second processable condition and the third processable condition acquired by the sequence control part.

According to one aspect of the present invention, it is possible to properly determine the first processable condition regarding the management apparatus and the Web service providing apparatus by acquiring the second and third processable conditions.

In an embodiment of the present invention, the sequence control part may include: a first control part controlling the client processing part so as to acquire the second processable condition from the management apparatus by sending a process request to request the second processable condition to the management apparatus; a second control part controlling the client processing part so as to acquire the third processable condition from the Web service providing apparatus by internally issuing a process request to request the third processable condition to the server processing part; a determination instruction part causing the condition determination part to make the determination based on the second processable condition and the third processable condition; and an information acquisition part acquiring the target information from the management apparatus in accordance with the first processable condition determined by the condition determination part.

According to one aspect of the present invention, the sequence control part acquires the second and third processable conditions regarding the management apparatus and the Web service providing apparatus, and determines the first processable condition based on the second and third processable conditions. Also, it is possible to acquire target information from the management apparatus based on the first processable condition.

In an embodiment of the present invention, the client processing part may include: a process request creation part, in response to an instruction issued by the sequence control part, creating a process request, which is to be sent to the management apparatus, corresponding to the instruction in accordance with the predetermined protocol; and a process response interpretation part interpreting a process response, which is received from the management apparatus, corresponding to the process request and informing a result of the interpretation to the sequence control part.

According to one aspect of the present invention, the sequence control part controls not only the process request creation part but also a result of the process response interpretation part.

In an embodiment of the present invention, the service providing part may include a service execution part executing a process corresponding to a process request received from the requesting apparatus or internally created.

According to one aspect of the present invention, it is possible to perform a process corresponding to a process request not only received from a requesting apparatus via a network but also internally issued. Thus, it is possible to perform a process corresponding to a process request created by the client process part in response to an instruction issued by the condition acquisition control part as for a process request received from a requesting apparatus.

In an embodiment of the present invention, the server processing part may include: a process request interpretation part interpreting the process request to request the process on the target information in accordance with the predetermined protocol; and a process response creation part creating a process response to indicate a result of the process in accordance with the predetermined protocol.

According to one aspect of the present invention, since the process request interpretation part interprets a process request and the process response creation part creates a process response in accordance with a predetermined protocol such as SOAP, the above-mentioned Web service providing apparatus can work as a Web server.

In an embodiment of the present invention, the process request interpretation part may include: a determination part determining whether the process request is to acquire the target information from the management apparatus; and a notification part informing the condition acquisition control part of the process request based on a result of the determination made by the determination part.

According to one aspect of the present invention, a process request is delivered to the condition acquisition control part based on determination of the determination part. As a result, it is possible to start a sequence of processes associated with the Web service providing apparatus and the management apparatus through the condition acquisition control part.

In an embodiment of the present invention, the process response creation part may include a control result creation part creating a process response to indicate a result of the control of the condition acquisition control part in accordance with the predetermined protocol.

According to one aspect of the present invention, it is possible to send a control result of the sequence associated with the management apparatus and the Web service providing apparatus to the requesting apparatus as a process response corresponding to a process request.

In an embodiment of the present invention, the condition acquisition control part may include: an attribute information acquisition part acquiring attribute information regarding the target information from the management apparatus; and a third control part causing the client processing part to internally issue the process request to request the process on the target information to the client processing part based on the attribute information, wherein the service providing part executes the process requested by the requesting apparatus via the server processing part based on the attribute information.

According to one aspect of the present invention, it is possible to perform a process requested by the requesting apparatus based on attribute information regarding the target information.

In an embodiment of the present invention, the Web service providing apparatus may include a display part, the display part including: a first display part displaying a list of selectable apparatuses that a user is allowed to select among apparatuses connected via the communication line; a second display part, when the user selects a desired apparatus from the list of apparatuses, displaying a list of information items managed by the management apparatus; and an apparatus determination part, when the user designates a desired information item from the list of information items and the desired apparatus from the list of selectable apparatuses, determining the designated apparatus as a processing apparatus to perform the process.

In an embodiment of the present invention, the second display part may display the information items in a reduced size on the display part.

According to one aspect of the present invention, a user can determine which apparatus should perform a process on which information item by dragging and dropping operations.

In an embodiment of the present invention, the requesting apparatus may be one of the Web service providing apparatus, the management apparatus and a terminal connected to each other via the communication line.

According to one aspect of the present invention, even if the requesting apparatus is any of the Web service providing apparatus, the management apparatus and the terminal, it is possible to acquire target information stored in another apparatus in cooperation with associated apparatuses connected via a network and copy or print the target information in the requesting apparatus.

In an embodiment of the present invention, the communication line may be one of a network communication line including a wireless LAN, a serial communication line including an infrared communication, and a parallel communication line.

In an embodiment of the present invention, the predetermined protocol may be a Simple Object Access Protocol.

Additionally, there is provided according to another aspect of the present invention a method of providing a Web service for a Web service providing apparatus, the method including a server processing step of controlling receipt of a process request to request a process from a requesting apparatus connected to the Web service providing apparatus via a communication line and transmission of a process response corresponding to the process request to the requesting apparatus in accordance with a predetermined protocol; a condition acquisition control step of controlling, corresponding to an instruction from the server processing step, acquisition of target information designated by the process request from a management apparatus managing the target information based on a first processable condition under which the target information is processable to the management apparatus and the Web service providing apparatus; and a service providing step of performing the requested process on the target information and informing the server processing step of a result of the process.

Additionally, there is provided according to another aspect of the present invention a Web service providing apparatus, including: a service providing part managing target information and providing the target information to a processing apparatus, which performs a process on the target information, in accordance with a first processable condition received from the processing apparatus; a process request interpretation part interpreting a process request to request the process in accordance with a predetermined protocol and informing the service providing part of the process; and a process request creation part creating a process response to indicate a result of the process in accordance with the predetermined protocol.

In an embodiment of the present invention, the service providing part may include a processable condition providing part, in response to receipt of a process request to acquire a second processable condition with respect to the processing apparatus, sending a process response to indicate the second processable condition in accordance with the predetermined protocol, and after the transmission of the process response to indicate the second processable condition, the service providing part may provide the target information to the processing apparatus in accordance with the first processable condition received from the processing apparatus.

In an embodiment of the present invention, the Web service providing apparatus may further include: a process request creation part creating the process request to request the process in accordance with the predetermined protocol; and a process response interpretation part interpreting the received process response corresponding to the process request.

In an embodiment of the present invention, the Web service providing apparatus may further include a display part, the display part including: a first display part displaying a list of selectable apparatuses that a user is allowed to select among apparatuses connected via a communication line; a second display part, when the user selects a desired apparatus from the list of selectable apparatuses, displaying a list of information items managed by the selected apparatus; and an apparatus determination part, when the user designates a desired information item from the list of information items and the desired apparatus from the list of selectable apparatuses, determining the designated apparatus as the processing apparatus.

Additionally, there is provided according to another aspect of the present invention a method of providing a Web service for a Web service providing apparatus, the method including: a service providing step of managing target information and providing the target information to a processing apparatus to perform a process on the target information based on a first processable condition received from the processing apparatus; a process request interpretation step of interpreting a process request to request the process in accordance with a predetermined protocol and informing the service providing step of the process; and a process request creation step of creating a process response to indicate a result of the process in accordance with the predetermined protocol.

Additionally, there is provided according to another aspect of the present invention a terminal, including: a process request creation part creating a process request to cause a first apparatus to acquire target information managed by a second apparatus from the second apparatus and perform a process on the target information in accordance with a predetermined protocol; a process response interpretation part interpreting a process response corresponding to the process request and acquiring a result of the process performed by the first apparatus; and a display control part displaying the result of the process on a display unit of the terminal.

Additionally, there is provided according to another aspect of the present invention a recording medium for storing a program to cause a terminal to execute a procedure, the procedure including a process request creation step of creating a process request to request a first apparatus to acquire target information managed by a second apparatus from the second apparatus and perform a process on the target information in accordance with a predetermined protocol; a process response interpretation step of interpreting a process response corresponding to the process request and acquiring a result of the process of the first apparatus; and a display control step of displaying the result of the process on a display unit of the terminal.

Additionally, there is provided according to another aspect of the present invention a program to cause a terminal to execute a procedure, the procedure including: a process request creation step of creating a process request to request a first apparatus to acquire target information managed by a second apparatus from the second apparatus and perform a process on the target information in accordance with a predetermined protocol; a process response interpretation step of interpreting a process response corresponding to the process request and acquiring a result of the process of the first apparatus; and a display control step of displaying the result of the process on a display unit of the terminal.

According to one aspect of the present invention, it is possible to perform some process, such as printing and copying operations, on a target document, which is stored in a document transmitter apparatus, in a document receiver apparatus based on a processable document type in cooperation with the document transmitter apparatus and the document receiver apparatuses.

Additionally, there is provided according to another aspect of the present invention a Web service providing apparatus, including: a server processing part controlling receipt of a process request to request a process from a requesting apparatus connected to the Web service providing apparatus via a communication line and transmission of a process response corresponding to the process request to the requesting apparatus in accordance with a predetermined protocol; a condition acquisition control part, in response to an instruction from the server processing part, controlling transmission of target information designated by the process request to a processing apparatus based on a first processable condition under which the target information is processable to the processing apparatus and the Web service providing apparatus; and a service providing part, in response to receipt of a result of the process performed by the processing apparatus on the target information, informing the server processing part of the result of the process.

According to one aspect of the present invention, the above-mentioned Web service providing apparatus can control acquisition of a first processable condition, under which target information designated by a process request can be processed by the Web service providing apparatus and a management apparatus, corresponding to the type of the target information.

Also, the predetermined protocol is, for example, a Simple Object Access Protocol (SOAP).

In an embodiment of the present invention, the Web service providing apparatus may further include: a program including the condition acquisition control part and the service providing part; a control service managing a hardware resource used in the process; and an operating system controlling the program and the control service.

According to one aspect of the present invention, the above-mentioned Web service providing apparatus, which works as a computer, can directly control hardware resources for image processing.

In an embodiment of the present invention, the Web service providing apparatus may further include a client processing part, in response to an instruction issued by the condition acquisition control part, controlling transmission of a process request to the processing apparatus and receipt of a process response from the processing apparatus in accordance with the predetermined protocol.

According to one aspect of the present invention, the condition acquisition control part can properly control communication of process requests and process responses through a processable condition to a processing apparatus and the Web service providing apparatus.

In an embodiment of the present invention, the condition acquisition control part may include: a sequence control part controlling a sequence of processes to acquire a second processable condition regarding the target information from the processing apparatus and internally acquire a third processable condition regarding the target information from the Web service providing apparatus; and a condition determination part determining the first processable condition based on the second processable condition and the third processable condition acquired by the sequence control part.

According to one aspect of the present invention, it is possible to properly determine the first processable condition regarding the processing apparatus and the Web service providing apparatus by acquiring the second and third processable conditions.

In an embodiment of the present invention, the sequence control part may include: a first control part controlling the client processing part so as to acquire the second processable condition from the processing apparatus by sending a process request to request the second processable condition to the processing apparatus; a second control part controlling the client processing part so as to acquire the third processable condition from the Web service providing apparatus by internally issuing a process request to request the third processable condition to the server processing part; a determination instruction part causing the condition determination part to make the determination based on the second processable condition and the third processable condition; and an information transmission part sending the target information to the processing apparatus in accordance with the first processable condition determined by the condition determination part.

According to one aspect of the present invention, the sequence control part acquires the second and third processable conditions regarding the management apparatus and the Web service providing apparatus, respectively, and determines the first processable condition based on the second and third processable conditions. Also, the processing apparatus can acquire target information based on the first processable condition.

In an embodiment of the present invention, the client processing part may include: a process request creation part, in response to an instruction issued by the sequence control part, creating a process request, which is sent to the processing apparatus, corresponding to the instruction in accordance with the predetermined protocol; and a process response interpretation part interpreting a process response, which is received from the processing apparatus, corresponding to the process request and informing a result of the interpretation of the sequence control part.

According to one aspect of the present invention, the sequence control part controls not only the process request creation part but also a result of the process response interpretation part.

In an embodiment of the present invention, the service providing part may include a service execution part executing a process corresponding to a process request received from the requesting apparatus or internally created.

According to one aspect of the present invention, it is possible to perform a process corresponding to a process request not only received from a requesting apparatus via a network but also internally issued. Thus, it is possible to perform a process corresponding to a process request created by the client process part in response to an instruction issued by the condition acquisition control part as for a process request received from a requesting apparatus.

In an embodiment of the present invention, the server processing part may include: a process request interpretation part interpreting the process request to request the process on the target information in accordance with the predetermined protocol; and a process response creation part creating a process response to indicate a result of the process in accordance with the predetermined protocol.

According to one aspect of the present invention, since the process request interpretation part interprets a process request and the process response creation part creates a process response in accordance with a predetermined protocol such as SOAP, the above-mentioned Web service providing apparatus can work as a Web server.

In an embodiment of the present invention, the process request interpretation part may include: a determination part determining whether the process request is to send the target information to the processing apparatus; and a notification part informing the condition acquisition control part of the process request based on a result of the determination made by the determination part.

According to one aspect of the present invention, a process request is delivered to the condition acquisition control part based on determination of the determination part. As a result, it is possible to start a sequence of processes associated with the Web service providing apparatus and the management apparatus through the condition acquisition control part.

In an embodiment of the present invention, the process response creation part may include a control result creation part creating a process response to indicate a result of the control of the condition acquisition control part in accordance with the predetermined protocol.

According to one aspect of the present invention, it is possible to send a control result of the sequence associated with the processing apparatus and the Web service providing apparatus to the requesting apparatus as a process response corresponding to a process request.

In an embodiment of the present invention, the Web service providing apparatus may further include a display part, the display part including: a first display part displaying a list of selectable apparatuses that a user is allowed to select among apparatuses connected via a communication line; a second display part, when the user selects a desired apparatus from the list of selectable apparatuses, displaying a list of information items managed by the selected apparatus on the display part; and an apparatus determination part, when the user designates a desired information item from the list of information items and the desired apparatus from the list of selectable apparatuses, determining the designated apparatus as a processing apparatus.

In an embodiment of the present invention, the second display part may display the information items in a reduced size on the display part.

According to one aspect of the present invention, a user can determine which apparatus should perform a process on which information item by dragging and dropping operations.

In an embodiment of the present invention, the requesting apparatus may be one of the Web service providing apparatus, the processing apparatus, and a terminal connected to each other via the communication line.

According to one aspect of the present invention, even if the requesting apparatus is any of the Web service providing apparatus, the management apparatus and the terminal, it is possible to acquire target information stored in management apparatus in cooperation with associated apparatuses connected via a network and copy or print the target information in the requesting apparatus.

In an embodiment of the present invention, the communication line may be one of a network communication line including a wireless LAN, a serial communication line including an infrared communication, and a parallel communication line.

In an embodiment of the present invention, the predetermined protocol may be a Simple Object Access Protocol.

Additionally, there is provided according to another aspect of the present invention a method of providing a Web service for a Web service providing apparatus, including: a server processing step of controlling receipt of a process request to request a process from a requesting apparatus connected to the Web service providing apparatus via a communication line and transmission of a process response corresponding to the process request to the requesting apparatus in accordance with a predetermined protocol; a condition acquisition control step of controlling, corresponding to an instruction from the server processing step, transmission of target information designated by the process request to a processing apparatus processing the target information based on a first processable condition under which the target information is processable to the processing apparatus and the Web service providing apparatus; and a service providing step of performing the requested process on the target information and informing the server processing step of a result of the process.

Additionally, there is provided according to another aspect of the preset invention a Web service providing apparatus, including: a service providing part performing a process on target information received from a management apparatus managing the target information in accordance with a first processable condition and providing a result of the process to the management apparatus; a process request interpretation part interpreting a process request to request the process in accordance with a predetermined protocol and informing the service providing part of the process; and a process request creation part creating a process response to indicate a result of the process in accordance with the predetermined protocol.

In an embodiment of the present invention, the service providing part may include a processable condition providing part, in response to receipt of a process request to acquire a second processable condition with respect to the management apparatus, sending a process response to indicate the second processable condition in accordance with the predetermined protocol, and after the transmission of the second processable condition, the service providing part provides a result of the process on the target information received from the management apparatus in accordance with the first processable condition.

In an embodiment of the present invention, the Web service providing apparatus may further include: a process request creation part creating the process request to request the process in accordance with the predetermined protocol; and a process response interpretation part interpreting the received process response corresponding to the process request.

In an embodiment of the present invention, the Web service providing apparatus may further include a display part, the display part including: a first display part displaying a list of selectable apparatuses that a user is allowed to select among apparatuses connected via the communication line; a second display part, when the user selects a desired apparatus from the list of selectable apparatuses, displaying a list of information items managed by the selected apparatus; and an apparatus determination part, when the user designates a desired information item from the list of information items and the desired apparatus from the list of selectable apparatuses, determining the designated apparatus as a processing apparatus.

Additionally, there is provided according to another aspect of the present invention a method of providing a Web service for a Web service providing apparatus, the method including a service providing step of performing a process on target information received from a management apparatus managing the target information in accordance with a first processable condition and providing a result of the process to the management apparatus; a process request interpretation step of interpreting a process request to request the process in accordance with a predetermined protocol and informing the service providing step of the process; and a process request creation step of creating a process response to indicate a result of the process in accordance with the predetermined protocol.

Additionally, there is provided according to another aspect of the present invention a terminal, including: a process request creation part creating a process request to cause a first apparatus to perform a process on target information managed by a second apparatus by sending the target information to the first apparatus in accordance with a predetermined protocol; a process response interpretation part interpreting a process response corresponding to the process request and acquiring a result of the process performed by the first apparatus; and a display control part displaying the result of the process on a display unit of the terminal.

Additionally, there is provided according to another aspect of the present invention a recording medium for storing a program to cause a terminal to execute a procedure, the procedure including: a process request creating step of creating a process request to cause a first apparatus to perform a process on target information managed by a second apparatus by sending the target information to the first apparatus; a process response interpretation step of interpreting a process response corresponding to the process request and acquiring a result of the process performed by the first apparatus; and a display control step of displaying the result of the process on a display unit of the terminal.

Additionally, there is provided according to another aspect of the present invention a program to cause a terminal to execute a procedure, the procedure including: a process request creating step of creating a process request to cause a first apparatus to perform a process on target information managed by a second apparatus by sending the target information to the first apparatus; a process response interpretation step of interpreting a process response corresponding to the process request and acquiring a result of the process performed by the first apparatus; and a display control step of displaying the result of the process on a display unit of the terminal.

According to one aspect of the present invention, it is possible to perform some process, such as printing and copying operations, on a target document, which is stored in a document transmitter apparatus, in a document receiver apparatus based on a processable document type in cooperation with the document transmitter apparatus and the document receiver apparatuses.

Additionally, there is provided according to another aspect of the present invention a terminal connected to a management apparatus managing target information and a processing apparatus processing the target information via a communication line, including: a client processing part controlling transmission of a process request to request a process to the management apparatus and the processing apparatus and receipt of a process response corresponding to the process request from the management apparatus and the processing apparatus in accordance with a predetermined protocol; and a process control part acquiring a first processable condition, under which the target information is processable to the processing apparatus, and controlling the client processing part so that the processing apparatus is allowed to perform the process on the target information in accordance with the first processable condition.

According to one aspect of the present invention, the terminal can control cooperation to perform a process on target information, which is stored in a management apparatus, in a processing apparatus via a communication line.

Also, the predetermined protocol is, for example, SOAP.

In an embodiment of the present invention, the process control part may include: a first sequence control part controlling a sequence of processes to acquire a second processable condition, under which the target information is acquirable from the management apparatus, from the management apparatus; a second sequence control part controlling a sequence of processes to acquire a third processable condition, under which the target information is writable in the processing apparatus, from the processing apparatus; and a condition determination part determining the first processable condition based on the second processable condition and the third processable condition.

According to one aspect of the present invention, it is possible to properly determine the first processable condition under which the management apparatus and the processing apparatus can process the target information.

In an embodiment of the present invention, the process control part may include a third sequence control part controlling a sequence of processes such that the processing apparatus copies the target information from the management apparatus to the processing apparatus in accordance with the first processable condition determined by the condition determination part.

According to one aspect of the present invention, it is possible to perform a PULL type document copying process in such a way that the processing apparatus copies the target information managed by the management apparatus.

In an embodiment of the present invention, the process control part may include a fourth sequence control part controlling a sequence of processes such that the management apparatus writes the target information in the processing apparatus in accordance with the first processable condition determined by the condition determination part.

According to one aspect of the present invention, it is possible to perform a PUSH type document copying process in such a way that the management apparatus writes the target document in the processing apparatus.

In an embodiment of the present invention, the terminal may further include: a process request creation part creating a process request corresponding to a command issued by the process control part in accordance with a predetermined protocol; and a process response interpretation part interpreting a process response received from the management apparatus or the processing apparatus corresponding to a process request.

According to one aspect of the present invention, the process request creation part creates a process request under control of the process control part, and the process response interpretation part interprets a process response corresponding to a process request under control of the process control part. As a result, the terminal can send the process request to the management apparatus and the processing apparatus under control of the process control part. Thus, it is possible to control cooperation with the management apparatus and the processing apparatus.

In an embodiment of the present invention, the terminal may further include an operation part operating the process on the target information managed by the management apparatus, the process control part creates the process request by controlling the process request creation part.

According to one aspect of the present invention, it is possible to start control a sequence of processes for the target information managed by the management apparatus in cooperation with the connected apparatuses corresponding to user's manipulation.

In an embodiment of the present invention, the operation part may include a display part displaying a first display area and a second display area on a display unit of the terminal, the first display area where a list of apparatuses including the management apparatus and the processing apparatus is displayed, the second display area where a list of information items managed by the management apparatus is displayed, and the condition acquisition control part may operate corresponding to copying manipulation or moving manipulation of the target information, which is displayed in the second display area, toward the processing apparatus, which is displayed in the first display area.

According to one aspect of the present invention, a user can request a process associated with cooperation with connected apparatuses by manipulating screens.

In an embodiment of the present invention, the operation part may include a first process designation part enabling a user to designate a type of process through copying manipulation or moving manipulation.

In an embodiment of the present invention, the operation part may further include a second process designation part enabling the user to designate a process method corresponding to the designated type of process.

According to one aspect of the present invention, a user can designate one of types of various processes such as a copying process and a printing process.

In an embodiment of the present invention, the operation part may further include a third process designation part enabling the user to designate a processing order of a plurality of information items that the user designates in the second display area.

According to one aspect of the present invention, when a user designates the process order of selected information items such as documents, it is possible to designate the process order flexibly.

Additionally, there is provided according to another aspect of the present invention a recording medium for storing a program to cause a terminal to execute a procedure wherein the terminal is connected to a management apparatus managing target information and a processing apparatus processing the target information via a communication line, the procedure including: a client processing step of controlling transmission of a process request to request a process to the management apparatus and the processing apparatus and receipt of a process response corresponding to the process request from the management apparatus and the processing apparatus in accordance with a predetermined protocol; and a process control step of acquiring a first processable condition, under which the target information is processable to the processing apparatus, and controlling the client processing step so that the processing apparatus is allowed to perform the process on the target information in accordance with the first processable condition.

Additionally, there is provided according to another aspect of the present invention a program to cause a terminal to execute a procedure wherein the terminal is connected to a management apparatus managing target information and a processing apparatus processing the target information via a communication line, the procedure including: a client processing step of controlling transmission of a process request to request a process to the management apparatus and the processing apparatus and receipt of a process response corresponding to the process request from the management apparatus and the processing apparatus in accordance with a predetermined protocol; and a process control step of acquiring a first processable condition, under which the target information is processable to the processing apparatus, and controlling the client processing step so that the processing apparatus is allowed to perform the process on the target information in accordance with the first processable condition.

According to one aspect of the present invention, the terminal can operate corresponding to the program stored in the recording medium.

Additionally, there is provided according to another aspect of the present invention a Web service providing apparatus, including: an information management part managing target information; a condition notification part, in response to receipt of a request to acquire a second processable condition regarding on the target information from a terminal connected to the Web service providing apparatus via a communication line, informing the terminal of the second processable condition; and a service providing part, in response to receipt of a request to acquire the target information in accordance with the first processable condition, which is within the second processable condition, from the processing apparatus, providing the target information, which is acquired from the information management part, to the processing apparatus.

In an embodiment of the present invention, the Web service providing apparatus may further include; a program including the condition notification part and the service providing part; a control service managing a hardware resource used in the process; and an operating system controlling the program and the control service.

In an embodiment of the present invention, the Web service providing apparatus may further include; a process request interpretation part interpreting the process request to request the process in accordance with a predetermined protocol; and a process response creation part creating a process response to indicate a result of the process in accordance with the predetermined protocol.

In an embodiment of the present invention, the process request interpretation part may interpret a process request, which is received from the terminal, to acquire a processable condition regarding the target information, and the process response creation part may create a process response to indicate the second processable condition.

According to one aspect of the present invention, the management apparatus can send the target information to the processing apparatus corresponding to a request to acquire the target information in accordance with the first processable condition, which is within the second processable condition sent to the terminal. The management apparatus can be controlled to send the target information to the processing apparatus in accordance with the first processable condition.

Additionally, there is provided according to another aspect of the present invention a method of providing a Web service, the method including: an information management step of managing target information; a condition notification step, in response to receipt of a request to acquire a second processable condition regarding on the target information from a terminal connected via a communication line, informing the terminal of the second processable condition; and a service providing step, in response to receipt of a request to acquire the target information in accordance with the first processable condition, which is within the second processable condition, from the processing apparatus, providing the target information, which is acquired from the information management part, to the processing apparatus.

Additionally, there is provided according to another aspect of the present invention a Web service providing apparatus, including: a condition notification part, in response to receipt of a request to acquire a third processable condition regarding target information managed by a management apparatus from a terminal connected to the Web service providing apparatus via a communication line, informing the terminal of the third processable condition; a process request interpretation part interpreting a process request to perform a process on the target information in accordance with a first processable condition, which is within the third processable condition received from the terminal in accordance with a predetermined protocol; and a process response creation part creating a process response to indicate a result of the process in accordance with the predetermined protocol.

In an embodiment of the present invention, the Web service providing apparatus may further include: a process request creation part creating the process request to acquire the target information in accordance with the first processable condition in accordance with the predetermined protocol; and a process response interpretation part interpreting the process response indicate the target information received from the management apparatus in accordance with the predetermined protocol.

According to one aspect of the present invention, the processing apparatus performs a process on the target information in accordance with the first processable condition, it is possible to provide a process result to the terminal.

Additionally, there is provided according to another aspect of the present invention a method of providing a Web service, including: a condition notification step, in response to receipt of a request to acquire a third processable condition regarding target information managed by a management apparatus from a terminal connected via a communication line, of informing the terminal of the third processable condition; a process request interpretation step of interpreting a process request to perform a process on the target information in accordance with a first processable condition, which is within the third processable condition received from the terminal in accordance with a predetermined protocol; and a process response creation part of creating a process response to indicate a result of the process in accordance with the predetermined protocol.

According to one aspect of the present invention, it is possible to perform some process, such as printing and copying operations, on a target document, which is stored in a document transmitter apparatus, in a document receiver apparatus based on a processable document type in cooperation with the document transmitter apparatus, the document receiver apparatus and the terminal.

Other objects, features and advantages of the present invention will become more apparent from the following detailed description when read in conjunction with the accompanying drawings.

BRIEF DESCRIPTION OF THE DRAWINGS

FIG. 8 is a diagram illustrating an exemplary operation of a second document copying process for a second pattern according to the first embodiment;

FIG. 9 is a diagram illustrating an exemplary operation of a third document copying process for a third pattern according to the first embodiment;

FIG. 10 is a diagram illustrating an exemplary HTTP request for a document copying request command using a ticket according to the first embodiment;

FIG. 11 is a diagram illustrating an exemplary HTTP response corresponding to the document copying request command using a ticket according to the first embodiment;

FIG. 12 is a diagram illustrating an exemplary HTTP request for an acquirable document type list request command according to the first embodiment;

FIG. 13 is a diagram illustrating an exemplary HTTP response corresponding to the acquirable document type list request command according to the first embodiment;

FIG. 14 is a diagram illustrating an exemplary HTTP request for a page image request command according to the first embodiment;

FIG. 15 is a diagram illustrating an exemplary HTTP response corresponding to the page image request command according to the first embodiment;

FIG. 29 is a diagram illustrating an exemplary operation of a second document copying process for a second pattern according to the third embodiment;

FIG. 30 is a diagram illustrating an exemplary operation of a third document copying process for a third pattern according to the third embodiment;

FIG. 31 is a diagram illustrating an exemplary HTTP request for a document writing request command using a ticket according to the third embodiment;

FIG. 32 is a diagram illustrating an exemplary HTTP response corresponding to the document writing request command according to the third embodiment;

FIG. 33 is a diagram illustrating an exemplary HTTP request for a writable document type list request command according to the third embodiment;

FIG. 34 is a diagram illustrating an exemplary HTTP response corresponding to the writable document type list request command according to the third embodiment;

FIG. 35 is a diagram illustrating an exemplary HTTP request for a page image writing request command according to the third embodiment;

FIG. 36 is a diagram illustrating an exemplary HTTP response corresponding to the page image writing request command according to the third embodiment;

FIG. 37 is a diagram illustrating an exemplary copying manipulation screen according to the third embodiment;

FIG. 44 is a diagram illustrating an exemplary operation of a PULL type document copying process according to the fourth embodiment;

FIG. 45 is a diagram illustrating an exemplary HTTP request for an acquirable document type list request command according to the fourth embodiment;

FIG. 46 is a diagram illustrating an exemplary HTTP response corresponding to the acquirable document type list request command according to the fourth embodiment;

FIG. 47 is a diagram illustrating an exemplary HTTP request for a document copying request command according to the fourth embodiment;

FIG. 48 is a diagram illustrating an exemplary HTTP response corresponding to the document copying request command according to the fourth embodiment;

FIG. 49 is a diagram illustrating an exemplary HTTP request for a page image request command according to the fourth embodiment;

FIG. 50 is a diagram illustrating an exemplary HTTP response corresponding to the page image request command according to the fourth embodiment;

FIG. 51 is a diagram illustrating an exemplary operation of a PUSH type document copying process according to the fourth embodiment;

FIG. 52 is a diagram illustrating an exemplary HTTP request for a page image writing request command according to the fourth embodiment;

FIG. 53 is a diagram illustrating an exemplary HTTP response for the page image writing request command according to the fourth embodiment;

FIG. 54 is a diagram illustrating an exemplary structure of a network system according to a fifth embodiment of the present invention;

FIG. 56 is a diagram illustrating an exemplary operation of a PULL type document printing sequence according to the fifth embodiment.

DETAILED DESCRIPTION OF THE PREFERRED EMBODIMENTS

In the following, embodiments of the present invention will be described with reference to the accompanying drawings.

A description is given, with reference to FIG. 1 through FIG. 19, of an image forming apparatus having a plurality of image forming functions according to a first embodiment of the present invention.

First, an exemplary functional structure of an image forming apparatus according to the first embodiment is described with reference to FIG. 1.

Figure 1:
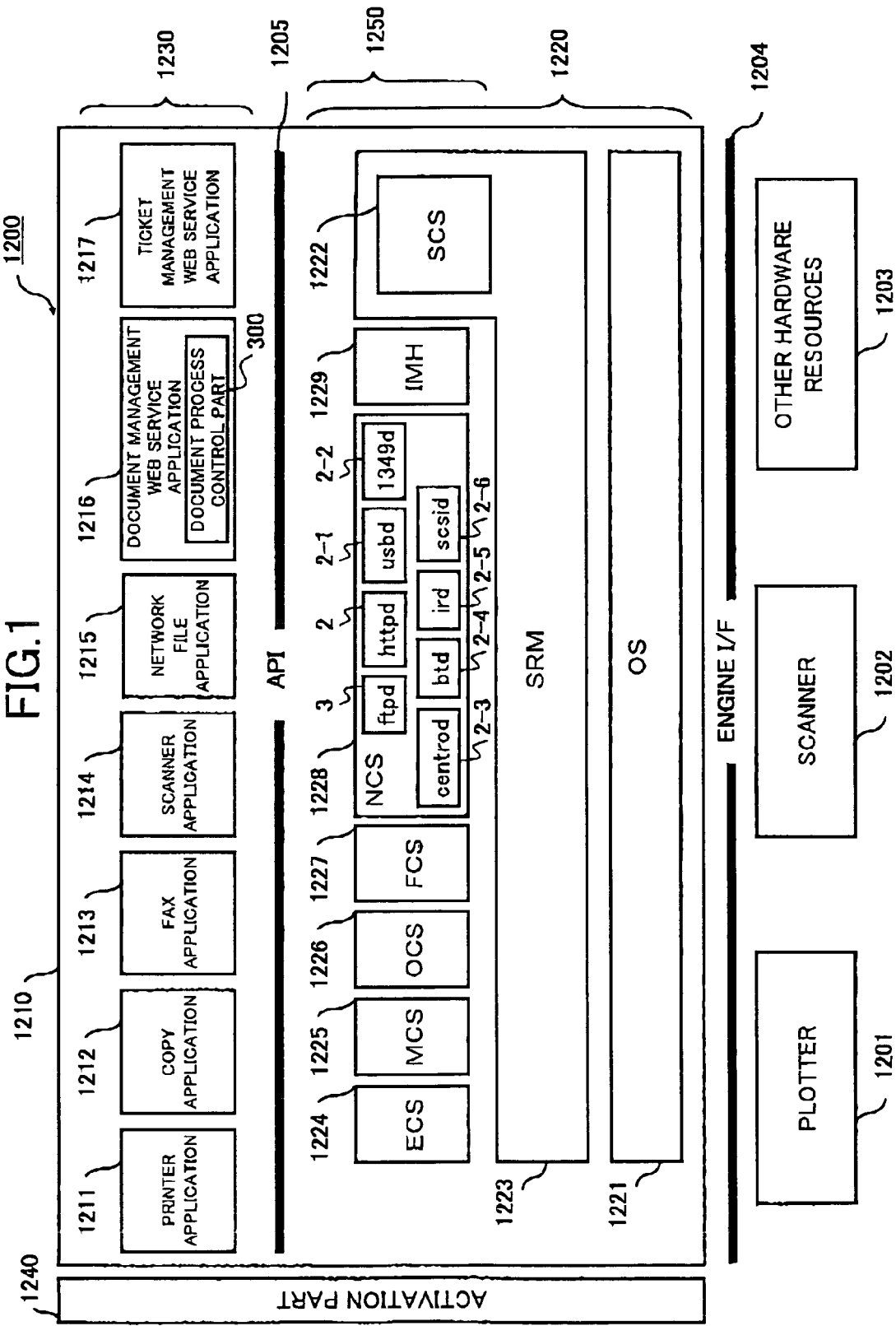
FIG. 1 is a block diagram illustrating an exemplary functional structure of an image forming apparatus having a plurality of image forming functions according to the present invention.

FIG. 1 is a block diagram illustrating an exemplary functional structure of an image forming apparatus 1200 having a plurality of image forming functions according to the first embodiment.

Referring to FIG. 1, the image forming apparatus 1200 comprises a plotter 1201, a scanner 1202, other hardware resources 1203, an engine interface 1204, a software set 1210 and an activation part 1240. The plotter 1201 and the scanner 1202 are hardware resources to perform printing processes and scanning processes, respectively. The software set 1210 comprises a platform 1220 and an application set 1230.

When the image forming apparatus 1200 is powered ON, the activation part 1240 first activates the platform 1220, the application set 1230 and other components.

The software set 1210 further includes an application program interface (API) 1205 serving as an interface between the application set 1230 and the platform 1220. The platform 1220 comprises a control service 1250, a system resource manager (SRM) 1223 and an operating system (OS) 1221. The control service 1250, in response to receipt of a process request from the application set 1230 via API 1205, interprets the process request and then requests a hardware item corresponding to the process request. SRM 1223 manages one or more hardware items in order to arrange the request issued by the control service 1250.

The control service 1250 comprises a plurality of service modules as illustrated in FIG. 1. Specifically, the control service 1250 comprises a system control service (SCS) 1222, an engine control service (ECS) 1224, a memory control service (MCS) 1225, an operation panel control service (OCS) 1226, a FAX control service (FCS) 1227, a network control service (NCS) 1228 and an imaging memory handler (IMH) 1229.

OS 1221, which is implemented by one of operating systems such as UNIX®, executes individual software items of the platform 12200S 1221 can execute individual applications of the application set 1230 as separate processes in parallel. If the image forming apparatus 1200 uses the open source UNIX® as OS 1221, it is possible to assure safety of programs in the image forming apparatus 1200. In addition, since the image forming apparatus 1200 can be connected to a network, it is possible to acquire a new source code of UNIX®, for example, when there occurs a significant change on an original source code, through the network without difficulty. Furthermore, it is unnecessary to pay royalties for UNIX®-based OS and TCP/IP. For this reason, UNIX®-based image forming apparatuses can be easily outsourced. In addition, UNIX®-based OS 1221 differs from operating systems installed in personal computers (PC) with respect to management mechanisms of hardware resources to process images. In detail, UNIX®-based OS 1221 is capable of directly controlling hardware items in the image forming apparatus. On the other hand, although PC is capable of controlling connected image forming devices such as a scanner and a printer, PC cannot directly control hardware resources installed in such image forming devices.

SRM 1223, together with SCS 1222, performs system control and resource management on the image forming apparatus 1200. When SRM 1223 receives requests to use the plotter 1201, the scanner 1202, a memory, a hard disk (HDD), and a host I/O device such as centronics I/F, a network I/F, an IEEE1394 I/F, an RS232 I/F from upper components thereof, SRM 1223 arranges hardware resources and controls execution of the hardware resources corresponding to these requests.

Specifically, SRM 1223 determines whether or not a requested hardware item is currently available, that is, whether or not the requested hardware item is not being used for another request. If the requested hardware item is determined to be currently available, SRM 1223 informs the upper component issuing the request that the requested hardware item is currently available. Alternatively, when SRM 1223 receives requests, such as paper feeding, image forming, memory reservation, file creation, from an upper component thereof, SRM 1223 may make an utilization schedule of requested hardware resources and directly fulfill the requests by itself.

SCS 1222 can perform a plurality of functions such as an application management function (Function #1), an operation part control function (Function #2), a system screen display function (Function #3), an LED (Light Emitting Diode) display function (Function #4), a resource management function (Function #5) and an interrupt application control function (Function #6).

Specifically, the application management function (Function #1) informs existing applications of both registration of a new application and information regarding the newly registered application. The operation part control function (Function #2) provides an application with authorization on exclusive use of the operation part. The system screen display part (Function #3), in response to receipt of a request from such an authorized application, displays various types of alarm screens corresponding to the current status of the engine part. The LED display function (Function #4) controls displaying on system LED tools such as an alarm LED and an application key. The resource management function (Function #5) arranges occupation of exclusively used engine resources (a scanner, a stapling tool and so on) during execution of an application's job. The interrupt application control function (Function #6) assigns higher priority to execution of a certain application.

ECS 1224 controls the engine part comprising the plotter 1201, the scanner 1202 and other resources 1203. Specifically, ECS 1224 reads an image, prints out an image, informs the current status of the image forming apparatus, recovers jam trouble, and so on.

MCS 1225 controls memories. Specifically, MCS 1225 acquires and releases a memory area for an image, utilizes a hard disk device, and compresses/decompresses image data.

OCS 1226 controls an operation panel that works as communication means for communicating information between a user and the system controller of the image forming apparatus 1200. Specifically, OCS 1226 informs the system controller of a key manipulation event given by the user, offers library functions whereby each application can construct GUI (Graphical User Interface), manages constructed GUI information for individual applications, and displays the latest information on the operation panel.

FCS 1227 offers API 1205 to transmit and receive data to/from applications by means of a facsimile via PSTN/ISDN (Public Switched Telephone Network/Integrated Services Digital Network), to register/cite various types of FAX data managed by a backup SRAM (BKM), to read FAX data, to print out received FAX data, and to provide a multiple FAX transmission scheme where an Internet FAX or the like can be selectively used.

NCS 1228 offers services commonly available to applications that need a network I/O. Specifically, NCS 1228 distributes data received from the network side in accordance with individual protocols to the corresponding applications. In addition, when the applications send data to the network side, NCS 1228 acts as an intermediary agent between applications and the network side NCS 1228 at least includes a httpd (Hypertext Transfer Protocol Daemon) 2 to control communications between the image processing apparatus 1200, a usbd (Universal Serial Bus Daemon) 2-1 to control communication via USB (Universal Serial Bus) connection, 1349d (Daemon) 2-2 to control communication via IEEE1349s, a centrod (Centronics Daemon) 2-3 to control communication via centronic connection, a brts (Bluetooth Daemon) 2-4 to control communication via bluetooth connection, an ird (Infrared Daemon) 2-5 to control infrared communication, a scsid (SCSI Daemon) 2-6 to control communication via SCSI connection, and external apparatuses connected via networks and a ftpd (File Transfer Protocol Daemon) 3.

IMH 1229 maps image data from a virtual memory area to a physical memory area. Specifically, IMH 1229 provides a system call in response to starting of a process, maps a virtual memory area for the process, and releases the mapped virtual memory area in response to termination of the process.

The application set 1230 comprises a printer application 1211, a copy application 1212, a FAX application 1213, a scanner application 1214, a network file application 1215, a document management Web service application 1216 and a ticket management Web service application 1217. The printer application 1211 is for a printer having PDL (Page Description Language), PCL (Printer Control Language) and PS (PostScript), as appreciated by those skilled in the art. The copy application 1212, the FAX application 1213, the scanner application 1214 and the network file application 1215 are for a copier, a facsimile, a scanner and a network file, respectively. The document management Web service application 1216 includes a document process control part 300 to control a sequence of processes for performing cooperation with other apparatuses. The ticket management Web service application 1217 issues and manages a ticket for each document process. The entities of these applications 1211 through 1217 are screen display control programs to control a screen and keys and to create jobs through execution of processes on the platform 1220. Here, a new application may be installed via a network connected to NCS 1228. Also, such applications installed in the image forming apparatus 1200 can be separately added or deleted.

In the image forming apparatus 1200, the platform 1220 is responsible to collectively control processes commonly performed for the applications as described above.

Figure 2:
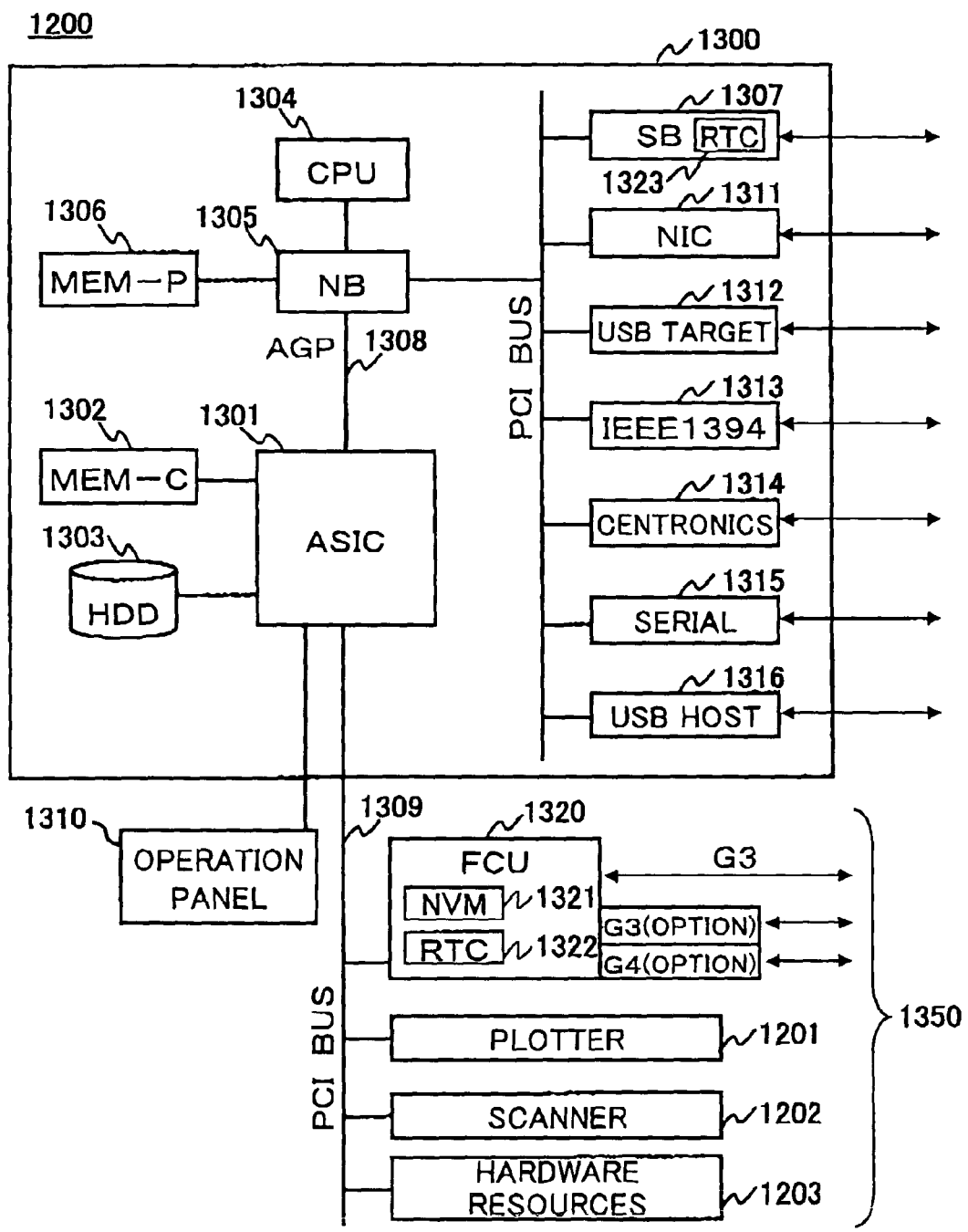
FIG. 2 is a block diagram illustrating an exemplary hardware configuration of the image forming apparatus shown in FIG. 1.

A description is given, with reference to FIG. 2, of a hardware configuration of the image forming apparatus 1200 according to the present invention.

FIG. 2 is a block diagram illustrating an exemplary hardware configuration of the image forming apparatus 1200 shown in FIG. 1.

Referring to FIG. 2, the image forming apparatus 1200 comprises a controller 1300, an operation panel 1310, and an engine part 1350. The engine part 1350 comprises a FCU (FAX control Unit) 1320, a plotter 1201, a scanner 1202, and other hardware resources 1203. In the image forming apparatus 1200, these individual components of the engine part 1350 and ASIC (Application Specific Integrated Circuit) 1301 of the controller 1300 are connected to each other via a PCI (Peripheral Component Interconnect) bus 1309

FCU 1320 comprises a nonvolatile memory (NVM) 1321 to store received fax data, and RTC (Real Time Clock) to measure time within FCU 1320. FCU 1320 transmits and receives fax data in accordance with G3 standard, as appreciated by those skilled in the art FCU 1320 may further include a G3 option and a G4 option.

The controller 1300 comprises ASIC 1301, MEM-C 1302, HDD (Hard Disk Drive) 1303, CPU (Central Processing Unit) 1304, NB (North Bridge) 1305, MEM-P 1306, SB (South Bridge) 1307 and AGP (Accelerated Graphics Port) 1308, each of which will be well-known by those skilled in the art, as illustrated in FIG. 2.

In the controller 1300, MEM-C 1302 and HDD 1303 are connected to ASIC 1301, and ASIC 1301 is connected to CPU 1304 via NB 1305 of a CPU chip set. NB 1305 is used because any interface of CPU 1304 is not disclosed.

ASIC 1301 and NB 1305 are connected via not PCI 1309 but AGP 1308. AGP 1308 is intended to prevent performance reduction. Since the image forming apparatus 1200 executes and controls a plurality of processes for the platform 1220 and the application set 1230 as illustrated in FIG. 1, there is a risk that the performance of the image forming apparatus 1200 may be lowered due to use of low-speed PCI.

CPU 1304 controls overall operations of the image forming apparatus 1200. Specifically, CPU 1304 executes SCS 1222, SRM 1223, ECS 1224, MCS 1225, OCS 1226, FCS 1227 and NCS 1228, which constitutes the platform 1220, as individual processes on OS 1221. Also, CPU 1304 executes the printer application 1211, the copier application 1212, the FAX application 1213, the scanner application 1214, the network file application 1215, the document management Web service application 1216 and the ticket management Web service application 1217, which constitute the application set 1230.

NB 1305 serves as a bridge to connect between CPU 1304 and each component of MEM-P 1306, SE 1307 and ASIC 1301 MEM-P 1306 is a system memory used as graphic memory of the image forming apparatus 1200. MEM-C 1302 is a local memory used as a copier image buffer and a code buffer. ASIC 1301 is an IC (Integrated Circuit) dedicated to image processing having image forming hardware components.

SB 1307 serves as a bridge to connect between NB 1305 and ROM (Read Only Memory), PCI devices and peripheral devices (not illustrated). SB 1307 comprises RTC (Real Time Clock) 1323 to measure time within the controller 1300. Furthermore, SB 1307 comprises a USB host. In this case, image data can be imported by connecting to a camera via a USB. Also, data can be received from another USB target.

In the image forming apparatus 1200, data that are transmitted and received via the ports of SB 1307, NIC 1311, a USB target 1312, IEEE1394, a centronics 1314, a serial 1315, a USB host 1316, FCU standard G3, a G3 option, and a G4 option are stored in HDD 1303 and comprehensively managed therein. HDD 1303 is used as storage means for storing image data, programs, font data and form data.

The operation panel 1310 accepts an input manipulated by an operator and shows an operator some information.

ASIC 1301 includes RAM (Random Access Memory) interface with MEM-C 1302 and a hard disk interface with HDD 1303. When image data are input/output in/from these storage means, the image data are transmitted/received via the RAM interface or the hard disk interface.

AGP 1308 serves as a bus interface for a graphics accelerator card proposed to improve the speed of graphic processing. AGP 1308 realizes a high-speed graphics accelerator card by directly accessing a system memory at a high throughput.

A description is given, with reference to the FIG. 3 through FIG. 19, of a copying process performed by the image forming apparatus 1200 according to a first embodiment of the present invention. In the first embodiment, the image forming apparatus 1200 performs the copying process, which is an embodiment of a Web service, on document data or image data in cooperation with other apparatuses connected via a network. Here, a Web service means that the image forming apparatus 1200 according to the first embodiment, in response to receipt of a service request in the form of an HTTP request from other apparatuses connected via a network, performs a process corresponding to the service request and provides the process result as an HTTP response to the apparatus requesting the service.

Figure 3:
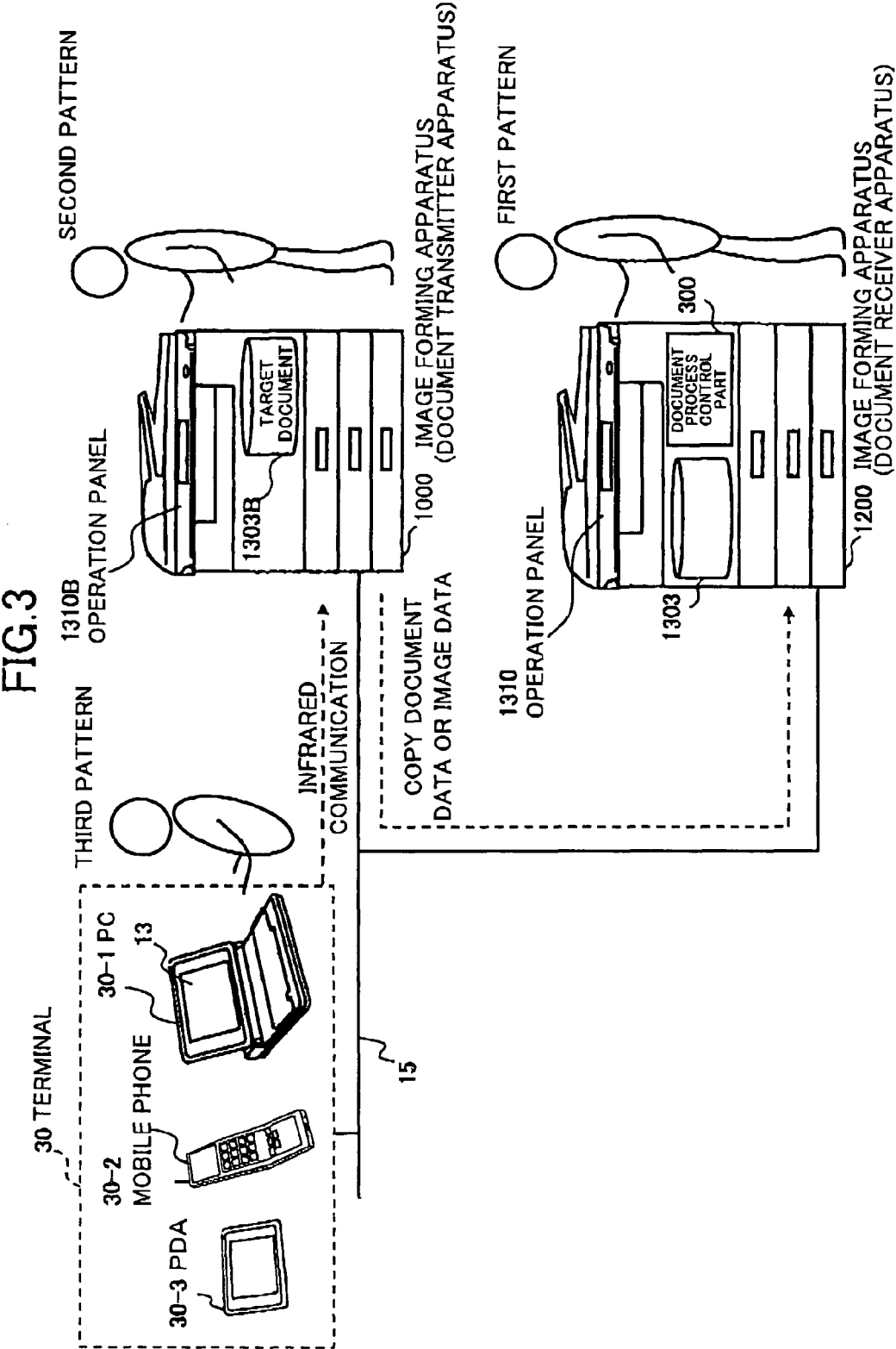
FIG. 3 is a diagram illustrating an exemplary structure of a network system according to a first embodiment of the present invention.

A description is given, with reference to FIG. 3, of how the image forming apparatus 1200 according to the first embodiment provides a Web service to other apparatuses connected via a network.

FIG. 3 shows an exemplary structure of a network system according to the first embodiment. In the illustrated network system, the image forming apparatus 1200, an image forming apparatus 1000 having the fundamentally same functions as the image forming apparatus 1200, and a terminal 30 are connected to each other via a network 15. The image forming apparatus 1000 does not have to include the document process control part 300 in the document management Web service application 1216 shown in FIG. 1.

Referring to FIG. 3, document data or image data (hereinafter which are collectively referred to as a document) stored in HDD 1303B of the image forming apparatus 1000 are copied to the image forming apparatus 1200 in accordance with illustrated three patterns. In this embodiment, the image forming apparatus 1000, which serves as a document transmitter apparatus, sends a document stored therein to the image forming apparatus 1200. On the other hand, the image forming apparatus 1200, which serves as a document receiver apparatus, receives the document from the image forming apparatus 1000, and the document is copied to the image forming apparatus 1200 by storing the document in HDD 1303 of the image forming apparatus 1200.

In the first pattern, a document stored in the image forming apparatus 1000 is copied to the image forming apparatus 1200 through user's manipulation on an operation panel 1310 of the image forming apparatus 1200. In the second pattern, a document stored in the image forming apparatus 1000 is copied to the image forming apparatus 1200 through user's manipulation on an operation panel 1310B of the image forming apparatus 1000. In the third pattern, a document stored in the image forming apparatus 1000 is copied to the image forming apparatus 1200 through user's manipulation on a display part 13 of the terminal 30.

Figure 4:
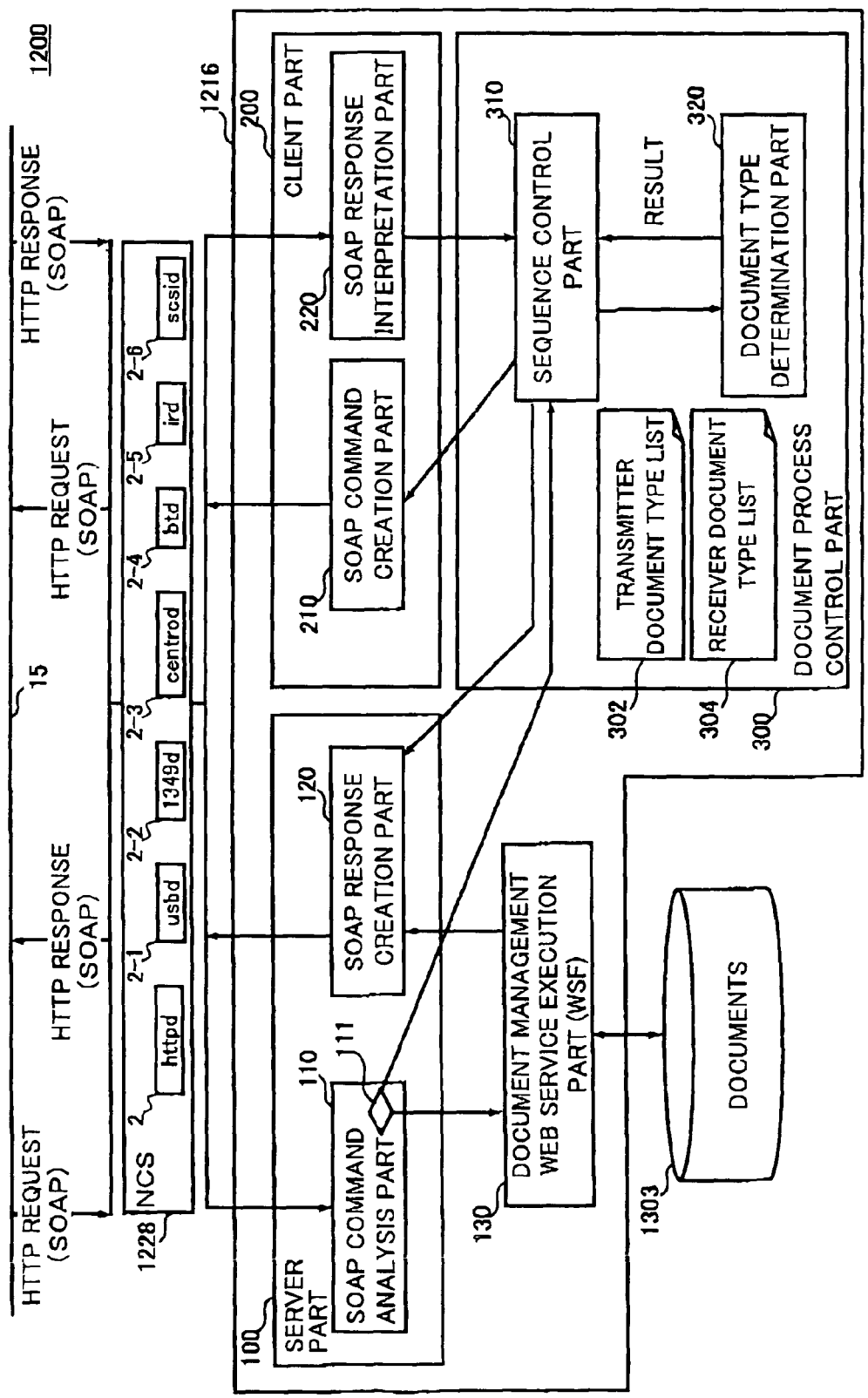
FIG. 4 is a diagram illustrating an exemplary functional structure of an image forming apparatus having a document process control part according to the first embodiment.
Figure 5:
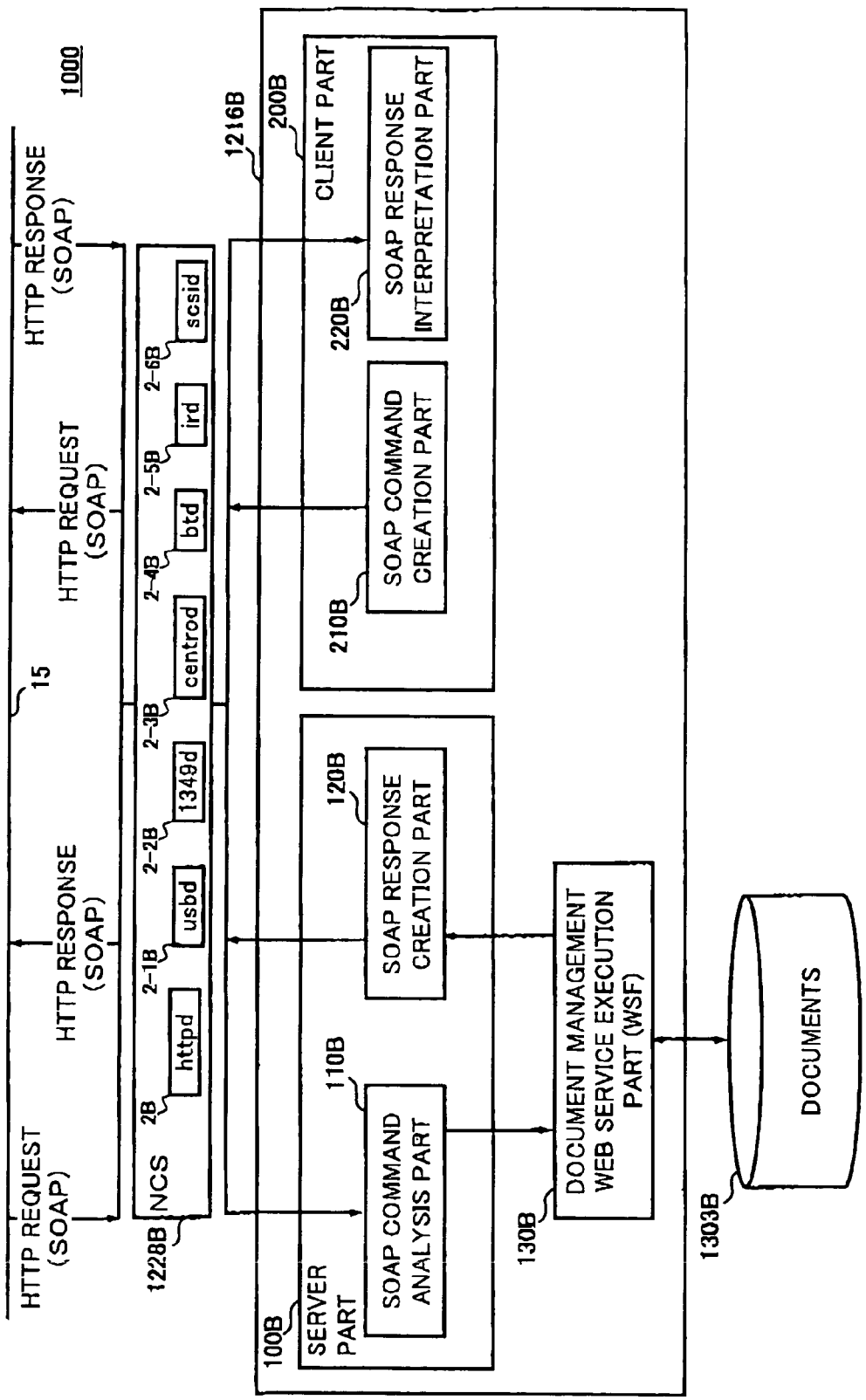
FIG. 5 is a diagram illustrating an exemplary functional structure of an image forming apparatus having no document process control part according to the first embodiment.
Figure 6:
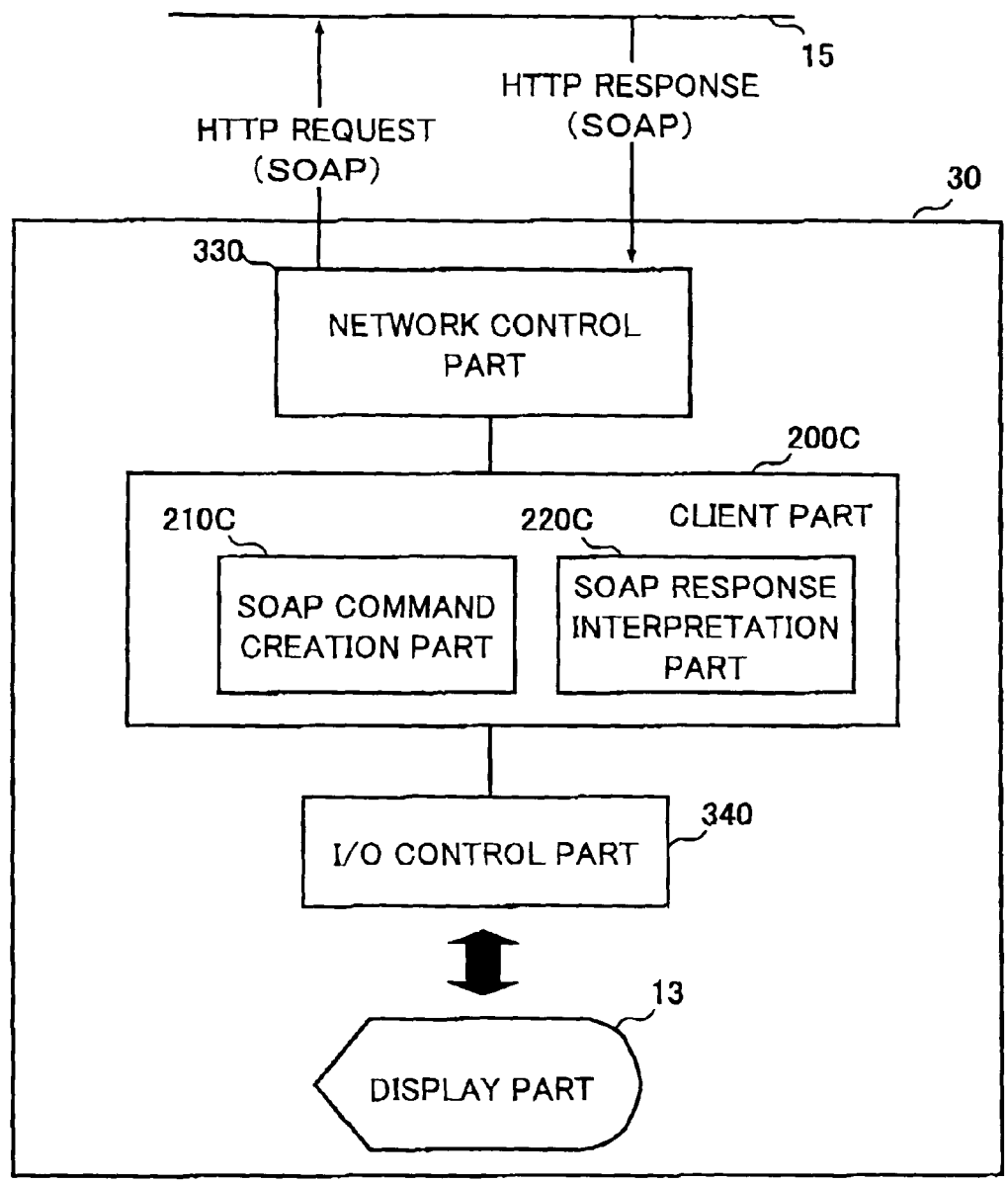
FIG. 6 is a diagram illustrating an exemplary functional structure of a terminal having no document process control part according to the first embodiment.

A description is given, with reference to FIG. 4 through FIG. 6, of functional structures of the image forming apparatuses 1000 and 1200 and the terminal 30.

FIG. 4 shows an exemplary functional structure of the image forming apparatus 1200 having the document process control part 300 according to the first embodiment wherein only primary functional components of the image forming apparatus 1200 are illustrated and the other functional components are omitted.

Referring to FIG. 4, the document management web service application 1216 of the image forming apparatus 1200 comprises a server part 100, a document management Web service execution part (WSF) 130, a client part 200 and a document process control part 300.

The server part 100 controls message exchanges in accordance with SOAP. The document management Web service execution part 130, which serves as a Web service function (WSF) to provide Web services, manages documents by accessing HDD 1303 accommodating the documents. The client part 200 exchanges SOAP messages to request and provide Web services. The document process control part 300, when the client part 200 performs some process on a document in response to notification from the server part 100, controls a sequence of processes associated with cooperation with other connected apparatuses.

The server part 100 comprises a SOAP command analysis part 110 and a SOAP response creation part 120. The SOAP command analysis part 110 analyzes SOAP commands incorporated in HTTP requests The SOAP response creation part 120 creates responses corresponding to the SOAP commands as SOAP messages incorporated in HTTP responses.

When the image forming apparatus 1200 receives an HTTP request, the SOAP command analysis part 110 analyzes a SOAP command incorporated in the HTTP request, and informs the document management Web service execution part 130 what Web service the document management Web service execution part 130 should execute. In response to receipt of the notification from the SOAP command analysis part 110, for example, the document management Web service execution part 130 stores a processed document in HDD 1303, updates and deletes a document stored in HDD 1303, and acquires bibliographic information regarding a document stored in HDD 1303.

The SOAP command analysis part 110 includes a SOAP command determination part 111. The SOAP command determination part 111 extracts a SOAP command from a received HTTP request, and then determines whether the SOAP command is for execution of a predetermined process in cooperation with other apparatuses connected to the image forming apparatus 1200 via the network 15. In such a SOAP command, for example, the image forming apparatus 1200 may be requested to receive a document to be processed from the image forming apparatus 1000 and perform a predetermined process on the document. If the extracted SOAP command is associated with cooperation with other connected apparatuses, the SOAP command determination part 111 informs a sequence control part 310, which is a component of the document process control part 300, of the SOAP command. In the first embodiment, the SOAP command determination part 111 determines whether a SOAP command incorporated in a received HTTP request is a document copying request command to copy a selected document from the image forming apparatus 1000 to the image forming apparatus 1200.

The SOAP response creation part 120, when the SOAP command analysis part 110 requests the document management Web service execution part 130 to process a document, receives a process result of the document management Web service execution part 130, creates a SOAP message to indicate the process result, and uses httpd 2 of NCS 1228 to send the SOAP message as an HTTP response to the network 15. Also, the SOAP response creation part 120 creates a SOAP message corresponding to a process result informed by the sequence control part 310 of the document process control part 300.

The client part 200 comprises a SOAP command creation part 210 and a SOAP response interpretation part 220. The SOAP command creation part 210 creates SOAP messages indicative of process requests in such a way that the SOAP messages are incorporated in HTTP requests. The SOAP response interpretation part 220 interprets SOAP messages incorporated in received HTTP responses.

The document process control part 300 comprises a sequence control part 310 and a document type determination part 320. The sequence control part 310 controls a sequence of processes to copy a document stored in the image forming apparatus 1000 to the image forming apparatus 1200 in cooperation with the image forming apparatus 1000. The document type determination part 320 determines what document type is processable to the image forming apparatus 1000 or 1200.

The sequence control part 310, in response to receipt of a SOAP command associated with cooperation with other apparatuses connected to the image forming apparatus 1200 from the SOAP command analysis part 110 of the server part 100, requests the SOAP command creation part 210 of the client part 200 to acquire a list of document types acquirable from the image forming apparatus 1000. In response to receipt of the acquirable document type list from the SOAP response interpretation part 220, the sequence control part 310 requests the document type determination part 320 to determine a document type processable to the image forming apparatuses 1000 and 1200. Then, the sequence control part 310 instructs the SOAP command creation part 210 to request the image forming apparatus 1000 to send a page image in the format of the determined document type. In response to receipt of the page image from the image forming apparatus 1000 corresponding to the page image request command via the SOAP response interpretation part 220, the sequence control part 310 instructs the SOAP command creation part 210 to internally issue a SOAP command to store the page image in HDD 1303 to the SOAP command analysis part 110 of the server part 100. In response to receipt of the process request from the SOAP command analysis part 110, the document management Web service execution part 130 stores the page image in HDD 1303.

In order to determine the best document type, the document type determination part 320 determines whether there is a processable document type shared in a transmitter document type list 302 and a receiver document type list 304 sent from the sequence control part 310. Here, the transmitter document type list 302 includes document types acquirable from the image forming apparatus 1000. On the other hand, the receiver document type list 304 includes document types writable in the image forming apparatus 1200. The document type determination part 320 informs the sequence control part 310 of the determined document type.

A description is given, with reference to FIG. 5, of a functional structure of the image forming apparatus 1000 according to the first embodiment. In the first embodiment, the image forming apparatus 1000 serves as a document transmitted apparatus to send a document stored therein to the image forming apparatus 1200.

FIG. 5 shows an exemplary functional structure of the image forming apparatus 1000 having no document process control part 300 according to the first embodiment wherein the same parts as those of the image forming apparatus 1200 shown in FIG. 4 are designated by the same reference numerals followed by the letter "B". The image forming apparatus 1000 has the same functional components except that the image forming apparatus 1000 does not have the document process control part 300.

Referring to FIG. 5, a SOAP command analysis part 110B of a server part 100B, in response to receipt of an HTTP request from the image forming apparatus 1200 or the terminal 30 via httpd 2B of NCS 1228B, analyzes a SOAP command incorporated in the HTTP request, and requests a document management Web service execution part 130B, which serves as a Web service function (WSF) to provide Web services, to perform a process corresponding to the SOAP command. A SOAP response creation part 120B of the server part 100B, in response to receipt of a process result of the document management Web service execution part 130B, creates a SOAP response corresponding to the process result, and sends the HTTP response as a Web service to the image forming apparatus 1200 or the terminal 30 via httpd 2B of NCS 1228.

The document management Web service execution part 130B, in response to receipt of the process request from the SOAP command analysis part 110B, the document management Web service execution part 130B acquires a document list, thumbnail data, bibliographic information, a processable document type list or a page image from HDD 1303B, and then sends the acquired information as the process result to the SOAP response creation part 120B.

The SOAP command creation part 210B of the client part 200B, in response to manipulation of a user, issues a process request using a ticket to the image forming apparatus 1200. The SOAP response interpretation part 220B of the client part 200B interprets a process result sent from the image forming apparatus 1200.

A description is given, with reference to FIG. 6, of a functional structure of the terminal 30 having no document process control part 300 according to the first embodiment.

FIG. 6 shows an exemplary functional structure of the terminal 30 having no document process control part 300 according to the first embodiment.

Referring to FIG. 6, the terminal 30, which is embodied, for example, as PC 30-1, a mobile phone 30-2 or PDA (Personal digital Assistant) 30-2, comprises a network control part 330, a client part 200C, an input/output (I/O) control part 340 and a display part 13. The network control part 330 controls communications via the network 15 in accordance with HTTP. The client part 200C controls exchanging of SOAP messages. The I/O control part 340 controls input/output of data between the terminal 30 and a user of the terminal. The display part 13 displays data supplied from the I/O control part 340.

In the terminal 30, a user selects a target document to be copied from listed documents, which are displayed on the display part 13, stored in the image forming apparatus 1000 by means of an input device (not illustrated) such as a mouse or a keyboard, and then designates the image forming apparatus 1200 as an apparatus to which the selected document should be copied. When the user inputs data, the I/O control part 340 sends the data to the SOAP command creation part 210C. Based on the data sent from the I/O control part 340, the SOAP command creation part 210C generates a SOAP command to copy the selected document from the image forming apparatus 1000 to the image forming apparatus 1200, and sends the SOAP command to the network control part 330. The network control part 330 sends the SOAP command as an HTTP request to the image forming apparatus 1200.

The network control part 330, in response to receipt of an HTTP response from the image forming apparatus 1200, sends the HTTP response to the SOAP response interpretation part 220C of the client part 200C. The SOAP response interpretation part 220C extracts a process result from the HTTP response, and sends the process result to the I/O control part 340 so as to display the process result on the display part 13. The I/O control part. 340 displays the process result on the display part 13.

Figure 7:
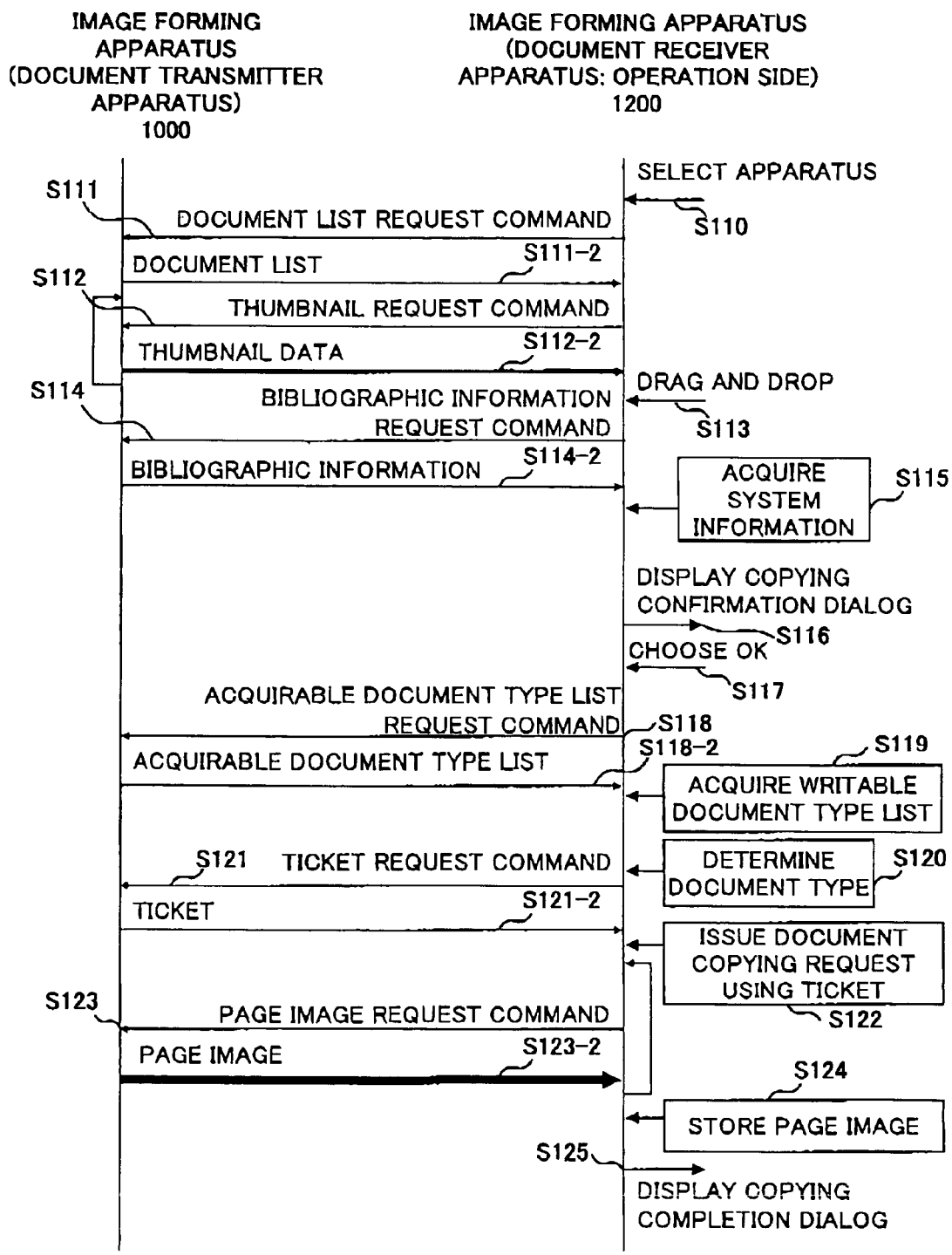
FIG. 7 is a diagram illustrating an exemplary operation of a first document copying process for a first pattern according to the first embodiment.

A description is given, with reference to FIG. 7, of a first document copying process for the above-mentioned first pattern in FIG. 3 according to the first embodiment. In the first pattern, a selected document stored in the image forming apparatus 1000 is copied to the image forming apparatus 1200 through user's manipulation on the operation panel 1310 of the image forming apparatus 1200.

FIG. 7 shows an exemplary operation of the first document copying process for the first pattern according to the first embodiment.

Referring to FIG. 7, a user of the image forming apparatus 1200 selects the image forming apparatus 1000 accommodating a desired document from listed apparatuses, which is displayed on the operation panel 1310, connected to the image forming apparatus 1200 via the network 15 at step S110.

At step S111, the image forming apparatus 1200 sends to the image forming apparatus 1000 a document list request command to request a list of documents stored in the image forming apparatus 1000.

At step S111-2, the image forming apparatus 1000, in response to receipt of the document list request command from the image forming apparatus 1200, uses the document management Web service execution part 130B to acquire the document list from HDD 1303B and sends the document list to the image forming apparatus 1200.

At step S112, the image forming apparatus 1200, in response to receipt of the document list from the image forming apparatus 1000, sends to the image forming apparatus 1000 a thumbnail request command to request thumbnail data to be displayed on the operation panel 1310.

At step S112-2, when the image forming apparatus 1000 receives the thumbnail request command from the image forming apparatus 1200, the document management Web service execution part 130B operates corresponding to the thumbnail request command. Then, the image forming apparatus 1000 sends to the image forming apparatus 1200 the thumbnail data acquired by the document management Web service execution part 130B. For example, the thumbnail data are reduced-size image data of the top pages of documents stored in the image forming apparatus 1000.

At step S113, when the document list of the image forming apparatus 1000 is displayed in thumbnail representation on the operation panel 1310 of the image forming apparatus 1200, the user determines which document should be copied to which apparatus by dragging and dropping a thumbnail of a desired document to a desired apparatus. In this embodiment, the user drags and drops a document stored in the image forming apparatus 1000 to the image forming apparatus 1200.

At step S114, the image forming apparatus 1200 sends to the image forming apparatus 1000 a bibliographic information request command to request bibliographic information regarding the selected document.

At step S114-2, the image forming apparatus 1000, in response to receipt of the bibliographic information request command from the image forming apparatus 1200, uses the document management Web service execution part 130B to acquire the bibliographic information from HDD 1303B and sends the bibliographic information to the image forming apparatus 1200.

At step S115, the image forming apparatus 1200, in response to receipt of the bibliographic information from the image forming apparatus 1000, internally acquires system information regarding the image forming apparatus 1200, and examines feasibility of the copying process using a ticket based on the system information.

At step S116, the image forming apparatus 1200 displays a copying confirmation dialog on the operation panel 1310.

When the user chooses OK to start the copying process at step S117, the sequence control part 310 of the image forming apparatus 1200 starts the copying process in cooperation with the image forming apparatus 1000.

At step S118, the image forming apparatus 1200 send to the image forming apparatus 1000 an acquirable document type list request command to request a list of document types acquirable from the image forming apparatus 1000.

At step S118-2, the image forming apparatus 1000, in response to receipt the acquirable document type list request command from the image forming apparatus 1200, sends the acquirable document type list to the image forming apparatus 1200.

At step S119, the image forming apparatus 1200, in response to receipt of the acquirable document type list from the image forming apparatus 1000, maintains the acquirable document type list as a transmitter document type list 302. Furthermore, the sequence control part 310 of the image forming apparatus 1200 internally issues a writable document type list request command to request a list of document types writable in the image forming apparatus 1200, and sets the writable document type list as a receiver document type list 304.

At step S120, the sequence control 310 of the image forming apparatus 1200 uses the document type determination part 320 to determine whether or not there is a document type acquirable from the image forming apparatus 1000 and writable in the image forming apparatus 1200 based on the transmitter document type list 302 and the receiver document type list 304, and then determines the best document type. Based on the determination, if there are a plurality of such document types, the document type determination part 320 determines one of the document types as the best document type. If there is no such a document type, the document type determination part 320 determines a predetermined document type as the best document type. Then, the sequence control part 310 instructs the SOAP command creation part 210 to send to the image forming apparatus 1200 a ticket request command as a SOAP command.

At step S121, the image forming apparatus 1200 sends to the image forming apparatus 1000 such a ticket request command to request a ticket to use the selected document.

At step S121-2, the image forming apparatus 1000, in response to receipt of the ticket request command from the image forming apparatus 1200, sends the ticket to the image forming apparatus 1200 so that the image forming apparatus 1200 can perform the copying process for the image forming apparatus 1000 through the ticket management Web service application 1217.

At step S122, the image forming apparatus 1200, in response to receipt of the ticket from the image forming apparatus 1000, internally issues a document copying request to copy the selected document stored in the image forming apparatus 1000 by authority of the ticket. Namely, the image forming apparatus 1200 creates a document copying request command as a SOAP command issued to the image forming apparatus 1200 itself.

At step S123, the image forming apparatus 1200, in response to receipt of the internally issued document copying request command, sends to the image forming apparatus 1000 a page image request command to request a page image in the format of the determined document type designated in the ticket in the page image request command.

At step S123-2, the image forming apparatus 1000, in response to receipt of the page image request command from the image forming apparatus 1200, sends to the image forming apparatus 1200 a page image of the selected document in the format of the document type. In the page image request command, for example, a plurality of page images of the selected document may be designated. Alternatively, whenever the image forming apparatus 1200 receives each page image from the image forming apparatus 1000, the image forming apparatus 1200 may iteratively send to the image forming apparatus 1000 a page image request command for the next page image.

At step S124, the image forming apparatus 1200 stores the page image sent from the image forming apparatus 1000 in HDD 1303.

At step S125, after storing all page images in HDD 1303, the image forming apparatus 1200 displays on the operation panel 1310 a copying completion dialog to indicate that the copying process has been terminated.

In the image forming apparatus 1200, which serves as the document receiver apparatus, the SOAP command creation part 210 of the client part 200 sets request commands sent to the image forming apparatus 1000 as SOAP commands incorporated in messages of HTTP requests (S111, S112, S114, S118, S121 and S123). The SOAP response interpretation part 220 of the client part 200 extracts HTTP responses for process results corresponding to the HTTP requests.

On the other hand, in the image forming apparatus 1000, which serves as the document transmitter apparatus, the SOAP command analysis part 110B of the server part 100B analyzes received request commands as SOAP commands, and the document management Web service execution part 130B executes processes corresponding to the HTTP requests. The SOAP response creation part 120B of the server part 100B provides the image forming apparatus 1200 with process results of the document management Web service execution part 130B as Web services (S111-2, S112-2, S114-2, S118-2, S121-2 and S123-2).

According to the above-mentioned first document copying process, when a user of the image forming apparatus 1200 having the document process control part 300 selects a document stored in the image forming apparatus 1000, the document can be copied from the image forming apparatus 1000 to the image forming apparatus 1200 by storing the document in HDD 1303 of the image forming apparatus 1200 in an appropriate document type.

A description is given, with reference to FIG. 8, of a second document copying process for the above-mentioned second pattern in FIG. 3 according to the first embodiment. In the second pattern, a selected document stored in the image forming apparatus 1000 is copied to the image forming apparatus 1200 through user's manipulation on the operation panel 1310B of the image forming apparatus 1000.

FIG. 8 shows an exemplary operation of the second document copying process for the second pattern according to the first embodiment.

Referring to FIG. 8, a user of the image forming apparatus 1000 selects the image forming apparatus 1000 accommodating a desired document from listed apparatuses, which is displayed on the operation panel 1310B, connected to the image forming apparatus 1000 via the network 15 at step S130.

At step S131, the image forming apparatus 1000 internally issues a document list request command to request a list of documents stored in the image forming apparatus 1000, and uses the document management Web service execution part 130B to acquire the document list from HDD 1303B.

At step S132, the image forming apparatus 1000, in response to acquisition of the document list, internally issues a thumbnail request command to request thumbnail data to be displayed on the operation panel 1310B, and uses the document management Web service execution part 130B to acquire the thumbnail data. Based on the thumbnail data, the image forming apparatus 1000 displays on the operation panel 1310B the document list in thumbnail representation.

For example, the thumbnail data are reduced-size image data of the top pages of documents stored in the image forming apparatus 1000.

At step S133, when the document list of the image forming apparatus 1000 is displayed in thumbnail representation on the operation panel 1310B of the image forming apparatus 1000, the user determines which document should be copied to which apparatus by dragging and dropping a thumbnail of a desired document to a desired apparatus. In this embodiment, the user drags and drops a document stored in the image forming apparatus 1000 toward the image forming apparatus 1200.

At step S134, the image forming apparatus 1000 internally issues a bibliographic information request command to request bibliographic information regarding the selected document, and uses the document management Web service execution part 130B to acquire the bibliographic information from HDD 1303B.

At step S135, the image forming apparatus 1000 sends to the image forming apparatus 1200 a system information request command to request system information regarding the image forming apparatus 1200.

At step 135-2, the image forming apparatus 1200, in response to receipt of the system information request command from the image forming apparatus 1000, sends to the image forming apparatus 1000 the system information including ticket information to indicate feasibility of the copying process using a ticket.

At step S136, the image forming apparatus 1000, in response to receipt of the system information from the image forming apparatus 1200, displays a copying confirmation dialog on the operation panel 1310B.

When the user chooses OK to start the copying process at step S137, the image forming apparatus 1000 uses the ticket management Web application 1217 to internally issue a ticket at step S138.

At step S139, the image forming apparatus 1000 send to the image forming apparatus 1200 a document copying request command to copy the selected document by authority of the internally issued ticket.

At step S140, the image forming apparatus 1200, in response to receipt of the document copying request command from the image forming apparatus 1000, uses the document process control part 300 to start the copying process in cooperation with the image forming apparatus 1000. Then, the image forming apparatus 1200 sends to the image forming apparatus 1000 an acquirable document type list request command to request a list of document types acquirable from the image forming apparatus 1000.

At step S140-2, the image forming apparatus 1000, in response to receipt of the acquirable document type list request command from the image forming apparatus 1200, sends the acquirable document type list to the image forming apparatus 1200.

At step S141, the image forming apparatus 1200, in response to receipt of the acquirable document type list from the image forming apparatus 1000, maintains the acquirable document type list as a transmitter document type list 302. Furthermore, the sequence control part 310 of the image forming apparatus 1200 internally issues a writable document type list request command to request a list of document types writable in the image forming apparatus 1200, and sets the writable document type list as a receiver document type list 304.

At step S142, the sequence control 310 of the image forming apparatus 1200 uses the document type determination part 320 to determine whether or not there is a document type acquirable from the image forming apparatus 1000 and writable in the image forming apparatus 1200 based on the transmitter document type list 302 and the receiver document type list 304, and then determines the best document type. Based on the determination, if there are a plurality of such document types, the document type determination part 320 determines one of the document types as the best document type. If there is no such a document type, the document type determination part 320 determines a predetermined document type as the best document type.

At step S143, the sequence control part 310 instructs the SOAP command creation part 210 to send to the image forming apparatus 1000 a page image request command using the ticket, in which the determined document type is specified, as a SOAP command.

At step S143-2, the image forming apparatus 1000, in response to receipt of the page image request command from the image forming apparatus 1200, sends to the image forming apparatus 1200 a page image of the selected document in the format of the document type specified in the ticket. In the page image request command, for example, a plurality of page images of the selected document may be designated. Alternatively, whenever the image forming apparatus 1200 receives each page image from the image forming apparatus 1000, the image forming apparatus 1200 may iteratively send to the image forming apparatus 1000 a page image request command for the next page image.

At step S144, the image forming apparatus 1200 stores the page image sent from the image forming apparatus 1000 in HOD 1303.

At step S144-2, after storing all page images in HDD 1303, the image forming apparatus 1200 uses the sequence control part 310 to send a copying completion acknowledge to the image forming apparatus 1000.

At step S145, the image forming apparatus 1000, in response to receipt of the copying completion message from the image forming apparatus 1200, displays on the operation panel 1310B a copying completion dialog to indicate that the copying process has been terminated.

In the image forming apparatus 1200, which serves as the document receiver apparatus, the SOAP command creation part 210 of the client part 200 sets request commands sent to the image forming apparatus 1000 as SOAP commands incorporated in messages of HTTP requests (S140 and S143). The SOAP response interpretation part 220 of the client part 200 extracts HTTP responses for process results corresponding to the HTTP requests. Also, the SOAP command analysis part 110 of the server part 100 analyzes request command received from the image forming apparatus 1000 as SOAP commands, and determines whether the SOAP commands are document copying request commands using a ticket.

On the other hand, in the image forming apparatus 1000, which serves as the document transmitter apparatus, the SOAP command creation part 210B of the client part 200B sets request commands sent to the image forming apparatus 1200 as SOAP commands incorporated in messages of HTTP requests (S135 and S139), and the SOAP response interpretation part 220B of the client part 200B extracts HTTP responses for process results corresponding to the HTTP requests. Also, the SOAP command analysis part 110B of the server part 100B analyzes request commands received from the image forming apparatus 1200 as SOAP commands.

According to the above-mentioned second document copying process, when a user of the image forming apparatus 1000 having no document process control part 300 selects a document stored in the image forming apparatus 1000, the document can be copied from the image forming apparatus

1000 to the image forming apparatus 1200 by storing the document in HDD 1303 of the image forming apparatus 1200 in an appropriate document type.

A description is given, with reference to FIG. 9, of a third document copying process for the above-mentioned third pattern in FIG. 3 according to the first embodiment.

In the third pattern, a selected document stored in the image forming apparatus 1000 is copied to the image forming apparatus 1200 through user's manipulation on the display part 13 of the terminal 30.

FIG. 9 shows an exemplary operation of the third document copying process for the third pattern according to the first embodiment.

Referring to FIG. 9, a user of the terminal 30 selects the image forming apparatus 1000 accommodating a desired document from listed apparatuses, which are displayed on the display part 13, connected to the terminal 30 via the network 15 at step S150.

At step S151, the terminal 30 sends to the image forming apparatus 1000 a document list request command to request a list of documents stored in the image forming apparatus 1000.

At step S151-2, the image forming apparatus 1000, in response to receipt of the document list request command from the terminal 30, uses the document management Web service execution part 130B to acquire the document list from HDD 1303B and sends the document list to the terminal 30.

At step S152, the terminal 30, in response to receipt of the document list from the image forming apparatus 1000, sends to the image forming apparatus 1000 a thumbnail request command to request thumbnail data to be displayed on the display panel 13.

At step S152-2, when the image forming apparatus 1000 receives the thumbnail request command from the terminal 30, the document management Web service execution part 130B operates corresponding to the thumbnail request command. Then, the image forming apparatus 1000 uses the document management Web service execution part 130B to acquire the thumbnail data from HDD 1303B and sends the thumbnail data to the terminal 30. For example, the thumbnail data are reduced-size image data of the top pages of documents stored in the image forming apparatus 1000.

At step S153, when the document list of the image forming apparatus 1000 is displayed in thumbnail representation on the display part 13 of the terminal 30, the user determines which document should be copied to which apparatus by dragging and dropping a thumbnail of a desired document toward a desired apparatus. In this embodiment, the user drags and drops a document stored in the image forming apparatus 1000 toward the image forming apparatus 1200.

At step S154, the terminal 30 sends to the image forming apparatus 1000 a bibliographic information request command to request bibliographic information regarding the selected document.

At step S154-2, the image forming apparatus 1000, in response to receipt of the bibliographic information request command from the terminal 30, uses the document management Web service execution part 130B to acquire the bibliographic information from HDD 1303B and sends the bibliographic information to the terminal 30.

At step S155, the terminal 30, in response to receipt of the bibliographic information from the image forming apparatus 1000, sends to the image forming apparatus 1200 a system information request command to request system information regarding the image forming apparatus 1200.

At step S155-2, the terminal 30, in response to receipt of the system information from the image forming apparatus 1200, examines feasibility of the copying process using a ticket.

At step S156, the terminal 30 displays a copying confirmation dialog on the display part 13.

When the user chooses OK to start the copying process at step S157, the terminal 30 sends to the image forming apparatus 1000 a ticket request command to request a ticket to use the selected document stored in the image forming apparatus at step S158.

At step S158-2, the image forming apparatus 1000, in response to receipt of the ticket request command from the terminal 30, sends the ticket to the terminal 30.

At step S159, the terminal 30, in response to receipt the ticket from the image forming apparatus 1000, sends to the image forming apparatus 1200 a document copying request command to copy the selected document from the image forming apparatus 1000 by authority of the ticket.

At step S160, when the image forming apparatus 1200 receives the document copying request command from the terminal 30, the sequence control part 310 of the image forming apparatus 1200 starts the copying process in cooperation with the image forming apparatus 1000. Then, the image forming apparatus 1200 uses the sequence control part 310 to send to the image forming apparatus 1000 an acquirable document type list request command to request a list of document types acquirable from the image forming apparatus 1000.

At step S160-2, the image forming apparatus 1000, in response to receipt the acquirable document type list request command from the image forming apparatus 1200, sends the acquirable document type list to the image forming apparatus 1200.

At step S161, the image forming apparatus 1200, in response to receipt of the acquirable document type list from the image forming apparatus 1000, maintains the acquirable document type list as a transmitter document type list 302. Furthermore, the sequence control part 310 of the image forming apparatus 1200 internally issues a writable document type list request command to request a list of document types writable in the image forming apparatus 1200, and sets the writable document type list as a receiver document type list 304.

At step S162, the sequence control part 310 of the image forming apparatus 1200 uses the document type determination part 320 to determine whether or not there is a document type acquirable from the image forming apparatus 1000 and writable in the image forming apparatus 1200 based on the transmitter document type list 302 and the receiver document type list 304, and then determines the best document type. Based on the determination, if there are a plurality of such document types, the document type determination part 320 determines one of the document types as the best document type. If there is no such a document type, the document type determination part 320 determines a predetermined document type as the best document type. Then, the sequence control part 310 instructs the SOAP command creation part 210 to send to the image forming apparatus 1000 a page image request command to request a page image of the selected document by authority of the ticket as a SOAP command.

At step S163, the image forming apparatus 1200 sends to the image forming apparatus 1000 the page image request command to request a page image of the selected document in the format of the document type designated in the ticket.

At step S163-2, the image forming apparatus 1000, in response to the page image request command from the image forming apparatus 1200, sends to the image forming apparatus 1200 a page image of the selected document in the format of the designated document type. In the page image request command, for example, a plurality of page images of the selected document may be designated. Alternatively, whenever the image forming apparatus 1200 receives each page image from the image forming apparatus 1000, the image forming apparatus 1200 may iteratively send to the image forming apparatus 1000 a page image request command for the next page image.

At step S164, the image forming apparatus 1200 stores the page image sent from the image forming apparatus 1000 in HDD 1303.

At step S164-2, after storing all page images of the selected document in HDD 1303, the image forming apparatus 1200 sends to the terminal 30, which issues the document copying request command at step S159, a copying completion message to indicate that the copying process has been terminated.

At step S165, the terminal 30, in response to receipt of the copying completion message from the image forming apparatus 1200, displays on display part 13 a copying completion dialog to indicate that the copying process has been terminated.

In the terminal 30, which serves as an operator apparatus, the SOAP command creation part 210C of the client part 200C sets request commands sent to the image forming apparatuses 1000 and 1200 as SOAP commands incorporated in messages of HTTP requests (S151, S152, S154, S155, S158 and S159). The SOAP response interpretation part 220C of the client part 200C extracts HTTP responses for process results corresponding to the HTTP requests.

In the image forming apparatus 1000, which serves as the document transmitter apparatus, the SOAP command analysis part 110B of the server part 100B analyzes request commands received from the terminal 30 and the image forming apparatus 1200 as SOAP commands, and the document management Web service execution part 130B executes processes corresponding to the HTTP requests The SOAP response creation part 120B of the server part 100B provides the image forming apparatus 1200 and the terminal 30 with process results of the document management Web service execution part 130B as Web services (S151-2, S152-2, S154-2 and S158-2).

On the other hand, in the image forming apparatus 1200, which serves as the document receiver apparatus, the SOAP command creation part 210 of the client part 200 sets request commands sent to the image forming apparatus 1000 as SOAP commands incorporated in messages of HTTP requests (S160 and S163). The SOAP response interpretation part 220 of the client part 200 extracts HTTP responses for process results corresponding to the HTTP requests. Also, the SOAP command analysis part 110 of the server part 100 analyzes received request command as SOAP commands, and the SOAP response creation part 120 of the server part 100 provides the terminal 30 with process results corresponding to the SOAP commands as Web services (S155-2 and S164-2).

According to the above-mentioned third document copying process, when a user of the terminal 30 selects a document stored in the image forming apparatus 1000, the document can be copied from the image forming apparatus 1000 to the image forming apparatus 1200 having the document process control part 300 by storing the document in HDD 1303 of the image forming apparatus 1200 in an appropriate document type.

A description is given, with reference to FIG. 10 through FIG. 15, of the above-mentioned individual HTTP requests and the corresponding HTTP responses according to the first embodiment.

FIG. 10 shows an exemplary HTTP request for a document copying request command using a ticket.

Referring to FIG. 10, a code portion 31 indicates a URL (Uniform Resource Locator) to which the HTTP request should be sent by POST method. For example, the URL "netdoc" is designated in the code portion 31. Furthermore, a code portion 32 indicates a URL to indicate the purpose of the HTTP request. For example, the URL "http://foo.bar.com/netdoc/documentmanagement" is described in the code portion 32 to designate document management as the purpose of the HTTP request.

In a code portion 33, a SOAP header is provided to indicate a root element. In a code portion 34, a SOAP body is provided. The code portion 34 includes a code portion 35 ranging from <ns:documentmanagement> to </ns:documentmanagement>. In the code portion 35, a SOAP command to specify a requested process, information referred to for the process and others are described. In the document copying request command using a ticket, a ticket number is specified in a code portion 36 ranging from <ticketId> to </ticketId>, and the SOAP command is specified in a code portion 37 ranging from <operation> to </operation>. For example, "123" and "getFileByTicket" are designated as the ticket number and the SOAP command, respectively, in the illustration.

FIG. 11 shows an exemplary HTTP response corresponding to the HTTP request shown in FIG. 10.

Referring to FIG. 11, a code portion 42 indicates that the HTTP request shown in FIG. 10 has been successfully fulfilled. In a code portion 43, a SOAP header is provided to indicate a root element. In a code portion 44, a SOAP body is provided. The code portion 44 includes a code portion 45 ranging from <ns:documentmanagementResponse> to </ns:documentmanagementResponse>. In the code portion 45, "success" to indicate that the requested process has been successfully terminated is described.

FIG. 12 shows an exemplary HTTP request for an acquirable document type list request command according to the first embodiment. In FIG. 12, the same code portions as those shown in FIG. 10 are designated by the same reference numerals, and the description thereof is omitted.

Referring to FIG. 12, a code portion 34 is the SOAP body of the HTTP request. In a code portion 50 ranging from <operation> to </operation>, a SOAP command "getFileVariation" is designated.

FIG. 13 shows an exemplary HTTP response corresponding to the HTTP request shown in FIG. 12. In FIG. 13, the same code portions as those shown in FIG. 11 are designated by the same reference numerals, and the description thereof is omitted.

Referring to FIG. 13, a code portion 44 is the SOAP body of the HTTP response. In code portions 52, 53 and 54, each of which ranges from <type> to </type>, three document types acquirable from the image forming apparatus 1000 are set. In the code portion 52, a compression format of image data is designated as "Tiff" by sandwiching between <format> and </format>. An image type is designated as "1 bit/dot" by sandwiching between <imageType> and </imageType>. A resolution is designated as "600×600" by sandwiching between <binary> and </binary>. In the code portion 53, a compression format of image data is designated as "Jpeg" by sandwiching between <format> and </format>. An image type is designated as "8 bit/dot" by sandwiching between <imageType> and </imageType>. A resolution is designated as "300×300" by sandwiching between <binary> and </binary>. In the code portion 54, a compression format of image data is designated as "Jpeg2000" by sandwiching between <format> and </format>. An image type is designated as "8 bit/dot" by sandwiching between <imageType> and </imageType>. A resolution is designated as "600×600" by sandwiching between <binary> and </binary>.

When the image forming apparatus 1200 receives such an HTTP response, the SOAP response interpretation part 220 extracts document types from the code portions 52 through 54, and the document types {"Tiff", "1 bit/dot", 600×600}, {"Jpeg", "8 bit/dot", 300×300} and {"Jpeg2000", "8 bit/dot", 600×600} are set as a transmitter document type list 302. On the other hand, for example, when the image forming apparatus 1200 acquires document types {"Tiff", "8 bit/dot", 600×600} and {"Jpeg", "8 bit/dot", 300×300} by internally issuing an acquirable document type list request command, the document types {"Tiff", "8 bit/dot", 600×600} and {"Jpeg", "8 bit/dot", 300×300} are set as a receiver document type list 304. The document type determination part 320 determines whether or not there is a document type commonly included in the transmitter document type list 302 and the receiver document type list 304. In this example, the document type determination part 320 selects the document type {"Jpeg", "8 bit/dot", 300×300}, because only the document type {"Jpeg", "8 bit/dot", 300×300} is commonly included in the transmitter document type list 302 and the receiver document type list 304. The determined document type is set in an HTTP request as illustrated in FIG. 14.

FIG. 14 shows an exemplary HTTP request for a page image request command according to the first embodiment. In FIG. 14, the same code portions as those shown in FIG. 10 are designated by the same reference numerals, and the description thereof is omitted.

Referring to FIG. 14, in a code portion 59, the document type {"Jpeg", "8 bit/dot", 300×300} is specified by sandwiching between <type> and </type>. In addition, in a code portion 60, the SOAP command "getFile(TicketID)" is specified by sandwiching between <operation and </operation>. In the illustrated HTTP request, "Jpeg", "8 bit/dot" and "300×300" are designated as the image data format, the image type and the resolution, respectively. In addition, "getFile(TicketID)" is designated as the SOAP command.

FIG. 15 shows an exemplary HTTP response corresponding to the HTTP request shown in FIG. 14. In FIG. 15, the same code portions as those shown in FIG. 11 are designated by the same reference numerals, and the description thereof is omitted.

Referring to FIG. 15, a code portion 61 indicates that there are a plurality of differently formatted data items in the HTTP response. In code portions 66, "XX_boundary" indicates a boundary between the data items. In a code portion 62, text data information is provided. For example, the text data information may include a text description type, a code type, and the length of the text data. In a code portion 63, "success" is provided between <result> and </result> to indicate that the page image request command has been successfully fulfilled.

On the other hand, in a code portion 64, image data information is provided. For example, the image data information may include an image data type, a transferred data type such as "text" or "binary", and the length of the image data. Subsequently, image data 65 are provided. For example, if the data type is "Tiff" and the transferred data type is "binary", the binary Tiff image data 65 are provided.

In order to copy a document stored in the image forming apparatus 1000, the image forming apparatus 1200 extracts the binary Tiff image data from the HTTP response shown in FIG. 15 and stores the image data in HDD 1303.

In the above description, the HTTP request incorporating image data is sent to the image forming apparatus 1200. However, the image data may be transmitted and received, for example, in accordance with file transfer protocol (ftp3).

In the first embodiment of the present invention, the following SOAP commands are used.

TABLE 1

| SOAP command | Operation |
| --- | --- |
| getList | get a document list |
| getThumbnail | get thumbnail images |
| getFileInfo | get file bibliographic information |
| getSystemInfo | get system information |
| getFileVariation | get an acquirable or writable document type list |
| getCopyTicket | get a ticket to copy a document |
| copyFileByTicket | copy document data through a ticket |
| getFile(TicketID) | get a document corresponding to a ticket |

These SOAP commands are designated by sandwiching between <operation> and </operation> in a SOAP body as described with reference to FIG. 10, FIG. 12 and FIG. 14.

A description is given, with reference to FIG. 16 through FIG. 19, of exemplary screens displayed on the operation panels 1310 and 1310B and the display part 13 according to the first embodiment.

Figure 16:
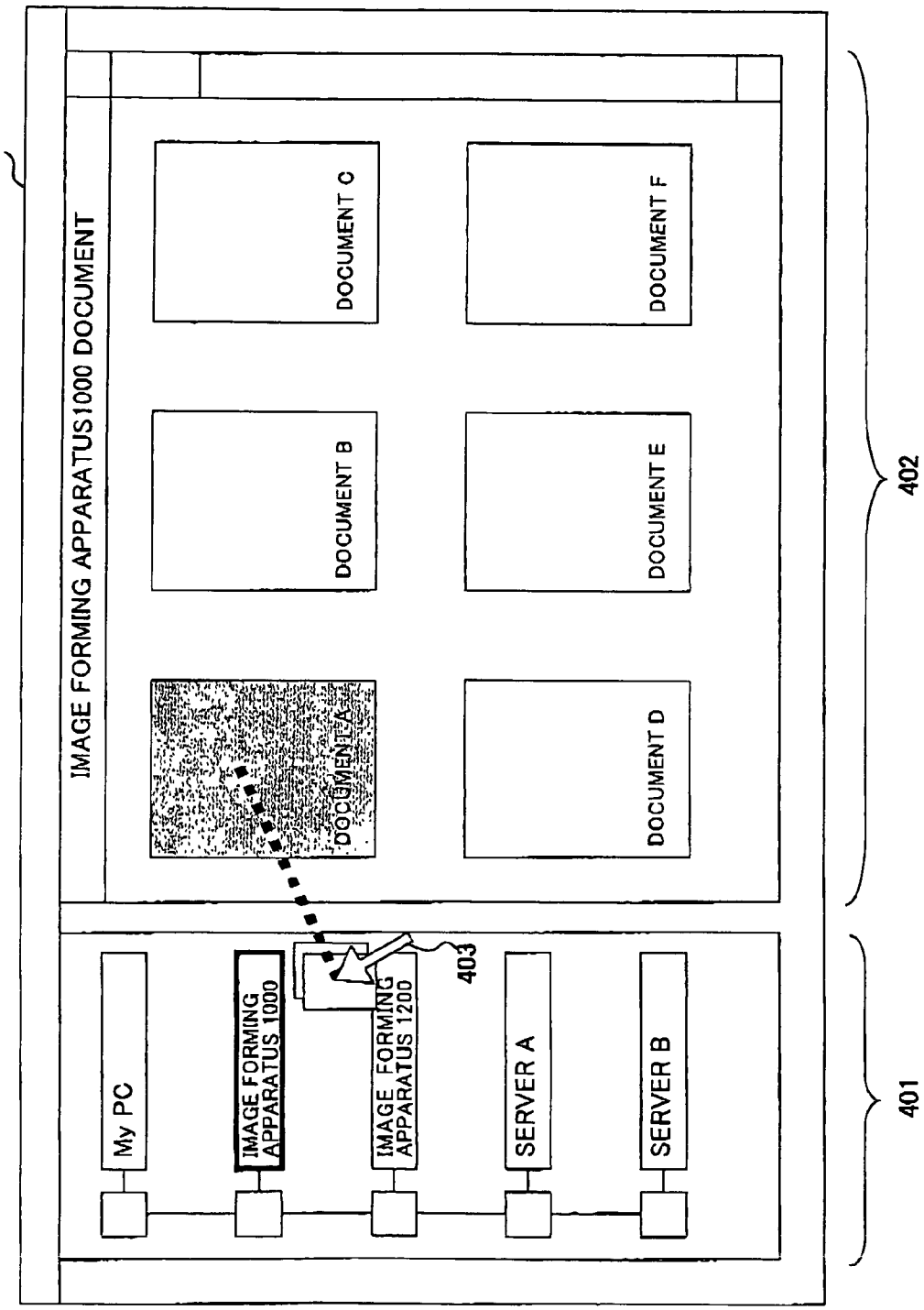
FIG. 16 is a diagram illustrating an exemplary copying manipulation screen according to the first embodiment.

FIG. 16 shows an exemplary copying manipulation screen 400 according to the first embodiment.

Referring to FIG. 16, the copying manipulation screen 400 includes an apparatus list display area 401 to display a list of apparatuses connected to each other via the network 15, and a thumbnail display area 402 to display thumbnails of individual documents stored in an apparatus selected in the apparatus list display area 401.

In the copying manipulation screen 400, for example, when a user selects the image forming apparatus 1000 as a document transmitter apparatus from listed apparatuses displayed on the apparatus list display area 401, a list of documents stored in the image forming apparatus 1000 is displayed in thumbnail representation in the thumbnail display area 402. In the thumbnail display area 402, the user selects a document A and further designates the image forming apparatus 1200 as a document receiver apparatus through user's dragging and dropping operations by means of an arrow 403, as illustrated in FIG. 16. At this time, the user may select a plurality of documents.

Figure 17:
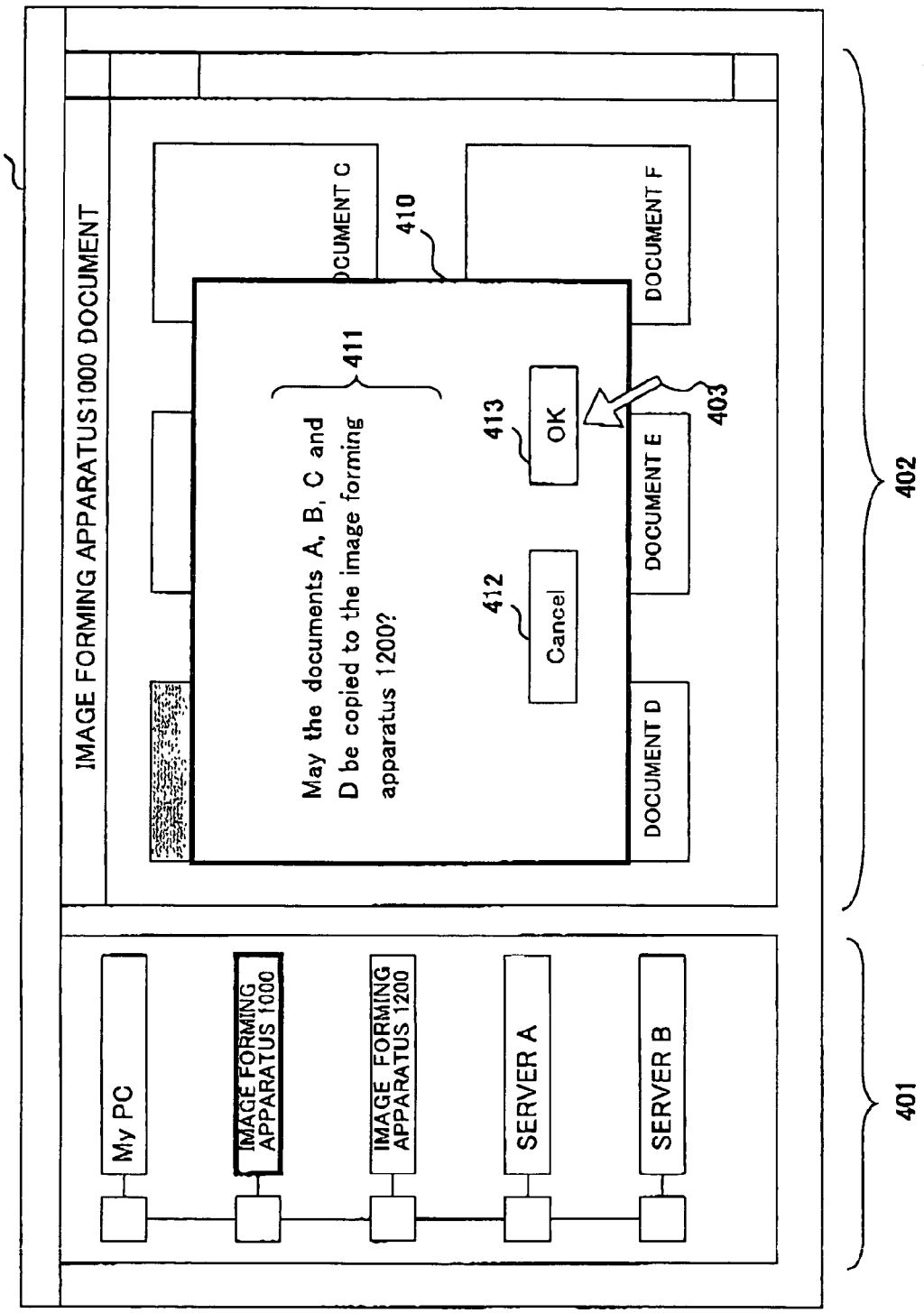
FIG. 17 is a diagram illustrating an exemplary copying confirmation dialog according to the first embodiment.

When the user designates the image forming apparatus 1200 as the document receiver apparatus through the dragging and dropping operations, a copying confirmation dialog is displayed so that the user can confirm the copying process as illustrated in FIG. 17.

FIG. 17 shows an exemplary copying confirmation dialog 410 according to the first embodiment.

Referring to FIG. 17, the copying confirmation dialog 410 includes a message display area 411 to display a message to the user, a cancel button 412 to cancel the copying process, and an OK button 413 to start the copying process.

For example, if the user selects a plurality of documents A, B, C and D in the copying manipulation screen 400 shown in FIG. 16, a message such as "May the documents A, B, C and D be copied to the image forming apparatus 1200?" is displayed in the message display area 411 so that the user can confirm the selected documents and apparatus.

Figure 18:
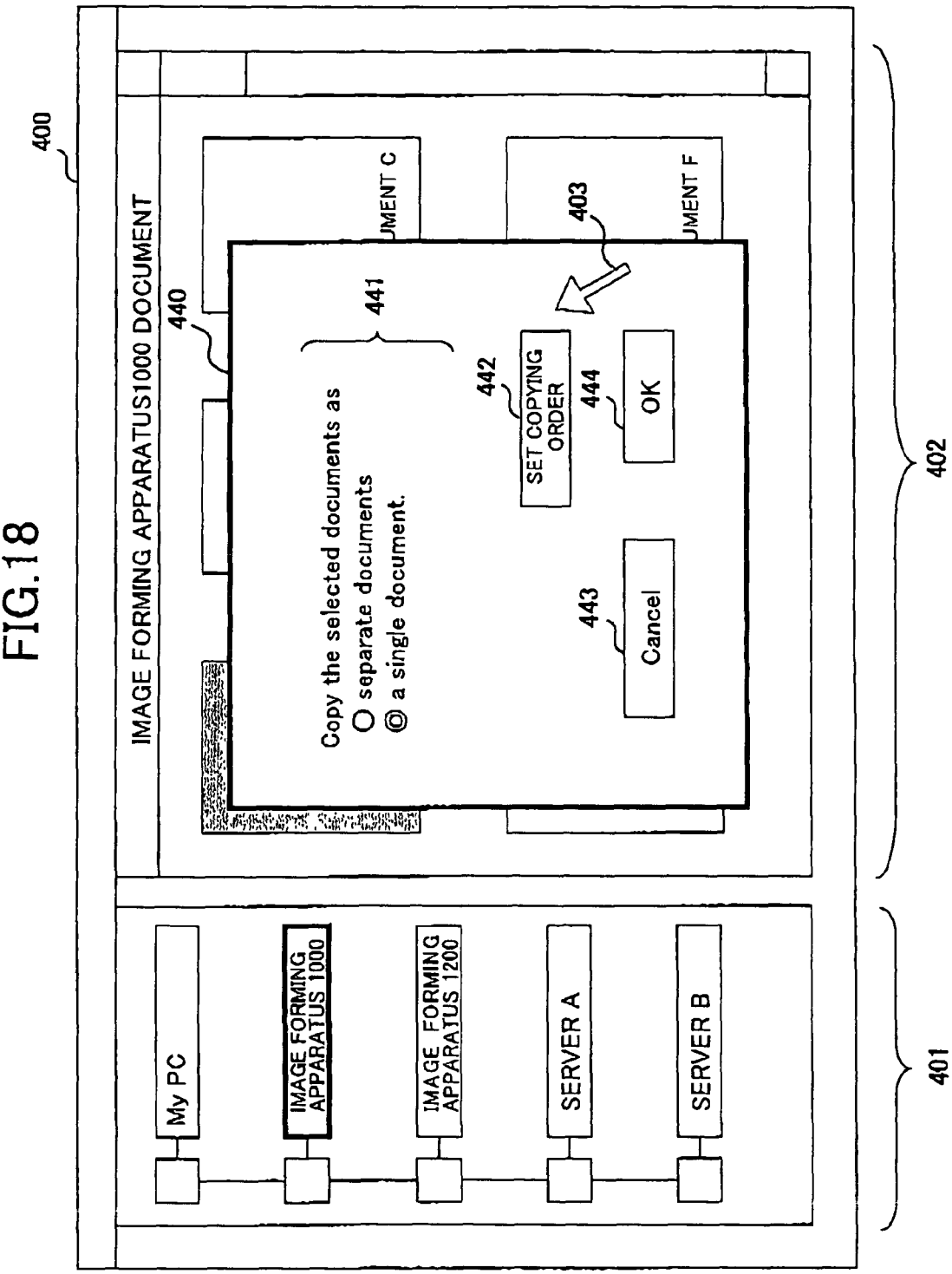
FIG. 18 is a diagram illustrating an exemplary plural document copying mode setting dialog according to the first embodiment.

Then, when the user chooses the OK button 413 in the copying confirmation dialog 410, a plural document copying mode setting dialog to set a copying mode of the plurality of documents as illustrated in FIG. 18. On the other hand, for example, if the user selects only the document A in the copying manipulation screen 400 shown in FIG. 16, the user can start execution of the copying process by choosing the OK button 413 in the copying confirmation dialog 410 shown in FIG. 17.

FIG. 18 shows an exemplary plural document copying mode setting dialog 440 according to the first embodiment.

Referring to FIG. 18, the plural document copying mode setting dialog 440 includes a copying mode selection area 441 to select a copying mode, a copying order setting button 442 to set a copying order of the documents, a cancel button 443 to cancel the copying process, and an OK button 444 to start the copying process.

In the copying mode selection area 441, a message such as "Copy the selected documents as ○ separate documents ○ a single document." is displayed. When the user chooses one of the two options, the selected option is displayed as ⊙. In the illustrative example, the user selects "a single document". In addition, when the user selects the copying order setting button 442 to designate a copying order of the documents, a plural document copying order setting dialog is displayed as illustrated in FIG. 19.

Figure 19:
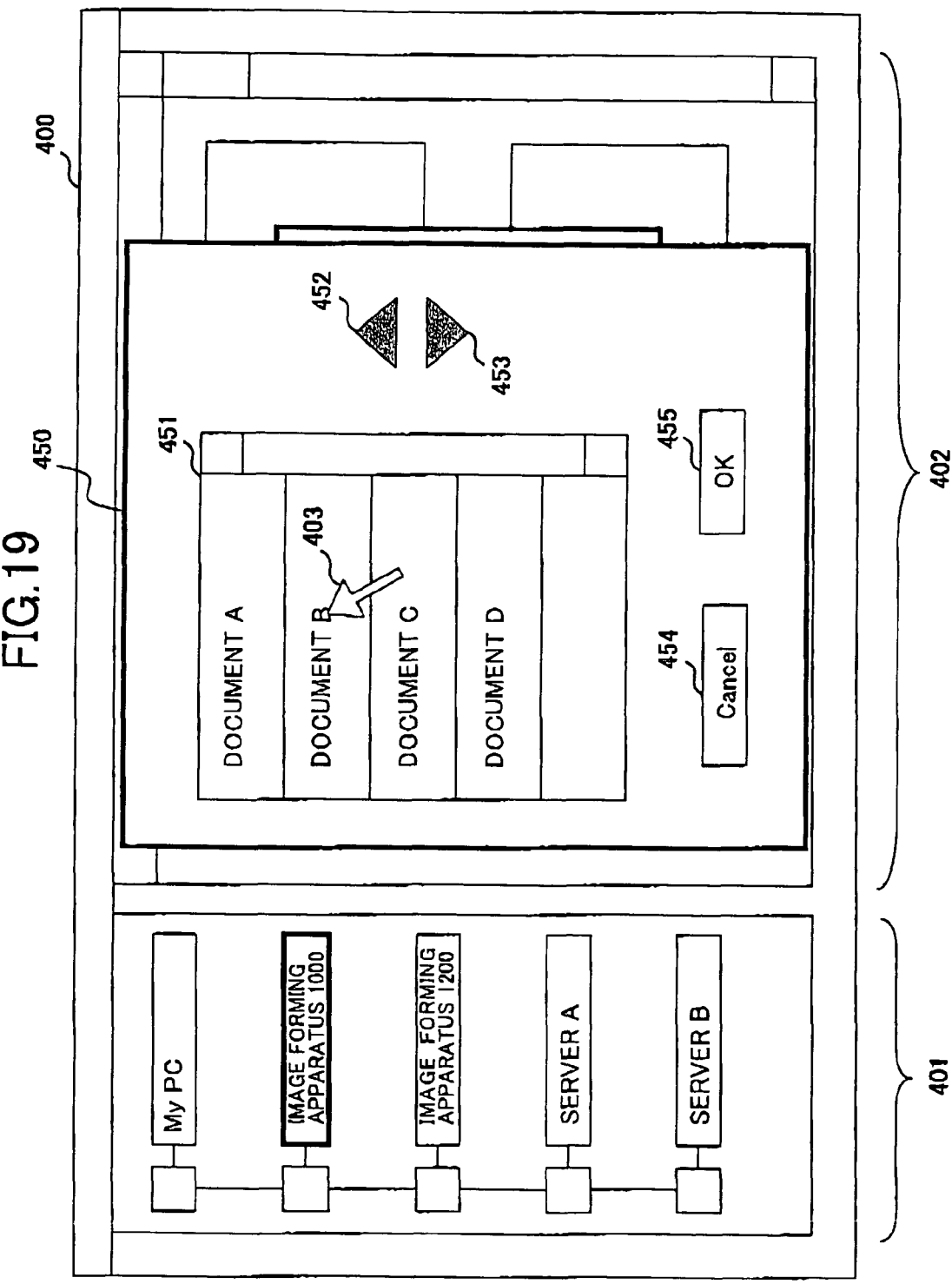
FIG. 19 is a diagram illustrating an exemplary plural document copying order setting dialog according to the first embodiment.

FIG. 19 shows an exemplary plural document copying order setting dialog 450 according to the first embodiment.

Referring to FIG. 19, the plural document copying order setting dialog 450 includes a selected document list display area 451 to display a list of documents selected by the user, an UP button 452 to ascend the copying order of a document, a DOWN button 453 to descend the copying order of a document, a cancel button 454 to cancel the copying process, and an OK button 455 to start the copying process.

In the plural document copying order setting dialog 450, if the user wants to ascend the copying order of the document B, the user first selects the document B in the selected document list display area 451 and then chooses the UP button. As a result, the document B can be copied before the document A. In contrast, if the user chooses the DOWN button 453, the document B can be copied after the document C or the document D. After setting the copying order, if the user chooses the OK button 455, the copying process is started, and the documents A through D are copied from the image forming apparatus 1000 to the image forming apparatus 1200 in the designated copying order.

In the first and second embodiments of the present invention, when the image forming apparatus 1200 having the document process control part 300 requests a selected document stored in the image forming apparatus 1000 in the format of a document type that is determined based on document types processable to the image forming apparatuses 1000 and 1200, the corresponding image processing process can be performed in the image forming apparatus 1200 in cooperation with the apparatuses connected to each other via the network. For example, if the size of a document that the image forming apparatus 1000, which serves as the document transmitter apparatus, accommodates is greater than the maximal size of documents that the image forming apparatus 1200, which serves as the document receiver apparatus, can store, the document process control part 300 of the image forming apparatus 1200 can use an image scaling function thereof to provide a reduced-size page image based on determination of the document type determination part 320.

Also, since the document process control part 300 flexibly controls cooperation with the image forming apparatuses 1000 and 1200 depending on types of processes such as a copying process and a printing process, it is possible to perform various types of processes through cooperation with apparatuses connected via a network.

In the first and second embodiments, the copying process and the printing process that are performed through cooperation with apparatuses connected via a network are described. However, the present invention is not limited to these processes. The present invention is applicable to file management, scanner control and so on. Furthermore, the present invention is applicable to process information regarding the image forming apparatuses 1000 and 1200.

Also, the image forming apparatuses 1000 and 1200 and the terminal 30 according to the embodiments are not limited to communication via a fixed line LAN (Local Area Network). In other words, although physical layers differs in a network system, such as a wireless LAN and Bluetooth, SOAP messages can be exchanged in such a network system in accordance with TCP/IP (Transmission Control Protocol/Internet Protocol). Thus, it is possible to implement various processes according to the embodiments as Web services in accordance with http and SOAP. Furthermore, communicated contents are allowed to be extended in a parallel system, such as a centronics and SCSI. Thus, as long as there is agreement between devices that will communicate each other, it is possible to implement message exchange in accordance with SOAP.

A description is given, with reference to FIG. 20 through FIG. 26, of a document printing process according to a second embodiment of the present invention.

In the above-mentioned first embodiment, a document is copied in accordance with the three patterns shown in FIG. 3 from the image forming apparatus 1000 to the image forming apparatus 1200 in cooperation with apparatuses connected to each other. In the second embodiment of the present invention, the image forming apparatus 1200 prints out a copy of a document stored in the image forming apparatus 1000 in accordance with the same three pattern shown in FIG. 3.

In the second embodiment, the image forming apparatuses 1000 and 1200 have the functional structures shown in FIG. 1 and the hardware configurations shown in FIG. 2. Also, the image forming apparatus 1000 having no document process control part 300 has the functional structure shown in FIG. 5. In addition, the terminal 30 having no document process control part 300 has the functional structure shown in FIG. 6. For this reason, the description of the functional structures thereof is omitted.

Figure 20:
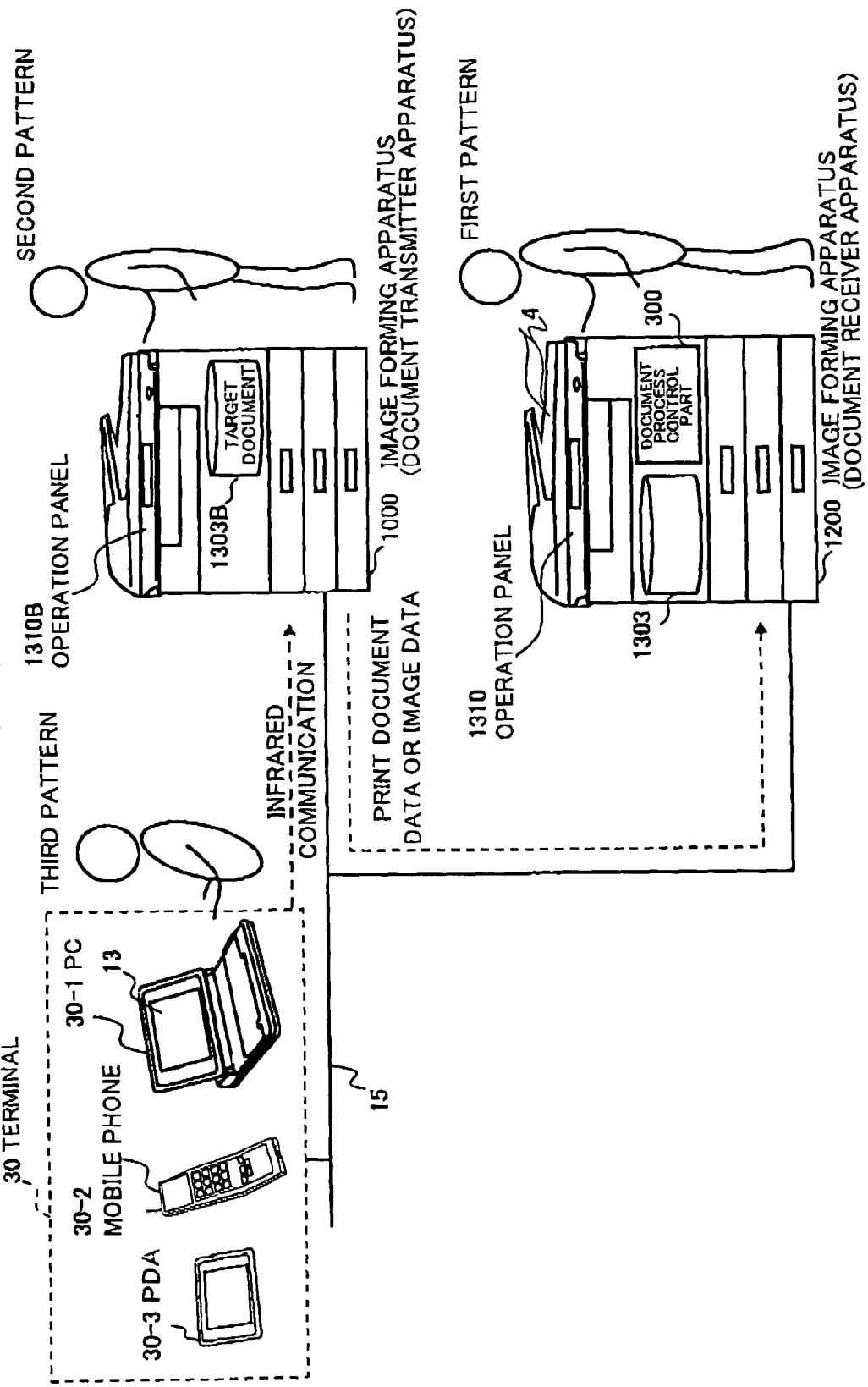
FIG. 20 is an exemplary functional structure of a network system according to a second embodiment of the present invention.

FIG. 20 shows an exemplary functional structure of a network system according to the second embodiment. In the illustrated network system, the image forming apparatus 1200, an image forming apparatus 1000 having the fundamentally same functions as the image forming apparatus 1200, and a terminal 30 are connected to each other via a network 15. The image forming apparatus 1000 does not have to include the document process control part 300 in the document management Web service application 1216 shown in FIG. 1.

Referring to FIG. 20, an image of document data or image data (hereinafter which are collectively referred to as a document) stored in HDD 1303B of the image forming apparatus 1000 is formed on a paper 4 in the image forming apparatus 1200, and the image forming apparatus 1200 prints out the image in accordance with illustrated three patterns. In the second embodiment, the image forming apparatus 1000, which serves as a document transmitter apparatus, sends a document stored therein to the image forming apparatus 1200. On the other hand, the image forming apparatus 1200, which serves as a document receiver apparatus, receives the document from the image forming apparatus 1000, and the image forming apparatus 1200 produces a copy of the document.

In the first pattern, a document stored in the image forming apparatus 1000 is printed out in the image forming apparatus 1200 through user's manipulation on an operation panel 1310 of the image forming apparatus 1200. In the second pattern, a document stored in the image forming apparatus 1000 is printed out in the image forming apparatus 1200 through user's manipulation on an operation panel 1310B of the image forming apparatus 1000. In the third pattern, a document stored in the image forming apparatus 1000 is printed out in the image forming apparatus 1200 through user's manipulation on a display part 13 of the terminal 30.

Figure 21:
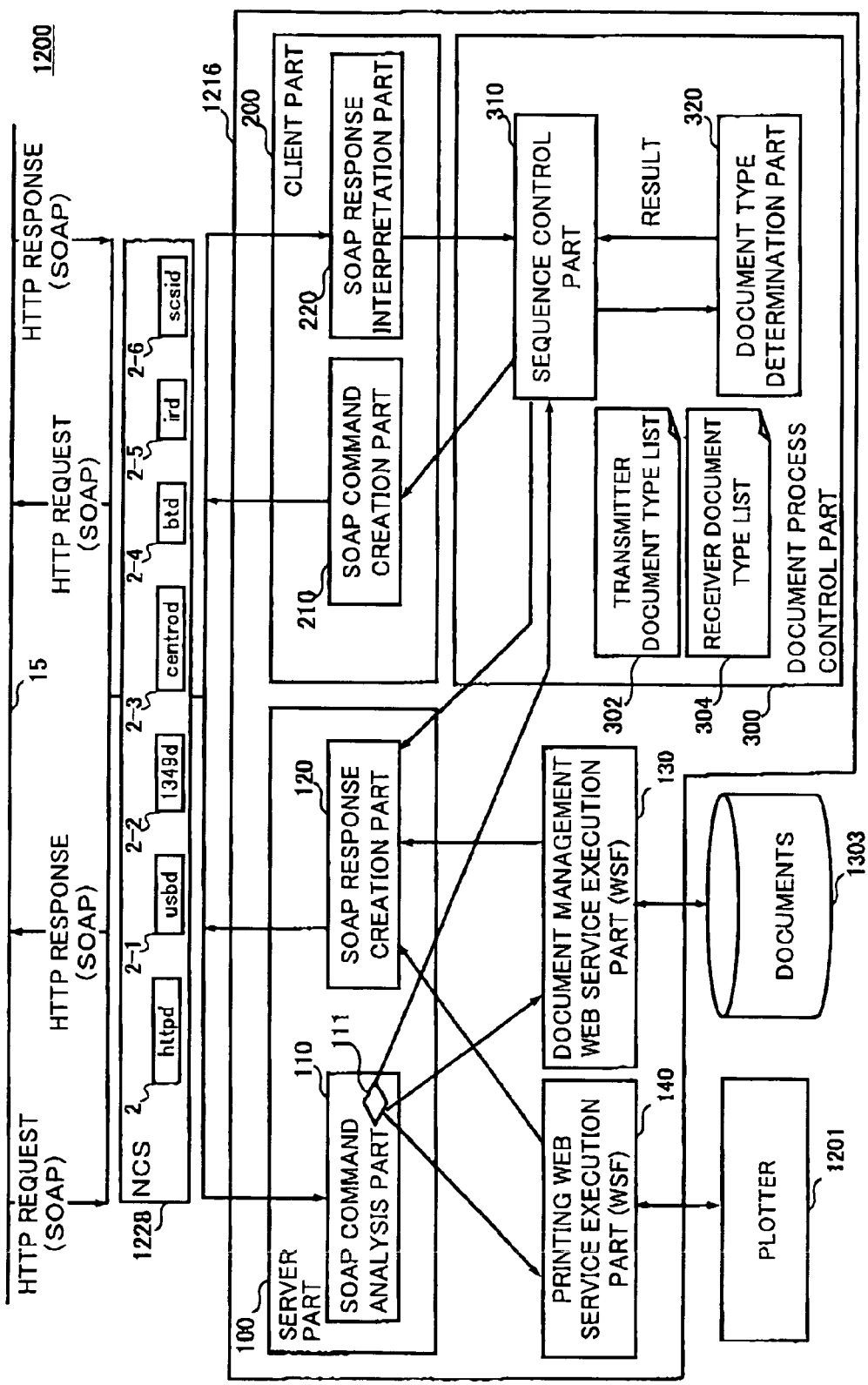
FIG. 21 is a diagram illustrating an exemplary functional structure of an image forming apparatus having a document process control part according to the second embodiment.

A description is given, with reference to FIG. 21, of a functional structure of the image forming apparatuses 1200 having the document process control part 300.

FIG. 21 shows an exemplary functional structure of the image forming apparatus 1200 having the document process control part 300 according to the second embodiment wherein only primary functional components of the image forming apparatus 1200 are illustrated and the other functional components are omitted. In FIG. 21, the same functional components as those shown in FIG. 4 are designated by the same reference numerals, and the description thereof is omitted.

Referring to FIG. 21, the document management Web service application 1216 of the image forming apparatus 1200 differs from the document management Web service application 1216 according to the first embodiment in that the document management Web service application 1216 according to the second embodiment further comprises a printing Web service execution part 140, which serves as a Web service function (WSF) to provide a Web service, to print a selected document by controlling the plotter 1201.

The document process control part 300 comprises a sequence control part 310 and a document type determination part 320. The sequence control part 310 controls a sequence of processes to print a document stored in the image forming apparatus 1000 in the image forming apparatus 1200 in cooperation with the image forming apparatus 1000. The document type determination part 320 determines what document type is processable to the image forming apparatus 1000 or 1200.

The sequence control part 310, in response to receipt of a SOAP command associated with cooperation with other apparatuses connected to the image forming apparatus 1200 from the SOAP command analysis part 110 of the server part 100, requests the SOAP command creation part 210 of the client part 200 to acquire a list of document types acquirable from the image forming apparatus 1000. In response to receipt of the acquirable document type list from the SOAP response interpretation part 220, the sequence control part 310 requests the document type determination part 320 to determine a document type processable to the image forming apparatuses 1000 and 1200. Then, the sequence control part 310 instructs the SOAP command creation part 210 to request the image forming apparatus 1000 to send a page image in the format of the determined document type. In response to receipt of the page image from the image forming apparatus 1000 corresponding to the page image request command via the SOAP response interpretation part 220, the sequence control part 310 instructs the SOAP command creation part 210 to internally issue a SOAP command to print the page image to the SOAP command analysis part 110 of the server part 100. In response to receipt of the process request from the SOAP command analysis part 110, the printing Web service execution part 140 prints out the page image.

In order to determine the best document type, the document type determination part 320 determines whether there is a processable document type shared in a transmitter document type list 302 and a receiver document type list 304 sent from the sequence control part 310. Here, the transmitter document type list 302 includes document types acquirable from the image forming apparatus 1000. On the other hand, the receiver document type list 304 includes document types printable in the image forming apparatus 1200. The document type determination part 320 informs the sequence control part 310 of the determined document type.

Figure 22:
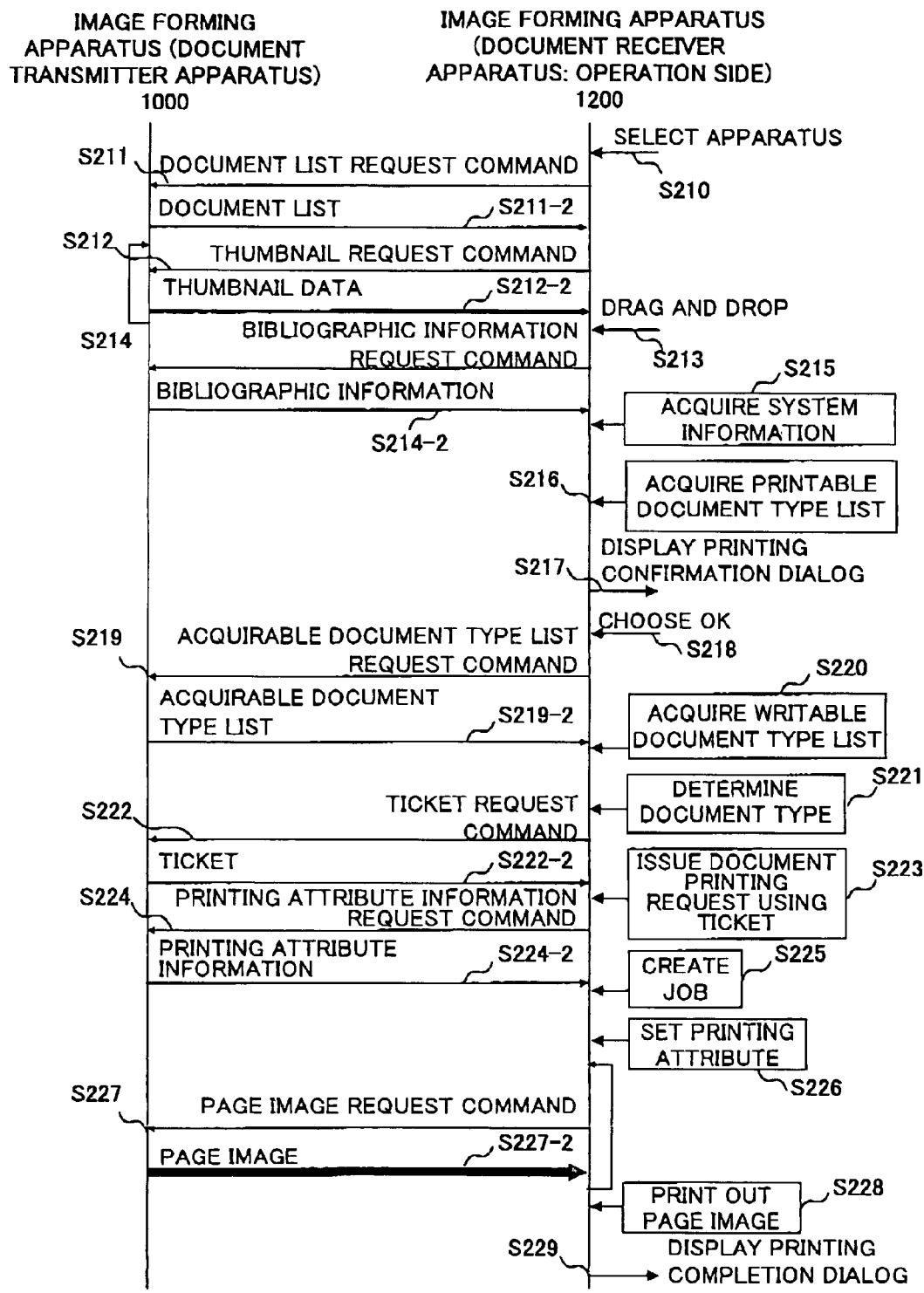
FIG. 22 is a diagram illustrating an exemplary operation of a first document printing process for a first pattern according to the second embodiment.

A description is given, with reference to FIG. 22, of a first document printing process for the above-mentioned first pattern in FIG. 20 according to the second embodiment.

In the first pattern, a selected document stored in the image forming apparatus 1000 is printed out in the image forming apparatus 1200 through user's manipulation on the operation panel 1310 of the image forming apparatus 1200.

FIG. 22 shows an exemplary operation of the first document printing process for the first pattern according to the second embodiment.

Referring to FIG. 22, a user of the image forming apparatus 1200 selects the image forming apparatus 1000 accommodating a desired document from listed apparatuses, which is displayed on the operation panel 1310, connected to the image forming apparatus 1200 via the network 15 at step S210.

At step S211, the image forming apparatus 1200 sends to the image forming apparatus 1000 a document list request command to request a list of documents stored in the image forming apparatus 1000.

At step S211-2, the image forming apparatus 1000, in response to receipt of the document list request command from the image forming apparatus 1200, uses the document management Web service execution part 130B to acquire the document list from HDD 1303B and sends the document list to the image forming apparatus 1200.

At step S212, the image forming apparatus 1200, in response to receipt of the document list from the image forming apparatus 1000, sends to the image forming apparatus 1000 a thumbnail request command to request thumbnail data to be displayed on the operation panel 1310.

At step S212-2, when the image forming apparatus 1000 receives the thumbnail request command from the image forming apparatus 1200, the document management Web service execution part 130B operates corresponding to the thumbnail request command Then, the image forming apparatus 1000 sends to the image forming apparatus 1200 the thumbnail data acquired by the document management Web service execution part 130B. For example, the thumbnail data are reduced-size image data of the top pages of documents stored in the image forming apparatus 1000.

At step S213, when the document list of the image forming apparatus 1000 is displayed in thumbnail representation on the operation panel 1310 of the image forming apparatus 1200, the user determines which apparatus should print out which document by dragging and dropping a thumbnail of a desired document to a desired apparatus. In this embodiment, the user drags and drops a document in the image forming apparatus 1000 to the image forming apparatus 1200.

At step S214, the image forming apparatus 1200 sends to the image forming apparatus 1000 a bibliographic information request command to request bibliographic information regarding the selected document.

At step S214-2, the image forming apparatus 1000, in response to receipt of the bibliographic information request command from the image forming apparatus 1200, uses the document management Web service execution part 130B to acquire the bibliographic information from HDD 1303B and sends the bibliographic information to the image forming apparatus 1200.

At step S215, the image forming apparatus 1200, in response to receipt of the bibliographic information from the image forming apparatus 1000, internally acquires system information regarding the image forming apparatus 1200, and examines feasibility of the copying process using a ticket based on the system information.

At step S216, the image forming apparatus 1200 internally issues a printable document type list request command to request a list of document types printable in the image forming apparatus 1200.

At step S217, the image forming apparatus 1200 displays a copying or printing confirmation dialog on the operation panel 1310.

When the user chooses OK to start the printing process at step S218, the sequence control part 310 of the image forming apparatus 1200 starts the printing process in cooperation with the image forming apparatus 1000.

At step S219, the image forming apparatus 1200 send to the image forming apparatus 1000 an acquirable document type list request command to request a list of document types acquirable from the image forming apparatus 1000.

At step S219-2, the image forming apparatus 1000, in response to receipt the acquirable document type list request command from the image forming apparatus 1200, sends the acquirable document type list to the image forming apparatus 1200.

At step S220, the image forming apparatus 1200, in response to receipt of the acquirable document type list from the image forming apparatus 1000, maintains the acquirable document type list as a transmitter document type list 302. Furthermore, the sequence control part 310 of the image forming apparatus 1200 internally issues a writable document type list request command to request a list of document types writable in the image forming apparatus 1200, and sets the writable document type list as a receiver document type list 304.

At step S221, the sequence control 310 of the image forming apparatus 1200 uses the document type determination part 320 to determine whether or not there is a document type acquirable from the image forming apparatus 1000 and writable in the image forming apparatus 1200 based on the transmitter document type list 302 and the receiver document type list 304, and then determines the best document type. Based on the determination, if there are a plurality of such document types, the document type determination part 320 determines one of the document types as the best document type. If there is no such a document type, the document type determination part 320 determines a predetermined document type as the best document type. Then, the sequence control part 310 instructs the SOAP command creation part 210 to send to the image forming apparatus 1200 a ticket request command as a SOAP command.

At step S222, the image forming apparatus 1200 sends to the image forming apparatus 1000 such a ticket request command to request a ticket to use the selected document.

At step S222-2, the image forming apparatus 1000, in response to receipt of the ticket request command from the image forming apparatus 1200, sends the ticket to the image forming apparatus 1200 so that the image forming apparatus 1200 can perform the printing process for the image forming apparatus 1000 through the ticket management Web service application 1217.

At step S223, the image forming apparatus 1200, in response to receipt of the ticket from the image forming apparatus 1000, internally issues a document printing request to print out the selected document stored in the image forming apparatus 1000 by authority of the ticket. Namely, the image forming apparatus 1200 creates a document printing request command as a SOAP command issued to the image forming apparatus 1200 itself.

At step S224, the image forming apparatus 1200, in response to receipt of the internally issued document printing request command, sends to the image forming apparatus 1000 a printing attribute information request command to request printing attribute information to indicate whether the selected document should be double-sided printed or single-sided printed.

At step S224-2, the image forming apparatus 1000, in response to receipt of the printing attribute information request command from the image forming apparatus 1200, sends the printing attribute information to the image forming apparatus 1200.

At step S225, the image forming apparatus 1200, in response to receipt of the printing attribute information from the image forming apparatus 1000, internally issues a job creation request command to create a job.

At step S226, the image forming apparatus 1200 sets a printing attribute based on the printing attribute information.

At step S227, the image forming apparatus 1200 sends to the image forming apparatus 1000 a page image request command to request a page image in the format of the determined document type designated in the ticket.

At step S227-2, the image forming apparatus 1000, in response to receipt of the page image request command from the image forming apparatus 1200, sends to the image forming apparatus 1200 a page image of the selected document in the format of the document type. In the page image request command, for example, a plurality of page images of the selected document may be designated. Alternatively, whenever the image forming apparatus 1200 receives each page image from the image forming apparatus 1000, the image forming apparatus 1200 may iteratively send to the image forming apparatus 1000 a page image request command for the next page image.

At step S228, after the image forming apparatus 1200 receives all page images of the selected document from the image forming apparatus 1000, the printing Web service execution part 140 uses the plotter 1201 to print out the page images.

At step S229, the image forming apparatus 1200 displays on the operation panel 1310 a printing completion dialog to indicate that the printing process has been terminated.

In the image forming apparatus 1200, which serves as the document receiver apparatus, the SOAP command creation part 210 of the client part 200 sets request commands sent to the image forming apparatus 1000 as SOAP commands incorporated in messages of HTTP requests (S211, S212, S214, S218, S221 and S223). The SOAP response interpretation part 220 of the client part 200 extracts HTTP responses for process results corresponding to the HTTP requests.

On the other hand, in the image forming apparatus 1000, which serves as the document transmitter apparatus, the SOAP command analysis part 110B of the server part 100B analyzes received request commands as SOAP commands, and the document management Web service execution part 130B executes processes corresponding to the HTTP requests. The SOAP response creation part 120B of the server part 100B provides the image forming apparatus 1200 with process results of the document management Web service execution part 130B as Web services (S211-2, S212-2, S214-2, S219-2, S224-2 and S227-2).

According to the above-mentioned first document printing process, when a user of the image forming apparatus 1200 having the document process control part 300 selects a document stored in the image forming apparatus 1000, the image forming apparatus 1200 can acquire the document in an appropriate document type from the image forming apparatus 1000 and print out the document by means of the plotter 1201.

Figure 23:
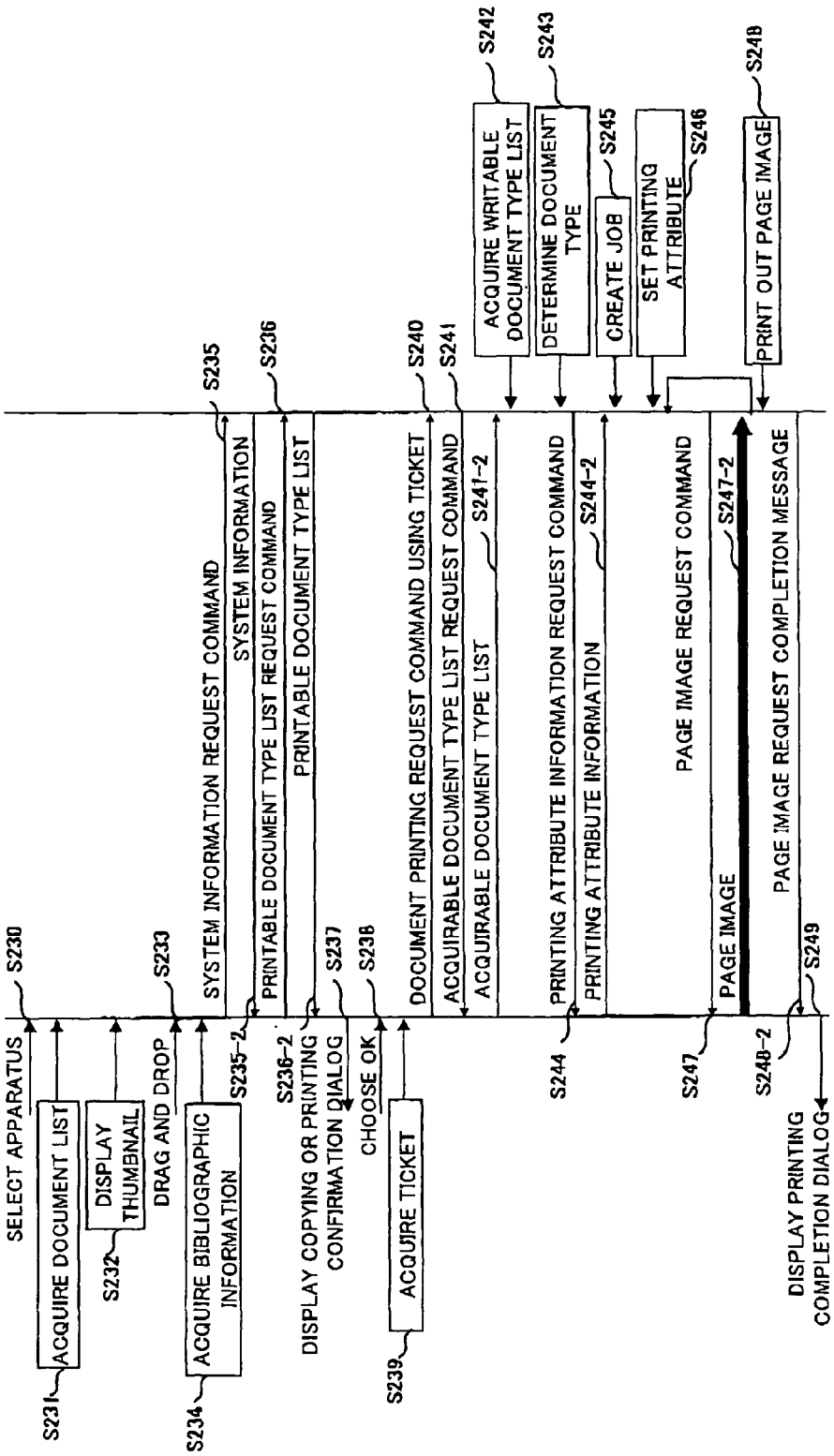
FIG. 23 is a diagram illustrating an exemplary operation of a second document printing process for a second pattern according to the second embodiment.

A description is given, with reference to FIG. 23, of a second document printing process for the above-mentioned second pattern in FIG. 20 according to the second embodiment. In the second pattern, a selected document stored in the image forming apparatus 1000 is printed out in the image forming apparatus 1200 through user's manipulation on the operation panel 1310B of the image forming apparatus 1000.

FIG. 23 shows an exemplary operation of the second document printing process for the second pattern according to the second embodiment.

Referring to FIG. 23, a user of the image forming apparatus 1000 selects the image forming apparatus 1000 accommodating a desired document from listed apparatuses, which is displayed on the operation panel 1310B, connected to the image forming apparatus 1000 via the network 15 at step S230.

At step S231, the image forming apparatus 1000 internally issues a document list request command to request a list of documents stored in the image forming apparatus 1000, and uses the document management Web service execution part 130B to acquire the document list from HDD 1303B.

At step S232, the image forming apparatus 1000, in response to acquisition of the document list, internally issues a thumbnail request command to request thumbnail data to be displayed on the operation panel 1310B, and uses the document management Web service execution part 130B to acquire the thumbnail data. Based on the thumbnail data, the image forming apparatus 1000 displays on the operation panel 1310B the document list in thumbnail representation. For example, the thumbnail data are reduced-size image data of the top pages of documents stored in the image forming apparatus 1000.

At step S233, when the document list of the image forming apparatus 1000 is displayed in thumbnail representation on the operation panel 1310B of the image forming apparatus 1000, the user determines which apparatus should print out which document by dragging and dropping a thumbnail of a desired document to a desired apparatus. In this embodiment, the user drags and drops a document stored in the image forming apparatus 1000 toward the image forming apparatus 1200.

At step S234, the image forming apparatus 1000 internally issues a bibliographic information request command to request bibliographic information regarding the selected document, and uses the document management Web service execution part 130B to acquire the bibliographic information from HDD 1303B.

At step S235, the image forming apparatus 1000 sends to the image forming apparatus 1200 a system information request command to request system information regarding the image forming apparatus 1200.

At step 235-2, the image forming apparatus 1200, in response to receipt of the system information request command from the image forming apparatus 1000, sends to the image forming apparatus 1000 the system information including ticket information to indicate feasibility of the printing process using a ticket.

At step S236, the image forming apparatus 1000, in response to receipt of the system information from the image forming apparatus 1200, sends to the image forming apparatus 1200 a printable document type list request command to request a list of document types printable in the image forming apparatus 1200.

At step S236-2, the image forming apparatus 1200, in response to receipt of the printable document type list request command from the image forming apparatus 1000, sends the printable document type list to the image forming apparatus 1000.

At step S237, the image forming apparatus 1000, in response to receipt of the printable document type list from the image forming apparatus 1200, displays a copying or printing confirmation dialog on the operation panel 1310B. There is a possibility that the image forming apparatus 1200 may have printing devices (peripheral devices), such as a punching device and a stapling device, different from those of the image forming apparatus 1000. Based on the printable document type list, if there is an attribute that the image forming apparatus 1200 does not cover, the attribute may be displayed as a grey-colored item to indicate unavailability of the attribute. On the other, if the image forming apparatus 1200 covers an attribute that the image forming apparatus 1000 does not cover, the attribute may be displayed as a selectable attribute.

When the user chooses OK to start the printing process at step S238, the image forming apparatus 1000 uses the ticket management Web application 1217 to internally issue a ticket at step S239.

At step S240, the image forming apparatus 1000 send to the image forming apparatus 1200 a document printing request command to print out the selected document by authority of the internally issued ticket.

At step S241, the image forming apparatus 1200, in response to receipt of the document printing request command from the image forming apparatus 1000, uses the document process control part 300 to start the printing process in cooperation with the image forming apparatus 1000. Then, the image forming apparatus 1200 sends to the image forming apparatus 1000 an acquirable document type list request command to request a list of document types acquirable from the image forming apparatus 1000.

At step S241-2, the image forming apparatus 1000, in response to receipt of the acquirable document type list request command from the image forming apparatus 1200, sends the acquirable document type list to the image forming apparatus 1200.

At step S242, the image forming apparatus 1200, in response to receipt of the acquirable document type list from the image forming apparatus 1000, maintains the acquirable document type list as a transmitter document type list 302. Furthermore, the sequence control part 310 of the image forming apparatus 1200 internally issues a writable document type list request command to request a list of document types writable in the image forming apparatus 1200, and sets the writable document type list as a receiver document type list 304.

At step S243, the sequence control 310 of the image forming apparatus 1200 uses the document type determination part 320 to determine whether or not there is a document type acquirable from the image forming apparatus 1000 and writable in the image forming apparatus 1200 based on the transmitter document type list 302 and the receiver document type list 304, and then determines the best document type. Based on the determination, if there are a plurality of such document types, the document type determination part 320 determines one of the document types as the best document type. If there is no such a document type, the document type determination part 320 determines a predetermined document type as the best document type.

At step S244, the image forming apparatus 1200 sends to the image forming apparatus 1000 a printing attribute information request command to request printing attribute information to indicate whether the selected document should be double-sided printed or single-sided printed.

At step S244-2, the image forming apparatus 1000, in response to receipt of the printing attribute information request command from the image forming apparatus 1200, sends the printing attribute information to the image forming apparatus 1200.

At step S245, the image forming apparatus 1200, in response to receipt of the printing attribute information from the image forming apparatus 1000, internally issues a job creation request command to create a job.

At step S246, the image forming apparatus 1200 sets a printing attribute based on the printing attribute information.

At step S247, the image forming apparatus 1200 send to the image forming apparatus 1000 a page image request command using the ticket, in which the determined document type is specified, as a SOAP command.

At step S247-2, the image forming apparatus 1000, in response to receipt of the page image request command from the image forming apparatus 1200, sends to the image forming apparatus 1200 a page image of the selected document in the format of the document type specified in the ticket. In the page image request command, for example, a plurality of page images of the selected document may be designated. Alternatively, whenever the image forming apparatus 1200 receives each page image from the image forming apparatus 1000, the image forming apparatus 1200 may iteratively send to the image forming apparatus 1000 a page image request command for the next page image.

At step S248, after the image forming apparatus 1200 receives all page images of the selected document from the image forming apparatus 1000, the printing Web service execution part 140 uses the plotter 1201 to print out the page images.

At step S248-2, after completion of the printing process, the image forming apparatus 1200 sends to the image forming apparatus 1000 a printing completion message to indicate that the printing process has been terminated.

At step S249, the image forming apparatus 1000, in response to receipt of the printing completion message from the image forming apparatus 1200, displays on the operation panel 1310B a printing completion dialog to indicate that the printing process has been terminated.

In the image forming apparatus 1200, which serves as the document receiver apparatus, the SOAP command creation part 210 of the client part 200 sets request commands sent to the image forming apparatus 1000 as SOAP commands incorporated in messages of HTTP requests (S241, S244 and S247). The SOAP response interpretation part 220 of the client part 200 extracts HTTP responses for process results corresponding to the HTTP requests. Also, the SOAP command analysis part 110 of the server part 100 analyzes request command received from the image forming apparatus 1000 as SOAP commands, and determines whether the SOAP commands are document printing request commands using a ticket.

On the other hand, in the image forming apparatus 1000, which serves as the document transmitter apparatus, the SOAP command creation part 210B of the client part 200B sets request commands sent to the image forming apparatus 1200 as SOAP commands incorporated in messages of HTTP requests (S235, S236 and S240), and the SOAP response interpretation part 220B of the client part 200B extracts HTTP responses for process results corresponding to the HTTP requests. Also, the SOAP command analysis part 110B of the server part 100B analyzes request commands received from the image forming apparatus 1200 as SOAP commands.

According to the above-mentioned second document printing process, when a user of the image forming apparatus 1000 having no document process control part 300 selects a document stored in the image forming apparatus 1000, the image forming apparatus 1200 can acquire the document in an appropriate document type from the image forming apparatus 1000 and print out the document by means of the plotter 1201.

Figure 24:
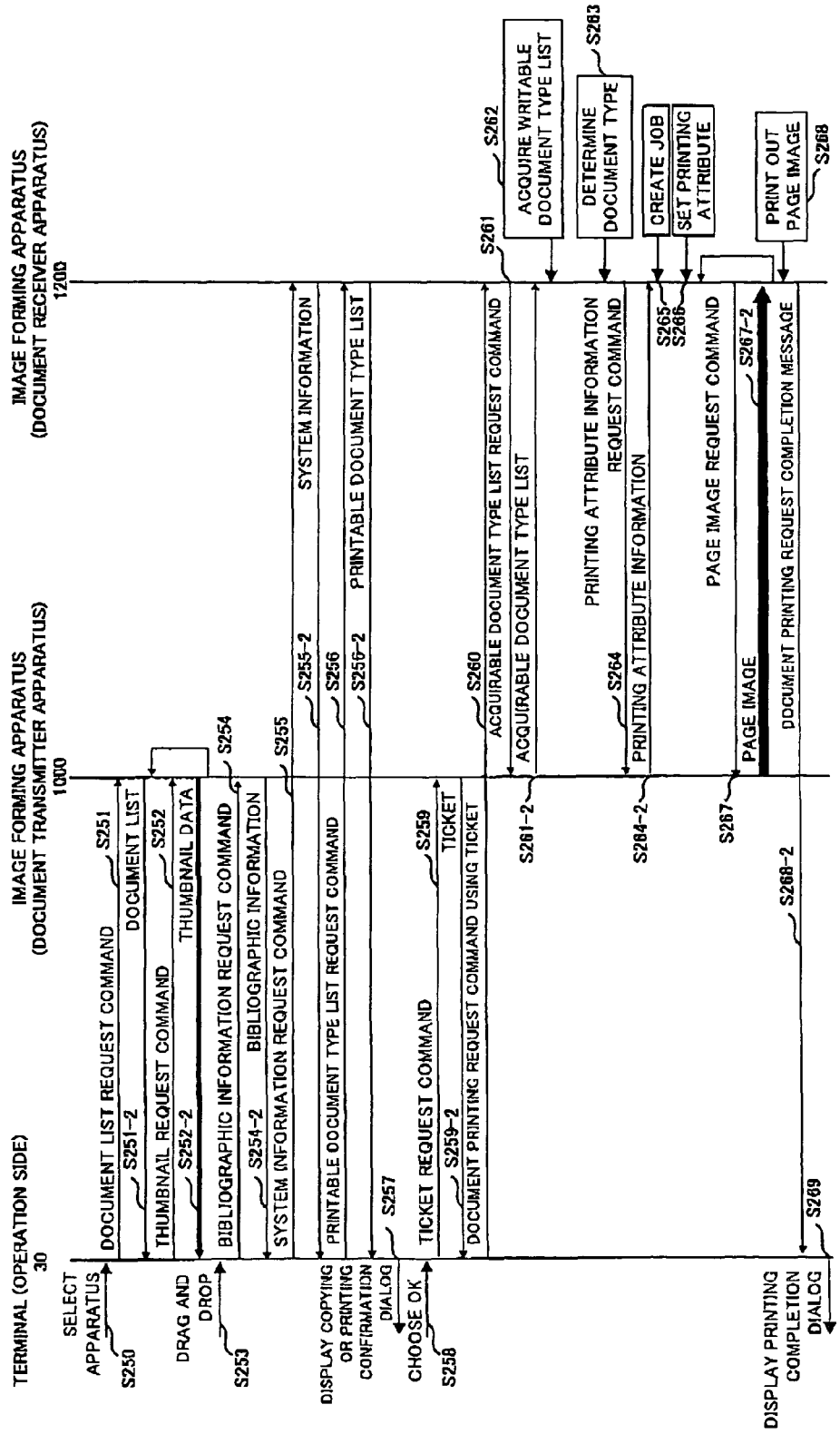
FIG. 24 is a diagram illustrating an exemplary operation of a third document printing process for a third pattern according to the second embodiment.

A description is given, with reference to FIG. 24, of a third document printing process for the above-mentioned third pattern in FIG. 20 according to the second embodiment.

In the third pattern, a selected document stored in the image forming apparatus 1000 is copied to the image forming apparatus 1200 through user's manipulation on the display part 13 of the terminal 30.

FIG. 24 shows an exemplary operation of the third document copying process for the third pattern according to the second embodiment.

Referring to FIG. 24, a user of the terminal 30 selects the image forming apparatus 1000 accommodating a desired document from listed apparatuses, which are displayed on the display part 13, connected to the terminal 30 via the network 15 at step S250.

At step S251, the terminal 30 sends to the image forming apparatus 1000 a document list request command to request a list of documents stored in the image forming apparatus 1000.

At step S251-2, the image forming apparatus 1000, in response to receipt of the document list request command from the terminal 30, uses the document management Web service execution part 130B to acquire the document list from HDD 1303B and sends the document list to the terminal 30.

At step S252, the terminal 30, in response to receipt of the document list from the image forming apparatus 1000, sends to the image forming apparatus 1000 a thumbnail request command to request thumbnail data to be displayed on the display panel 13.

At step S252-2, when the image forming apparatus 1000 receives the thumbnail request command from the terminal 30, the document management Web service execution part 130B operates corresponding to the thumbnail request command. Then, the image forming apparatus 1000 uses the document management Web service execution part 130B to acquire the thumbnail data from HDD 1303B and sends the thumbnail data to the terminal 30. For example, the thumbnail data are reduced-size image data of the top pages of documents stored in the image forming apparatus 1000.

At step S253, when the document list of the image forming apparatus 1000 is displayed in thumbnail representation on the display part 13 of the terminal 30, the user determines which apparatus should print out which document by dragging and dropping a thumbnail of a desired document toward a desired apparatus. In this embodiment, the user drags and drops a document stored in the image forming apparatus 1000 toward the image forming apparatus 1200.

At step S254, the terminal 30 sends to the image forming apparatus 1000 a bibliographic information request command to request bibliographic information regarding the selected document.

At step S254-2, the image forming apparatus 1000, in response to receipt of the bibliographic information request command from the terminal 30, uses the document management Web service execution part 130B to acquire the bibliographic information from HDD 13033 and sends the bibliographic information to the terminal 30.

At step S255, the terminal 30, in response to receipt of the bibliographic information from the image forming apparatus 1000, sends to the image forming apparatus 1200 a system information request command to request system information regarding the image forming apparatus 1200.

At step S255-2, the terminal 30, in response to receipt of the system information from the image forming apparatus 1200, examines feasibility of the copying process using a ticket.

At step S256, the terminal 30 sends to the image forming apparatus 1200 a printable document type list request command to request a list of document types printable in the image forming apparatus 1200.

At step S256-2, the image forming apparatus 1200, in response to receipt of the printable document type list request command from the terminal 30, sends the printable document type list to the terminal 30.

At step S257, the terminal 30 displays a copying or printing confirmation dialog on the display part 13.

When the user chooses OK to start the printing process at step S258, the terminal 30 sends to the image forming apparatus 1000 a ticket request command to request a ticket to use the selected document stored in the image forming apparatus at step S259.

At step S259-2, the image forming apparatus 1000, in response to receipt of the ticket request command from the terminal 30, sends the ticket to the terminal 30.

At step S260, the terminal 30, in response to receipt of the ticket from the image forming apparatus 1000, sends to the image forming apparatus 1200 a document printing request command to acquire the selected document from the image forming apparatus 1000 by authority of the ticket and print out the document.

At step S261, when the image forming apparatus 1200 receives the document printing request command from the terminal 30, the sequence control part 310 of the image forming apparatus 1200 starts the printing process in cooperation with the image forming apparatus 1000. Then, the image forming apparatus 1200 uses the sequence control part 310 to send to the image forming apparatus 1000 an acquirable document type list request command to request a list of document types acquirable from the image forming apparatus 1000.

At step S211-2, the image forming apparatus 1000, in response to receipt the acquirable document type list request command from the image forming apparatus 1200, sends the acquirable document type list to the image forming apparatus 1200.

At step S262, the image forming apparatus 1200, in response to receipt of the acquirable document type list from the image forming apparatus 1000, maintains the acquirable document type list as a transmitter document type list 302. Furthermore, the sequence control part 310 of the image forming apparatus 1200 internally issues a writable document type list request command to request a list of document types writable in the image forming apparatus 1200, and sets the writable document type list as a receiver document type list 304.

At step S263, the sequence control 310 of the image forming apparatus 1200 uses the document type determination part 320 to determine whether or not there is a document type acquirable from the image forming apparatus 1000 and writable in the image forming apparatus 1200 based on the transmitter document type list 302 and the receiver document type list 304, and then determines the best document type. Based on the determination, if there are a plurality of such document types, the document type determination part 320 determines one of the document types as the best document type. If there is no such a document type, the document type determination part 320 determines a predetermined document type as the best document type.

At step S264, the image forming apparatus 1200 sends to the image forming apparatus 1000 a printing attribute information request command to request printing attribute information to indicate whether the selected document should be double-sided printed or single-sided printed.

At step S264-2, the image forming apparatus 1000, in response to receipt of the printing attribute information request command from the image forming apparatus 1200, sends the printing attribute information to the image forming apparatus 1200.

At step S265, the image forming apparatus 1200, in response to receipt of the printing attribute information from the image forming apparatus 1000, internally issues a job creation request command to create a job.

At step S266, the image forming apparatus 1200 sets a printing attribute based on the printing attribute information.

At step S267, the image forming apparatus 1200 sends to the image forming apparatus 1000 the page image request command to request a page image of the selected document in the format of the document type designated in the ticket.

At step S267-2, the image forming apparatus 1000, in response to the page image request command from the image forming apparatus 1200, sends to the image forming apparatus 1200 a page image of the selected document in the format of the designated document type. In the page image request command, for example, a plurality of page images of the selected document may be designated. Alternatively, whenever the image forming apparatus 1200 receives each page image from the image forming apparatus 1000, the image forming apparatus 1200 may iteratively send to the image forming apparatus 1000 a page image request command for the next page image.

At step S268, when the image forming apparatus 1200 receives all page images of the selected document from the image forming apparatus 1000, the printing Web service execution part 140 uses the plotter 1201 to print out the page images.

At step S268-2, after completion of the printing process, the image forming apparatus 1200 sends to the terminal 30 a printing completion message to indicate that the printing process has been terminated.

At step S269, the terminal 30, in response to receipt of the printing completion message from the image forming apparatus 1200, displays on display part 13 a printing completion dialog to indicate that the printing process has been terminated.

In the terminal 30, which serves as an operator apparatus, the SOAP command creation part 210C of the client part 200C sets request commands sent to the image forming apparatuses 1000 and 1200 as SOAP commands incorporated in messages of HTTP requests (S251, S252, S254, S255, S256, S259 and S260). The SOAP response interpretation part 220C of the client part 200C extracts HTTP responses for process results corresponding to the HTTP requests.

In the image forming apparatus 1000, which serves as the document transmitter apparatus, the SOAP command analysis part 110B of the server part 100B analyzes request commands received from the terminal 30 and the image forming apparatus 1200 as SOAP commands, and the document management Web service execution part 130B executes processes corresponding to the HTTP requests. The SOAP response creation part 120B of the server part 100B provides the image forming apparatus 1200 and the terminal 30 with process results of the document management Web service execution part 130B as Web services (S251-2, S252-2, S254-2, S259-2, S261-2, S264-2 and S267-2).

On the other hand, in the image forming apparatus 1200, which serves as the document receiver apparatus, the SOAP command creation part 210 of the client part 200 sets request commands sent to the image forming apparatus 1000 as SOAP commands incorporated in messages of HTTP requests (S261, S264 and S267). The SOAP response interpretation part 220 of the client part 200 extracts HTTP responses for process results corresponding to the HTTP requests. Also, the SOAP command analysis part 110 of the server part 100 analyzes received request command as SOAP commands, and the SOAP response creation part 120 of the server part 100 provides the terminal 30 with process results corresponding to the SOAP commands as Web services (S255-2, S256-2 and S268-2).

According to the above-mentioned third document printing process, when a user of the terminal 30 selects a document stored in the image forming apparatus 1000, the image forming apparatus 1200 having the document process control part 300 can acquire the document in an appropriate document type from the image forming apparatus 1000 and print out the document by means of the plotter 1201.

Figure 25:
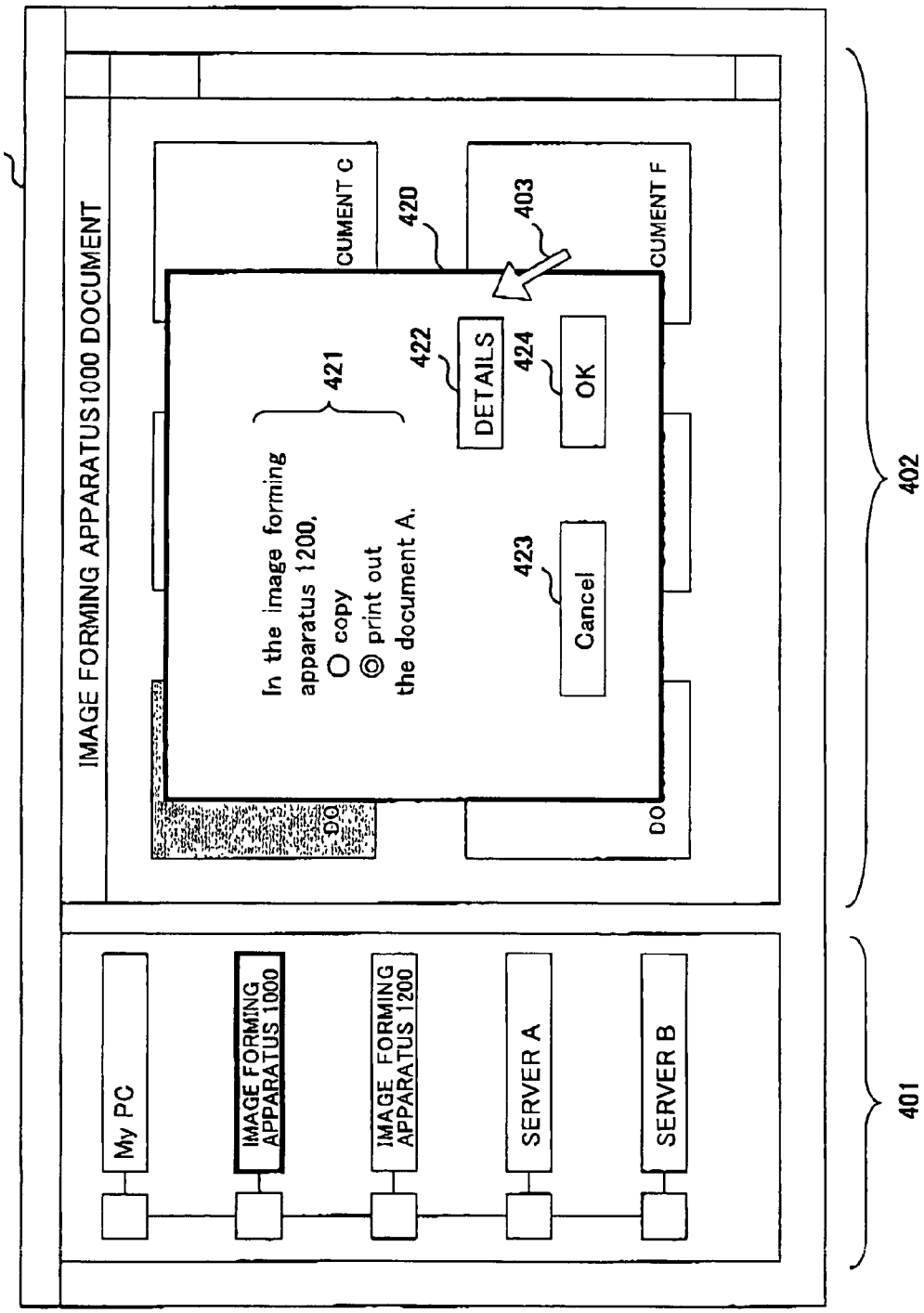
FIG. 25 is a diagram illustrating an exemplary copying or printing confirmation dialog according to the second embodiment.
Figure 26:
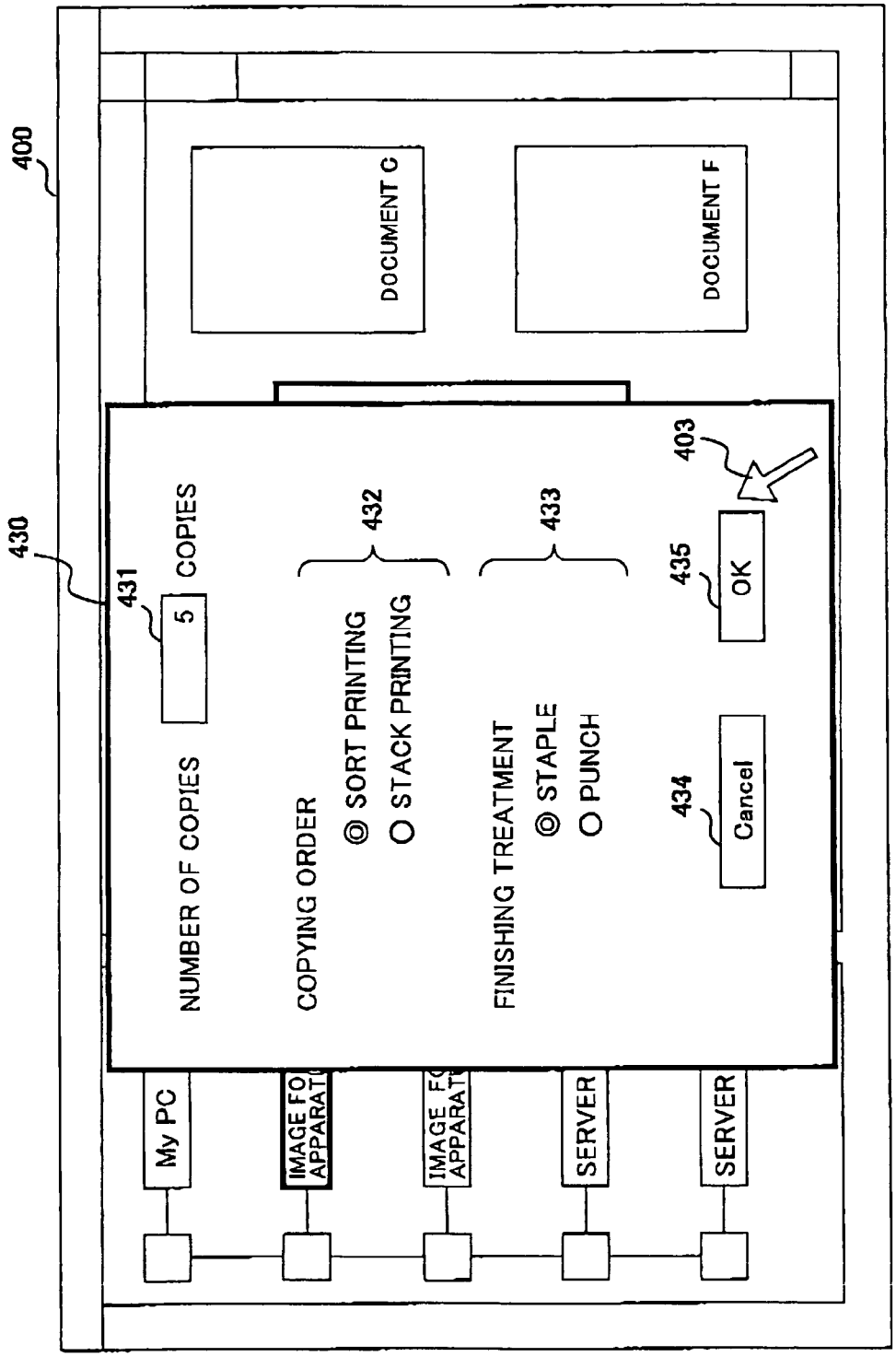
FIG. 26 is a diagram illustrating an exemplary printing process detail setting dialog according to the second embodiment.

A description is given, with reference to FIG. 25 and FIG. 26, of exemplary screens displayed on the operation panels 1310 and 1310B and the display part 13 according to the second embodiment.

FIG. 25 shows an exemplary copying or printing confirmation dialog 420 according to the second embodiment wherein the same components as those shown in FIG. 16 are designated by the same reference numerals and the description thereof is omitted.

Referring to FIG. 25, the copying or printing confirmation dialog 420 includes a selection area 421 to select a copying process or a printing process, a detail setting button 422 to set details of the selected process, a cancel button 423 to cancel the copying process or the printing process, and an OK button 424 to start the copying process or the printing process. If a user selects a document A in the copying manipulation screen 400 shown in FIG. 16, for example, a message such as "In the image forming apparatus 1200, ○ copy or ○ print out the document A." is displayed in the selection area 421, and the user is prompted to select the copying process or the printing process on the document A. When the user selects the printing process, the printing process is displayed as "⊙" as illustrated in FIG. 25.

If the user selects the printing process in the copying or printing confirmation dialog 420 and further chooses the detail setting button 422, the terminal 30 displays a printing process detail setting dialog to set details of the printing process as illustrated in FIG. 26.

FIG. 26 shows an exemplary printing process detail setting dialog according to the second embodiment wherein the same components as those shown in FIG. 16 are designated by the same reference numerals and the description thereof is omitted.

Referring to FIG. 26, the printing process detail setting dialog 430 includes a copy number setting area 431 to set the number of copies of a selected document, a printing order setting area 432 to set the printing order of the selected document, a finishing treatment setting area 433 to set a type of finishing treatments, a cancel button 435 to cancel the printing process, and an OK button 435 to start the printing process. In the copy number setting area 431, the user sets the number of copies of a selected document. If the user sets the copy number of the selected document as two or more, the user is allowed to select one of sort printing and stack printing in the printing order setting area 432. For example, if the user selects the sort printing, the sort printing is displayed as "⊙" as illustrated in FIG. 26. In addition, the user can select one of "staple" or "punch" as the finishing treatment in the finishing treatment setting area 433. For example, if the user selects "staple", the item "staple" is displayed as "⊙" as illustrated in FIG. 26. After the setting, when the user selects the OK button 435, the printing process is executed.

In the first and second embodiment of the present invention, when the image forming apparatus 1200 having the document process control part 300 requests a selected document stored in the image forming apparatus 1000 in the format of a document type that is determined based on document types processable to the image forming apparatuses 1000 and 1200, the corresponding image processing process can be performed in the image forming apparatus 1200 in cooperation with the apparatuses connected to each other via the network. For example, if the size of a document that the image forming apparatus 1000, which serves as the document transmitter apparatus, accommodates is greater than the maximal size of documents that the image forming apparatus 1200, which serves as the document receiver apparatus, can store, the document process control part 300 can use an image scaling function thereof to send a reduced-size page image to the image forming apparatus 1200 based on determination of the document type determination part 320.

Also, since the document process control part 300 flexibly controls cooperation with the image forming apparatuses 1000 and 1200 depending on types of processes such as a copying process and a printing process, it is possible to perform various types of processes through cooperation with apparatuses connected via a network.

In the first and second embodiments, the copying process and the printing process that are performed through cooperation with apparatuses connected via a network are described. However, the present invention is not limited to these processes The present invention is applicable to file management, scanner control and so on. Furthermore, the present invention is applicable to process information regarding the image forming apparatuses 1000 and 1200.

Also, the image forming apparatuses 1000 and 1200 and the terminal 30 according to the embodiments are not limited to communication via a fixed line LAN (Local Area Network). In other words, although physical layers differs in a network system, such as a wireless LAN and Bluetooth, SOAP messages can be exchanged in such a network system in accordance with TCP/IP (Transmission Control Protocol/Internet Protocol). Thus, it is possible to implement various processes according to the embodiments as Web services in accordance with http and SOAP. Furthermore, communicated contents are allowed to be extended in a parallel system, such as a centronics and SCSI. Thus, as long as there is agreement between devices that will communicate each other, it is possible to implement message exchange in accordance with SOAP.

A description is given, with reference to the FIG. 27 through FIG. 40, of a copying process according to a third embodiment of the present invention.

Figure 27:
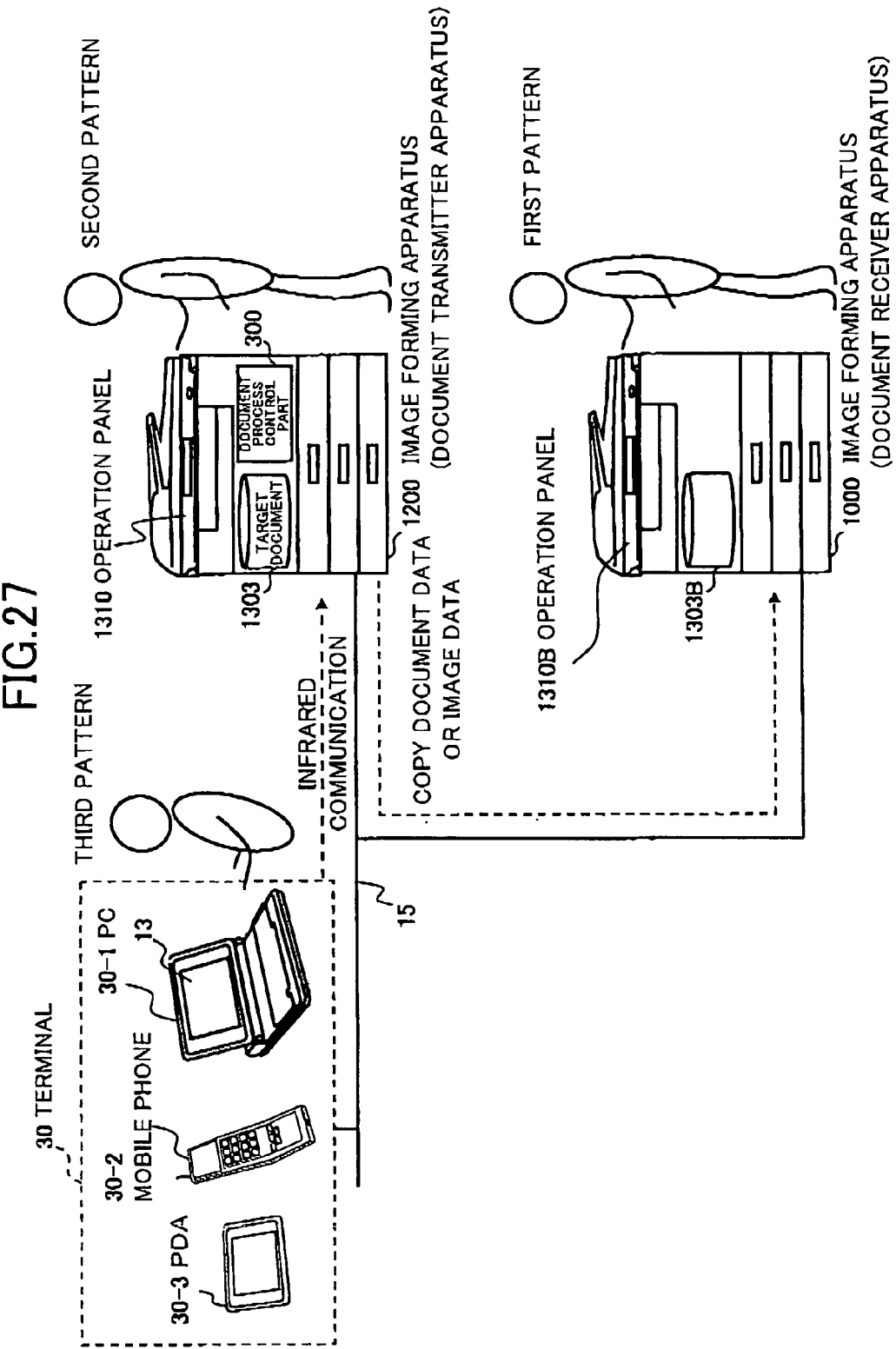
FIG. 27 is a diagram illustrating an exemplary structure of a network system according to a third embodiment of the present invention.

In the third embodiment, the image forming apparatus 1200 having the document process control part 300 serves as a document transmitter apparatus, and the image forming apparatus 1000 having no document process control part 300 serves as a document receiver apparatus, as illustrated in FIG. 27. Namely, a selected document stored in the image forming apparatus 1200 is copied to the image forming apparatus 1000 through user's manipulation.

In the third embodiment, the image forming apparatus 1200 has the same functional structure and hardware configuration as that according to the first embodiment. In other words, the image forming apparatus has the functional structure shown in FIG. 1 and the hardware configuration shown in FIG. 2. In particular, the image forming apparatus 1200 having the document process control part 300 has the functional structure shown in FIG. 4. In addition, the image forming apparatus 1000 has the same functional structure and hardware configuration as that according to the first embodiment. In other words, the image forming apparatuses 1200 has the functional components shown in FIG. 1 and the hardware configuration shown in FIG. 2. In particular, the image forming apparatus 1000 having no document process control part 300 has the functional components shown in FIG. 5. Furthermore, the terminal 30 has the same functional structure as that according to the first embodiment. In other words, the terminal 30 has the functional components shown in FIG. 6. For this reason, the description thereof is omitted.

A description is given, with reference to FIG. 27, of how the image forming apparatus 1200 according to the third embodiment provides a Web service to other apparatuses connected via a network.

FIG. 27 shows an exemplary structure of a network system according to the third embodiment. In the illustrated network system, the image forming apparatus 1200, the image forming apparatus 1000, and the terminal 30 are connected to each other via a network 15. The image forming apparatus 1000 does not have to include the document process control part 300 in the document management Web service application 1216 shown in FIG. 1.

Referring to FIG. 27, document data or image data (hereinafter which are collectively referred to as a document) stored in HDD 1303 of the image forming apparatus 1200 are copied to the image forming apparatus 1000 in accordance with illustrated three patterns. In the illustrative embodiment, the image forming apparatus 1200, which serves as a document transmitter apparatus, sends a document stored therein to the image forming apparatus 1000. On the other hand, the image forming apparatus 1000, which serves as a document receiver apparatus, receives the document from the image forming apparatus 1200, and the document is copied to the image forming apparatus 1200 by storing the document in HDD 1303B of the image forming apparatus 1000.

In the first pattern according to the third embodiment, a document stored in the image forming apparatus 1200 is copied to the image forming apparatus 1000 through user's manipulation on the operation panel 1310B of the image forming apparatus 1000. In the second pattern according to the third embodiment, a document stored in the image forming apparatus 1200 is copied to the image forming apparatus 1000 through user's manipulation on the operation panel 1310 of the image forming apparatus 1200. In the third pattern according to the third embodiment, a document stored in the image forming apparatus 1200 is copied to the image forming apparatus 1000 through user's manipulation on the display part 13 of the terminal 30.

Figure 28:
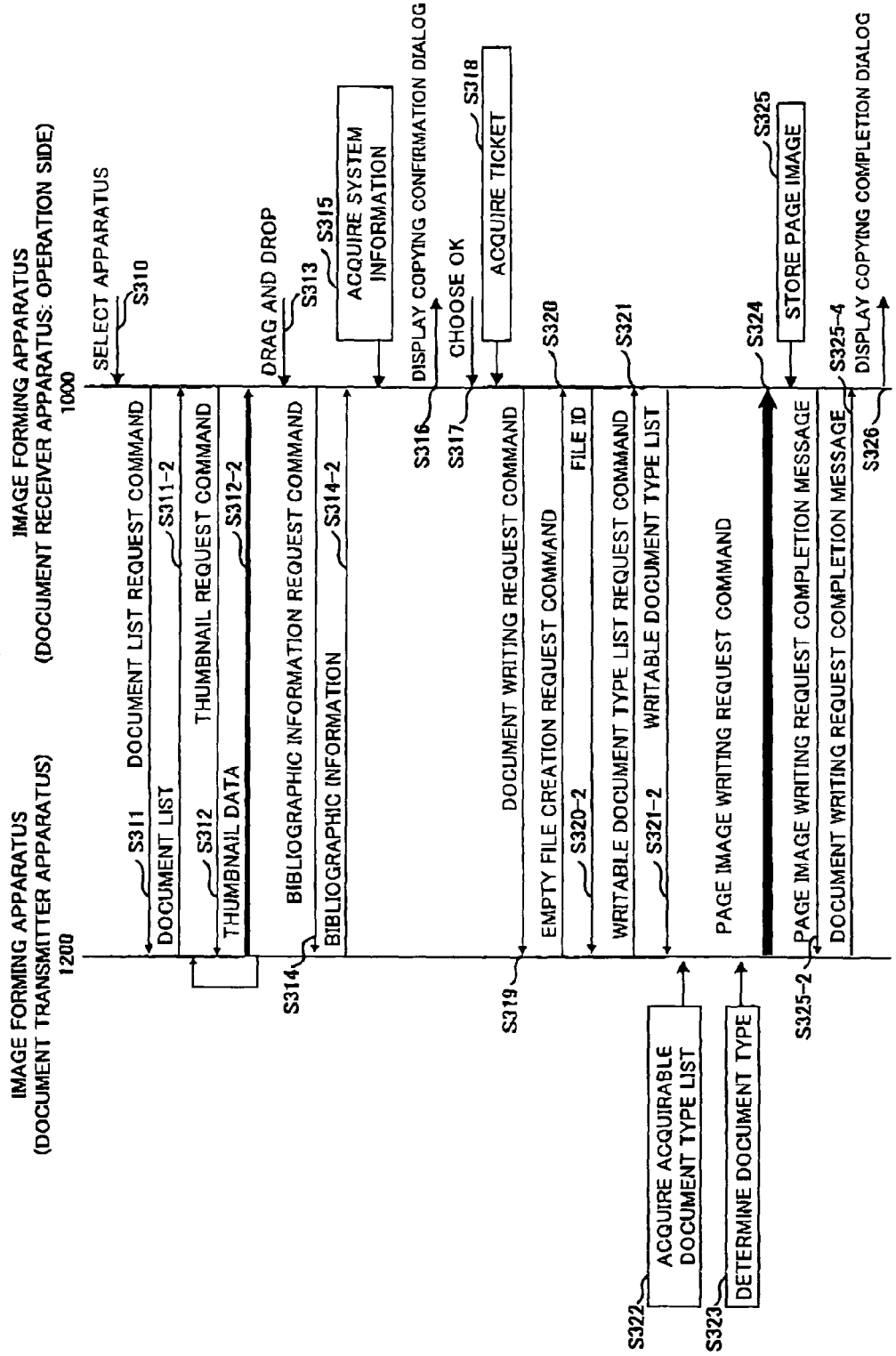
FIG. 28 is a diagram illustrating an exemplary operation of a first document copying process for a first pattern according to the third embodiment.

A description is given, with reference to FIG. 28, of a first document copying process for the first pattern shown in FIG. 27 according to the third embodiment.

In the first pattern, a selected document stored in the image forming apparatus 1200 is copied to the image forming apparatus 1000 through user's manipulation on the operation panel 1310 of the image forming apparatus 1200.

FIG. 28 shows an exemplary operation of the first document copying process for the first pattern according to the third embodiment.

Referring to FIG. 28, a user of the image forming apparatus 1000 selects the image forming apparatus 1200 accommodating a desired document from listed apparatuses, which are displayed on the operation panel 1310B, connected to the image forming apparatus 1000 via the network 15 at step S310.

At step S311, the image forming apparatus 1000 sends to the image forming apparatus 1200 a document list request command to request a list of documents stored in the image forming apparatus 1200.

At step S311-2, the image forming apparatus 1200, in response to receipt of the document list request command from the image forming apparatus 1000, uses the document management Web service execution part 130 to acquire the document list from HDD 1303 and sends the document list to the image forming apparatus 1000.

At step S312, the image forming apparatus 1000, in response to receipt of the document list from the image forming apparatus 1200, sends to the image forming apparatus 1200 a thumbnail request command to request thumbnail data to de displayed on the operation panel 1310B.

At step S312-2, when the image forming apparatus 1200 receives the thumbnail request command from the image forming apparatus 1000, the document management Web service execution part 130 operates corresponding to the thumbnail request command. Then, the image forming apparatus 1200 sends to the image forming apparatus 1000 thumbnail data acquired by the document management Web service execution part 130. For example, the thumbnail data are reduced-size image data of the top pages of documents stored in the image forming apparatus 1200.

At step S313, when the document list of the image forming apparatus 1200 is displayed in thumbnail representation on the operation panel 1310B of the image forming apparatus 1000, the user determines which document should be copied to which apparatus by dragging and dropping a thumbnail of a desired document to a desired apparatus. In this embodiment, the user drags and drops a document stored in the image forming apparatus 1200 toward the image forming apparatus 1000.

At step S314, the image forming apparatus 1000 sends to the image forming apparatus 1200 a bibliographic information request command to request bibliographic information regarding the selected document.

At step S314-2, the image forming apparatus 1200, in response to receipt of the bibliographic information request command from the image forming apparatus 1000, uses the document management Web service execution part 130 to acquire the bibliographic information from HDD 1303 and sends the bibliographic information to the image forming apparatus 1000.

At step S315, the image forming apparatus 1000, in response to receipt of the bibliographic information from the image forming apparatus 1200, internally acquires system information and examines feasibility of the copying process using a ticket.

At step S316, the image forming apparatus 1000 displays a copying confirmation dialog on the operation panel 1310B.

When the user chooses OK to start the copying process at step S317, the image forming apparatus 1000 internally issues a ticket to write a document in the image forming apparatus 1000, and acquires the ticket at step S318.

At step S319, the image forming apparatus 1000 sends to the image forming apparatus 1200 a document writing request command to write a document by authority of the ticket.

At step S320, when the image forming apparatus 1200 receives the document writing request command from the image forming apparatus 1000, the sequence control part 310 starts to control cooperation with the image forming apparatus 1000 to perform the copying process. The image forming apparatus 1200 uses the sequence control part 310 to send to the image forming apparatus 1000 an empty file creation request command to create an empty file.

At step S320-2, the image forming apparatus 1000, in response to receipt of the empty file creation request command from the image forming apparatus 1200, creates an empty file and sends the file ID of the empty file to the image forming apparatus 1200.

At step S321, the image forming apparatus 1200, in response to receipt of receipt of the file ID from the image forming apparatus 1000, uses the sequence control part 310 to send to the image forming apparatus 1000 a writable document type list request command to request a list of document types writable in the image forming apparatus 1000.

At step S321-2, the image forming apparatus 1000, in response to receipt of the writable document type list from the image forming apparatus 1200, sends the writable document type list to the image forming apparatus 1200.

At step S322, the image forming apparatus 1200, in response to receipt of the writable document type list from the image forming apparatus 1000, maintains the writable document type list as a receiver document type list 304. Then, the image forming apparatus 1200 uses the sequence control part 310 to internally issue an acquirable document type list request command to request a list of document types acquirable from the image forming apparatus 1200, and maintains the acquirable document type list as a transmitter document type list 302.

At step S323, the sequence control part 310 of the image forming apparatus 1200 uses the document type determination part 320 to determine whether or not there is a document type acquirable from the image forming apparatus 1200 and writable in the image forming apparatus 1000 based on the transmitter document type list 302 and the receiver document type list 304, and determines the best document type. Based on the determination, if there are a plurality of such document types, the document type determination part 320 determines one of the document types as the best document type. If there is no such a document type, the document type determination part 320 determines a predetermined document type as the best document type.

At step S324, the sequence control part 310 sends to the image forming apparatus 1000 a page image writing request command to write a page image in the empty file of the image forming apparatus 1000 corresponding to the file ID by authority of the ticket.

At step S325, the image forming apparatus 1000, in response to receipt of the page image from the image forming apparatus 1200, uses the document management Web service execution part 130B to store the page image in the empty file.

At step S325-2, after storing of all page images of the selected document, the image forming apparatus 1000 sends a copying completion message to the image forming apparatus 1200. In the page image writing request command, for example, a plurality of page images of the selected document may be designated. Alternatively, whenever the image forming apparatus 1000 receives each page image from the image forming apparatus 1200, the image forming apparatus 1000 may iteratively store the page image in the identified file.

At step S325-4, the image forming apparatus 1200, in response to receipt of the copying completion message from the image forming apparatus 1000, in turn, sends to the image forming apparatus 1000 a document writing request completion message to indicate that the document writing request command has been fulfilled.

At step S326, the image forming apparatus 1000, in response to receipt of the document writing request completion message from the image forming apparatus 1200, displays a copying completion dialog on the operation panel 1310B.

In the image forming apparatus 1200, which serves as the document transmitter apparatus, the SOAP command creation part 210 of the client part 200 sets request commands sent to the image forming apparatus 1000 as SOAP commands incorporated in messages of HTTP requests (S320, S321 and S324), and the SOAP response interpretation part 220 of the client part 200 extracts HTTP responses for process results corresponding to the HTTP requests.

On the other hand, in the image forming apparatus 1000, which serves as the document receiver apparatus, the SOAP analysis part 110B of the server part 100B analyzes request commands received from the image forming apparatus 1200 as SOAP commands, and the document management Web service execution part 130B executes processes corresponding to the HTTP requests. The SOAP response creation part 120B of the server part 100B provides process results of the document management Web service execution part 130B as Web services to the image forming apparatus 1200 (S320-2, S321-2 and S325-2).

According to the above-mentioned first document copying process for the first pattern shown in FIG. 27, when a user of the image forming apparatus 1000 selects a document stored in the image forming apparatus 1200, the image forming apparatus 1200 having the document process control part 300 can write the document in HDD 1303B of the image forming apparatus 1000 in an appropriate document type.

A description is given, with reference to FIG. 29, of a second document copying process for the above-mentioned second pattern shown in FIG. 27 according to the third embodiment.

In the second pattern, a selected document stored in the image forming apparatus 1200 is copied to the image forming apparatus 1000 through user's manipulation on the operation panel 1310 of the image forming apparatus 1200.

FIG. 29 shows an exemplary operation of the second document copying process for the second pattern according to the third embodiment.

Referring to FIG. 29, a user of the image forming apparatus 1200 selects the image forming apparatus 1200 itself accommodating a desired document from listed apparatuses, which are displayed on the operation panel 1310, connected to the image forming apparatus 1200 via the network 15 at step S330.

At step S331, the image forming apparatus 1200 internally generates a document list request command to request a list of documents stored in the image forming apparatus 1200, and uses the document management Web service execution part 130 to acquire the document list from HDD 1303.

At step S332, the image forming apparatus 1200, in response to receipt of the document list from the document management Web service execution part 130, internally generates a thumbnail request command to request thumbnail data to de displayed on the operation panel 1310, acquires the thumbnail data through the document management Web service execution part 130, and displays thumbnails of individual documents stored in the image forming apparatus 1200 on the operation panel 1310 based on the thumbnail data.

At step S333, when the document list of the image forming apparatus 1200 is displayed in thumbnail representation on the operation panel 1310 of the image forming apparatus 1200, the user determines which document should be copied to which apparatus by dragging and dropping a thumbnail of a desired document toward a desired apparatus. In this embodiment, the user drags and drops a document stored in the image forming apparatus 1200 toward the image forming apparatus 1000.

At step S334, the image forming apparatus 1200 internally generates a bibliographic information request command to request bibliographic information regarding the selected document, and acquires the bibliographic information from HDD 1303 through the document management Web service execution part 130.

At step S335, the image forming apparatus 1200, in response to receipt of the bibliographic information from the document management Web service execution part 130, sends to the image forming apparatus 1000 a system information request command to request system information regarding the image forming apparatus 1000.

At step S335-2, the image forming apparatus 1000, in response to receipt of the system information request command from the image forming apparatus 1200, acquires the system information including ticket information indicative of feasibility of the copying process using a ticket, and sends the system information to the image forming apparatus 1200.

At step S336, the image forming apparatus 1000 displays a copying confirmation dialog on the operation panel 1310.

When the user chooses OK to start the copying process at step S337, the image forming apparatus 1200 sends to the image forming apparatus 1000 a document writing ticket request command to request a ticket to write a document in the image forming apparatus 1000 at step S338.

At step S338-2, the image forming apparatus 1000, in response to receipt of the document writing ticket request command from the image forming apparatus 1200, sends the ticket to the image forming apparatus 1200.

At step S339, the image forming apparatus 1200, in response to receipt of the ticket from the image forming apparatus 1000, internally issues a document writing request command by authority of the ticket.

At step S340, the document process control part 300 of the image forming apparatus 1200 starts to control cooperation with the image forming apparatus 1000 to perform the copying process. The image forming apparatus 1200 uses the sequence control part 310 to send to the image forming apparatus 1000 an empty file creation request command to create an empty file.

At step S340-2, the image forming apparatus 1000, in response to receipt of the empty file creation request command from the image forming apparatus 1200, creates an empty file and sends the file ID of the empty file to the image forming apparatus 1200.

At step S341, the image forming apparatus 1200, in response to receipt of receipt of the file ID from the image forming apparatus 1000, uses the sequence control part 310 to send to the image forming apparatus 1000 a writable document type list request command to request a list of document types writable in the image forming apparatus 1000.

At step S341-2, the image forming apparatus 1000, in response to receipt of the writable document type list request command from the image forming apparatus 1200, sends the writable document type list to the image forming apparatus 1200.

At step S342, the image forming apparatus 1200, in response to receipt of the writable document type list from the image forming apparatus 1000, maintains the writable document type list as a receiver document type list 304. Then, the image forming apparatus 1200 uses the sequence control part 310 to internally issue an acquirable document type list request command to request a list of document types acquirable from the image forming apparatus 1200, and maintains the acquirable document type list as a transmitter document type list 302.

At step S343, the sequence control part 310 of the image forming apparatus 1200 uses the document type determination part 320 to determine whether or not there is a document type acquirable from the image forming apparatus 1200 and writable in the image forming apparatus 1000 based on the transmitter document type list 302 and the receiver document type list 304, and determines the best document type. Based on the determination, if there are a plurality of such document types, the document type determination part 320 determines one of the document types as the best document type. If there is no such a document type, the document type determination part 320 determines a predetermined document type as the best document type.

At step S344, the sequence control part 310 sends to the image forming apparatus 1000 a page image writing request command to write a page image in the empty file identified by the file ID by authority of the ticket.

At step S345, the image forming apparatus 1000, in response to receipt of the page image from the image forming apparatus 1200, uses the document management Web service execution part 130B to store the page image in the identified empty file.

At step S345-2, after storing of all page images of the selected document, the image forming apparatus 1000 sends a copying completion message to the image forming apparatus 1200. In the page image writing request command, for example, a plurality of page images of the selected document may be designated. Alternatively, whenever the image forming apparatus 1000 receives each page image from the image forming apparatus 1200, the image forming apparatus 1000 may iteratively store the page image in the identified file.

At step S346, the image forming apparatus 1200, in response to receipt of the copying completion message from the image forming apparatus 1000, displays a copying completion dialog on the operation panel 1310.

In the image forming apparatus 1200, which serves as the document transmitter apparatus, the SOAP command creation part 210 of the client part 200 sets request commands sent to the image forming apparatus 1000 as SOAP commands incorporated in messages of HTTP requests (S335, S338, S340, S341 and S344), and the SOAP response interpretation part 220 of the client part 200 extracts HTTP responses for process results corresponding to the HTTP requests. Also, the SOAP command analysis part 110 of the server part 100 analyzes request commands received from the image forming apparatus 1000 as SOAP commands, and determines whether or not the SOAP commands are document writing request commands using a ticket.

On the other hand, in the image forming apparatus 1000, which serves as the document receiver apparatus, the SOAP command creation part 210B of the client part 200B sets request commands sent to the image forming apparatus 1200 as SOAP commands incorporated in messages of HTTP requests, the SOAP interpretation part 2208 of the client part 200B extracts HTTP responses indicative of process results corresponding to the HTTP requests. Also, the SOAP command analysis part 110B of the server part 100B analyzes request commands received from the image forming apparatus 1200 as SOAP commands.

According to the above-mentioned second document copying sequence for the second pattern shown in FIG. 27, when a user of the image forming apparatus 1200 selects a document stored in the image forming apparatus 1200, the image forming apparatus 1200 having the document process control part 300 can write the document in HDD 1303B of the image forming apparatus 1000 in an appropriate document type.

A description is given, with reference to FIG. 30, of a third document copying process for the above-mentioned third pattern in FIG. 27 according to the third embodiment.

In the third pattern, a selected document stored in the image forming apparatus 1200 is copied to the image forming apparatus 1000 through user's manipulation on the display part 13 of the terminal 30.

FIG. 30 shows an exemplary operation of the third document copying process for the third pattern according to the third embodiment.

Referring to FIG. 30, a user of the terminal 30 selects the image forming apparatus 1200 accommodating a desired document from listed apparatuses, which are displayed on the display part 13, connected to the terminal 30 via the network 15 at step S350.

At step S351, the terminal 30 sends to the image forming apparatus 1200 a document list request command to request a list of documents stored in the image forming apparatus 1200.

At step S351-2, the image forming apparatus 1200, in response to receipt of the document list request command from the terminal 30, uses the document management Web service execution part 130 to acquire the document list from HDD 1303, and sends the document list to the terminal 30.

At step S352, the terminal 30, in response to receipt of the document list from the image forming apparatus 1200, sends to the image forming apparatus 1200 a thumbnail request command to request thumbnail data to be displayed on the display part 13.

At step S352-2, the image forming apparatus 1200, in response to receipt of the thumbnail request command from the terminal 30, uses the document management Web service execution part 130 to operate corresponding to the thumbnail request command. When the image forming apparatus 1200 acquires the thumbnail data through the document management Web service execution part 130, the image forming apparatus 1200 sends the thumbnail data to the terminal 30. Here, the thumbnail data are reduced-size image data of the top pages of documents stored in the image forming apparatus 1200.

At step S353, when the document list of the image forming apparatus 1200 is displayed in thumbnail representation on the display part 13 of the terminal 30 based on the received thumbnail data, the user determines which document should be copied to which apparatus by dragging and dropping a thumbnail of a desired document toward a desired apparatus. In this embodiment, the user drags and drops a document in the image forming apparatus 1200 toward the image forming apparatus 1000.

At step S354, the terminal 30 sends to the image forming apparatus 1200 a bibliographic information request command to request bibliographic information regarding the selected document.

At step S354-2, the image forming apparatus 1200, in response to receipt of the bibliographic information request command from the terminal 30, uses the document management Web service execution part 130 to acquire the bibliographic information from HDD 1303, and sends the bibliographic information to the terminal 30.

At step S355, the terminal 30, in response to receipt of the bibliographic information from the image forming apparatus 1200, sends to the image forming apparatus 1200 a system information request command to request system information.

At step S355-2, the terminal 30, in response to receipt of the system information request command from the image forming apparatus 1200, examines feasibility of the copying process using a ticket.

At step S356, the terminal 30 displays a copying confirmation dialog on the display part 13.

When the user chooses OK to start the copying process at step S357, the terminal 30 sends to the image forming apparatus 1000 a document writing ticket request command to request a ticket to write a document in the image forming apparatus 1000 at step S358.

At step S358-2, the image forming apparatus 1000, in response to receipt of the document writing ticket request command from the terminal 30, sends the ticket to the terminal 30.

At step S359, the terminal 30, in response to receipt of the ticket from the image forming apparatus 1000, sends to the image forming apparatus 1200 a document writing request command to write the selected document in the image forming apparatus 1000 by authority of the ticket.

At step S360, when the image forming apparatus 1200 receives the document writing request command using the ticket from the terminal 30, the sequence control part 310 of the document process control part 300 starts to control cooperation with the image forming apparatus 1000 to perform the copying process. The image forming apparatus 1200 uses the sequence control part 310 to send to the image forming apparatus 1000 an empty file creation request command to create an empty file.

At step S360-2, the image forming apparatus 1000, in response to receipt of the empty file creation request command from the image forming apparatus 1200, creates an empty file and sends the file ID of the empty file to the image forming apparatus 1200.

At step S361, the image forming apparatus 1200, in response to receipt of the file ID from the image forming apparatus 1000, uses the sequence control part 310 to send to the image forming apparatus 1000 a writable document type list request command to request a list of document types writable in the image forming apparatus 1000.

At step S361-2, the image forming apparatus 1000, in response to receipt of the writable document type list request command from the image forming apparatus 1200, sends the writable document type list to the image forming apparatus 1200.

At step S362, the image forming apparatus 1200, in response to receipt of the writable document type list from the image forming apparatus 1000, maintains the writable document type list as a receiver document type list 304. Then, the image forming apparatus 1200 uses the sequence control part 310 to internally issue an acquirable document type list request command to request a list of document types acquirable from the image forming apparatus 1200, and maintains the acquirable document type list as a transmitter document type list 302.

At step S363, the sequence control part 310 of the image forming apparatus 1200 uses the document type determination part 320 to determine whether or not there is a document type acquirable from the image forming apparatus 1200 and writable in the image forming apparatus 1000 based on the transmitter document type list 302 and the receiver document type list 304, and determines the best document type. Based on the determination, if there are a plurality of such document types, the document type determination part 320 determines one of the document types as the best document type. If there is no such a document type, the document type determination part 320 determines a predetermined document type as the best document type.

At step S364, the sequence control part 310 sends to the image forming apparatus 1000 a page image writing request command to write a page image in the empty file identified by the file ID by authority of the ticket.

At step S365, the image forming apparatus 1000, in response to receipt of the page image from the image forming apparatus 1200, uses the document management Web service execution part 130B to store the page image in the identified empty file.

At step S365-2, after storing of all page images of the selected document, the image forming apparatus 1000 sends a copying completion message to the image forming apparatus 1200. In the page image writing request command, for example, a plurality of page images of the selected document may be designated. Alternatively, whenever the image forming apparatus 1000 receives each page image from the image forming apparatus 1200, the image forming apparatus 1000 may iteratively store the page image in the identified file.

At step S365-4, the image forming apparatus 1200, in response of the copying completion message from the image forming apparatus 1000, sends to the terminal 30 a document writing request completion message to indicate that the document writing request command has been fulfilled.

At step S366, the terminal 30, in response to receipt of the document writing request completion message from the image forming apparatus 1200, displays a copying completion dialog on the display part 13.

In the terminal 30, which serves as an operator apparatus, the SOAP command creation part 210C of the client part 200C sets request commands sent to the image forming apparatus 1000 or 1200 as SOAP commands incorporated in messages of HTTP requests (S351, S352, S354, S355, S358 and S359), and the SOAP response interpretation part 220C of the client part 200C extracts HTTP responses for process results corresponding to the HTTP requests.

In the image forming apparatus 1000, which serves as the document receiver apparatus, the SOAP command analysis part 110B of the server part 1002 analyzes received request commands as SOAP commands, and the document management Web service execution part 130B executes processes corresponding to the HTTP requests. Then, the SOAP response creation part 120B of the server part 100 provides process results of the document management Web service execution part 130B as Web services to the terminal 30 or the image forming apparatus 1200 (S335-2, S338-2, S360-2, S361-2 and S365-2).

In the image forming apparatus 1200, which serves as the document transmitter apparatus, the SOAP command creation part 210 of the client part 200 sets request commands sent to the image forming apparatus 1000 as SOAP commands incorporated in messages of HTTP requests (S360, S361 and S364), and the SOAP response interpretation part 220 of the client part 200 extracts HTTP responses for process results corresponding to the HTTP requests. Also, the SOAP command analysis part 110 of the server part 100 analyzes received request commands as SOAP commands, and provides process results corresponding to the SOAP commands as Web services to the terminal 30 (S351-2, S352-2, S354-2 and S364-4).

According to the above-mentioned third document copying process for the third pattern shown in FIG. 27, when a user of the terminal 30 selects a document stored in the image forming apparatus 1200, the document can be copied from the image forming apparatus 1200 to the image forming apparatus 1000 by storing the document in HDD 1303B of the image forming apparatus 1000 in an appropriate document type.

A description is given, with reference to FIG. 31 through FIG. 36, of the above-mentioned individual HTTP requests and the corresponding HTTP responses according to the third embodiment.

FIG. 31 shows an exemplary HTTP request for a document writing request command using a ticket according to the third embodiment.

Referring to FIG. 31, a code portion 31 indicates a URL to which the HTTP request should be sent by POST method. For example, the URL "netdoc" is designated in the code portion 31. Furthermore, a code portion 32 indicates a URL to indicate the purpose of the HTTP request. For example, the URL "http://foo.bar.com/netdoc/documentmanagement" is described in the code portion 32 to designate document management as the purpose of the HTTP request.

In a code portion 33, a SOAP header is provided to indicate a root element. In a code portion 34, a SOAP body is provided. The code portion 34 includes a code portion 35 ranging from <ns:documentmanagement> to </ns:documentmanagement>. In the code portion 35, a SOAP command to specify a requested process, information referred to for the process and others are described. In the document writing request command using a ticket, a ticket number is specified in a code portion 36 ranging from <ticketId> to </ticketId>, and the SOAP command is specified in a code portion 37 ranging from <operation> to </operation>. For example, "456" and "insertFileByTicket" are designated as the ticket number and the SOAP command, respectively, in the illustration.

FIG. 32 shows an exemplary HTTP response corresponding to the HTTP request shown in FIG. 31 according to the third embodiment.

Referring to FIG. 32, a code portion 42 indicates that the HTTP request shown in FIG. 10 has been successfully fulfilled. In a code portion 43, a SOAP header is provided to indicate a root element. In a code portion 44, a SOAP body is provided. The code portion 44 includes a code portion 45 ranging from <ns:documentmanagementResponse> to </ns:documentmanagementResponse>. In the code portion 45, "success" to indicate that the requested process has been successfully terminated is described.

FIG. 33 shows an exemplary HTTP request for a writable document type list request command according to the third embodiment. In FIG. 33, the same code portions as those shown in FIG. 31 are designated by the same reference numerals and the description thereof is omitted.

Referring to FIG. 33, a code portion 34 is the SOAP body of the HTTP request. In a code portion 50 ranging from <operation> to </operation>, a SOAP command "getFileVariation" is designated.

FIG. 34 shows an exemplary HTTP response for the writable document type list request command shown in FIG. 33 according to the third embodiment. In FIG. 34, the same code portions as those shown in FIG. 32 are designated by the same reference numerals and the description thereof is omitted.

Referring to FIG. 34 a code portion 44 is the SOAP body of the HTTP response. In code portions 52, 53 and 54, each of which ranges from <type> to </type>, three document types writable in the image forming apparatus 1000 are set. In the code portion 52, a compression format of image data is designated as "Tiff" by sandwiching between <format> and </format>. An image type is designated as "1 bit/dot" by sandwiching between <imageType> and </imageType>. A resolution is designated as "600×600" by sandwiching between <binary> and </binary>. In the code portion 53, a compression format of image data is designated as "Jpeg" by sandwiching between <format> and </format>. An image type is designated as "8 bit/dot" by sandwiching between <imageType> and </imageType>. A resolution is designated as "300×300" by sandwiching between <binary> and </binary>. In the code portion 54, a compression format of image data is designated as "Jpeg2000" by sandwiching between <format> and </format>. An image type is designated as "8 bit/dot" by sandwiching between <imageType> and </imageType>. A resolution is designated as "600×600" by sandwiching between <binary> and </binary>.

When the image forming apparatus 1200 receives such an HTTP response, the SOAP response interpretation part 220 extracts document types from the code portions 52 through 54, and the document types {"Tiff", "1 bit/dot", 600×600}, {"Jpeg", "8 bit/dot", 300×300} and {"Jpeg2000", "8 bit/dot", 600×600} are set as a transmitter document type list 302. On the other hand, for example, when the image forming apparatus 1200 acquires document types {"Tiff", "8 bit/dot", 600×600} and {"Jpeg", "8 bit/dot", 300×300} by internally issuing an acquirable document type list request command, the document types {"Tiff", "8 bit/dot", 600×600} and {"Jpeg", "8 bit/dot", 300×300} are set as a receiver document type list 304. The document type determination part 320 determines whether or not there is a document type commonly included in the transmitter document type list 302 and the receiver document type list 304. In this example, the document type determination par 320 selects the document type {"Jpeg", "8 bit/dot", 300×300}, because only the document type {"Jpeg", "8 bit/dot", 300×300} is commonly included in the transmitter document type list 302 and the receiver document type list 304. The determined document type is set in an HTTP request as illustrated in FIG. 35.

FIG. 35 shows an exemplary HTTP request for a page image writing request command according to the third embodiment. In FIG. 35, the same code portions as those shown in FIG. 31 are designated by the same reference numerals and the description thereof is omitted.

Referring to FIG. 35, a code portion 81 indicates that there are a plurality of differently formatted data items in the HTTP request. In code portions 86, "XX_boundary" indicates a boundary between the data items. In a code portion 82, text data information is provided. For example, the text data information may include a text description type, a code type, and the length of the text data. In a code portion 80, a SOAP command is specified by sandwiching between <operation> and </operation>. For example, if "putFile(FileID)" is designated as the SOAP command, a page image is written in a file identified by FileID in the image forming apparatus 1000.

On the other hand, in a code portion 84, image data information is provided. For example, the image data information may include an image data type, a transferred data type such as "text" or "binary", and the length of the image data. Subsequently, image data 65 are provided. For example, if the data type is "Tiff" and the transferred data type is "binary", the binary Tiff image data 65 are provided.

In order to copy a document stored in the image forming apparatus 1200, the image forming apparatus 1000 extracts the binary Tiff image data from the HTTP request shown in FIG. 35 and stores the image data in HDD 1303B.

FIG. 36 shows an exemplary HTTP response for the page image writing request command shown in FIG. 35 according to the third embodiment. In FIG. 36, the same code portions as those shown in FIG. 31 are designated by the same reference numerals and the description thereof is omitted.

Referring to FIG. 36, in a code portion 87 ranging from <ns:documentmanagementResponse> to </ns:documentmanagementResponse>, a result of the copying process is provided. For example, in a code portion 88, "success" to indicate that the requested process has been successfully terminated is provided by sandwiching between <result> and </result>.

In the above description, the HTTP request incorporating image data is sent to the image forming apparatus 1000. However, the image data may be transmitted and received, for example, in accordance with file transfer protocol (ftp3).

In the third embodiment of the present invention, the following SOAP commands are used.

TABLE 2

| SOAP command | Operation |
| --- | --- |
| getList | get a document list |
| getThumbnail | get thumbnail images |
| getFileInfo | get file bibliographic information |
| getSystemInfo | get system information |
| getFileVariation | get an acquirable or writable document type list |
| getInsertTicket | get a ticket to write (insert) a document |
| insertFileByTicket | write (insert) document data through a ticket |
| creatDoc | create an empty document |
| putFile(FileID) | write a document in a file identified by FileID |

These SOAP commands are designated by sandwiching between <operation> and </operation> in a SOAP body as described with reference to FIG. 31, FIG. 33 and FIG. 35.

A description is given, with reference to FIG. 37 through FIG. 40, of exemplary screens displayed on the operation panels 1310 and 1310B and the display part 13 according to the third embodiment.

FIG. 37 shows an exemplary copying manipulation screen 400 according to the third embodiment.

Referring to FIG. 37, the copying manipulation screen 400 includes an apparatus list display area 401 to display a list of apparatuses connected to each other via the network 15, and a thumbnail display area 402 to display thumbnails of individual documents stored in an apparatus selected in the apparatus list display area 401.

In the copying manipulation screen 400, for example, when a user selects the image forming apparatus 1200 as a document transmitter apparatus from listed apparatuses displayed on the apparatus list display area 401, a list of documents stored in the image forming apparatus 1200 is displayed in thumbnail representation in the thumbnail display area 402. In the thumbnail display area 402, the user selects a document A and further designates the image forming apparatus 1000 as a document receiver apparatus through user's dragging and dropping operations by means of an arrow 403, as illustrated in FIG. 37. At this time, the user may select a plurality of documents.

Figure 38:
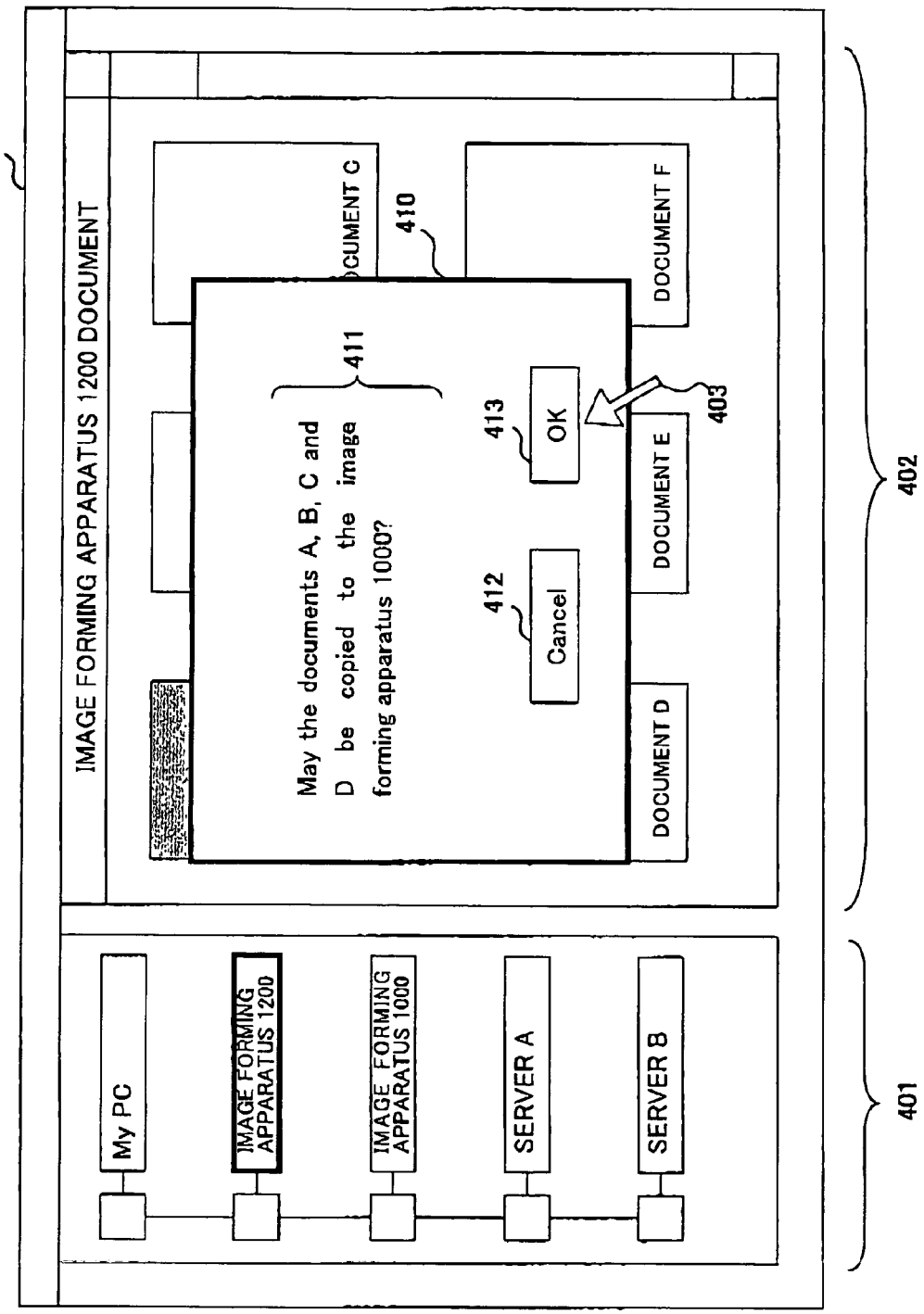
FIG. 38 is a diagram illustrating an exemplary copying confirmation dialog according to the third embodiment.

When the user designates the image forming apparatus 1000 as the document receiver apparatus through the dragging and dropping operations, a copying confirmation dialog is displayed so that the user can confirm the copying process as illustrated in FIG. 38.

FIG. 38 shows an exemplary copying confirmation dialog 410 according to the third embodiment.

Referring to FIG. 38, the copying confirmation dialog 410 includes a message display area 411 to display a message to the user, a cancel button 412 to cancel the copying process, and an OK button 413 to start the copying process.

For example, if the user selects a plurality of documents A, B, C and D in the copying manipulation screen 400 shown in FIG. 37, a message such as "May the documents A, B, C and D be copied to the image forming apparatus 1000?" is displayed in the message display area 411 so that the user can confirm the selected documents and apparatus.

Figure 39:
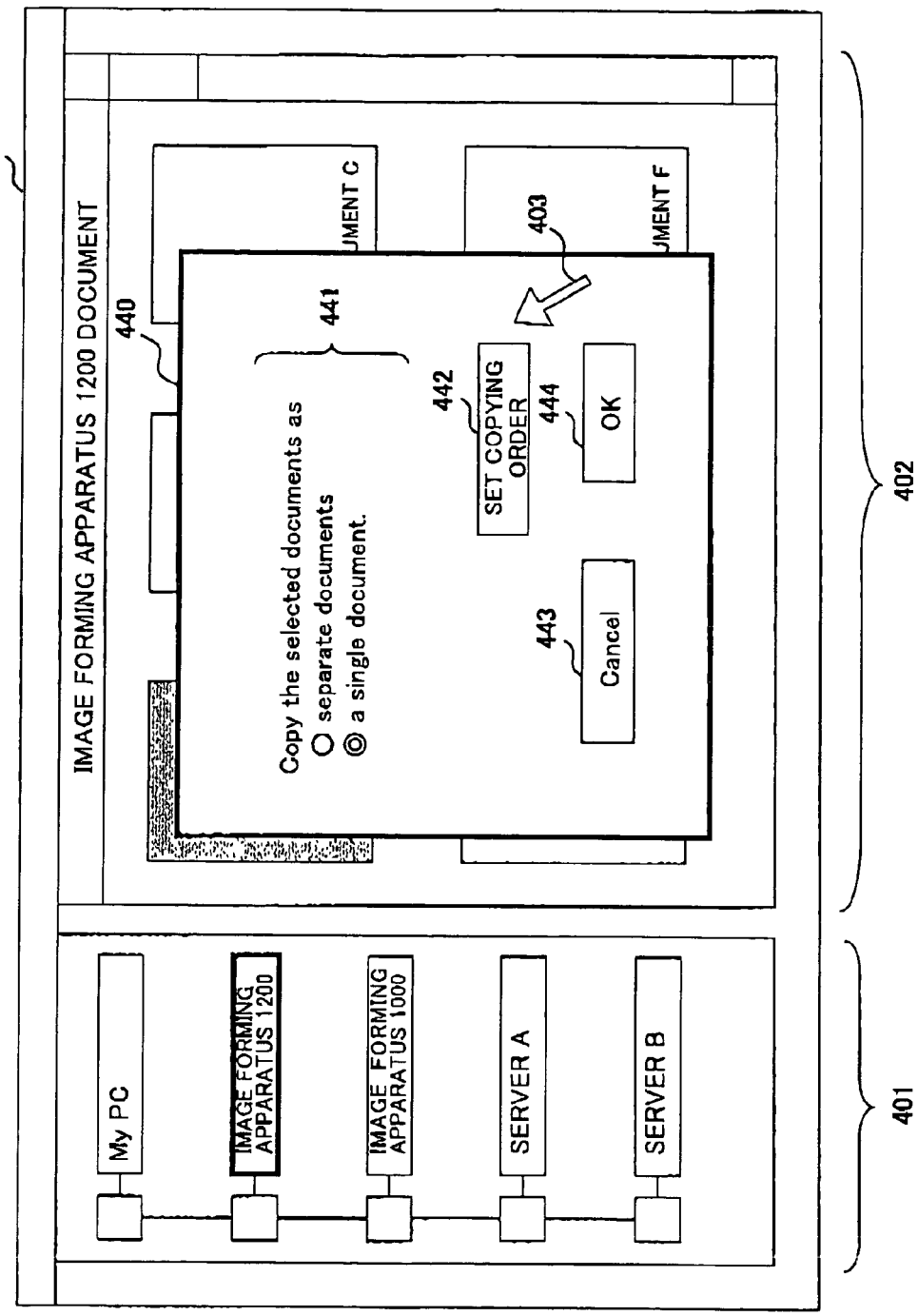
FIG. 39 is a diagram illustrating an exemplary plural document copying mode setting dialog according to the third embodiment.

Then, when the user chooses the OK button 413 in the copying confirmation dialog 410, a plural document copying mode setting dialog to set a copying mode of the plurality of documents as illustrated in FIG. 39. On the other hand, for example, if the user selects only the document A in the copying manipulation screen 400 shown in FIG. 37, the user can start execution of the copying process by choosing the OK button 413 in the copying confirmation dialog 410 shown in FIG. 37.

FIG. 39 shows an exemplary plural document copying mode setting dialog 440 according to the third embodiment.

Referring to FIG. 39, the plural document copying mode setting dialog 440 includes a copying mode selection area 441 to select a copying mode, a copying order setting button 442 to set a copying order of the documents, a cancel button 443 to cancel the copying process, and an OK button 444 to start the copying process.

In the copying mode selection area 441, a message such as "Copy the selected documents as ○ separate documents ○ a single document." is displayed When the user chooses one of the two options, the selected option is displayed as ◉. In the illustrative example, the user selects "a single document". In addition, when the user selects the copying order setting button 442 to designate a copying order of the documents, a plural document copying order setting dialog is displayed as illustrated in FIG. 40.

Figure 40:
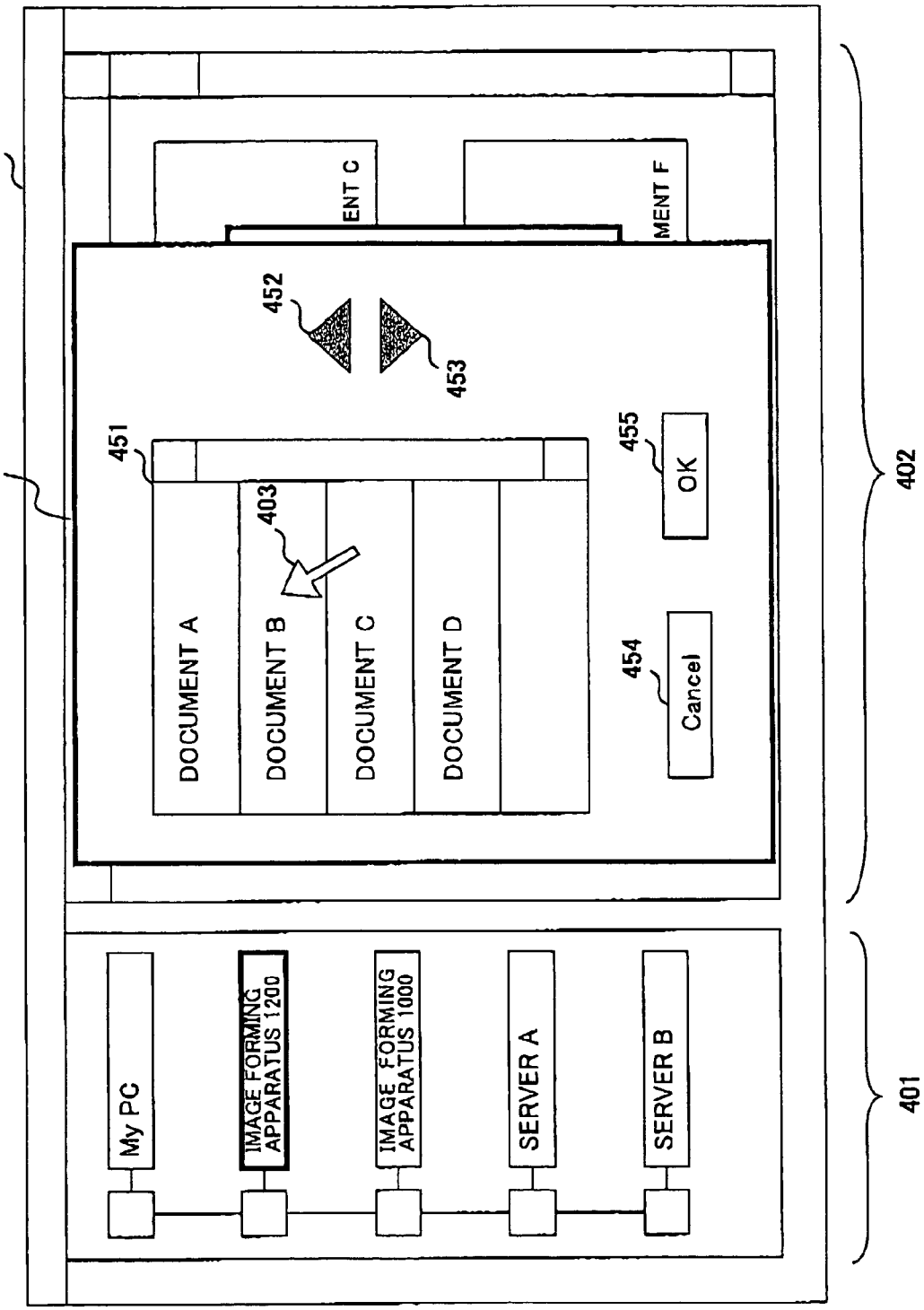
FIG. 40 is a diagram illustrating an exemplary plural document copying order setting dialog according to the third embodiment.

FIG. 40 shows an exemplary plural document copying order setting dialog 450 according to the third embodiment.

Referring to FIG. 40, the plural document copying order setting dialog 450 includes a selected document list display area 451 to display a list of documents selected by the user, an UP button 452 to ascend the copying order of a document, a DOWN button 453 to descend the copying order of a document, a cancel button 454 to cancel the copying process, and an OK button 455 to start the copying process.

In the plural document copying order setting dialog 450, if the user wants to ascend the copying order of the document B, the user first selects the document B in the selected document list display area 451 and then chooses the UP button. As a result, the document B can be copied before the document A. In contrast, if the user chooses the DOWN button 453, the document B can be copied after the document C or the document D. After setting the copying order, if the user chooses the OK button 455, the copying process is started, and the documents A through D are copied from the image forming apparatus 1200 to the image forming apparatus 1000 in the designated copying order.

In the third embodiment of the present invention, if the image forming apparatus 1200 having the document process control part 300 requests the image forming apparatus 1000 to write a selected document, which is stored in the image forming apparatus 1200, in HDD 1303B of the image forming apparatus 1000 in the format of a document type processable to the image forming apparatuses 1000 and 1200, the image forming apparatuses 1000 and 1200 can properly cooperate corresponding to the request via the network 15.

For example, if the size of a selected document that the image forming apparatus 1200, which serves as the document transmitter apparatus, accommodates is greater than the maximal size of documents that the image forming apparatus 1000, which serves as the document receiver apparatus, can store, the document process control part 300 can use an image scaling function thereof to send a reduced-size page image to the image forming apparatus 1000 based on determination of the document type determination part 320.

Also, since the document process control part 300 flexibly controls cooperation with the image forming apparatuses 1000 and 1200 depending on types of processes such as a copying process and a printing process, it is possible to perform various types of processes by properly coordinating apparatuses connected to each other via a network.

In the third embodiment, apparatuses connected to each other via a network cooperate to perform a copying process. However, the present invention is not limited to such a copying process. The present invention is applicable to file management, scanner control, and so on. In addition, the present invention is applicable to processing of information regarding the image forming apparatuses 1000 and 1200.

Also, the image forming apparatuses 1000 and 1200 and the terminal 30 according to the embodiment are not limited to communication via a fixed line LAN (Local Area Network). In other words, although physical layers differs in a network system, such as a wireless LAN and Bluetooth, SOAP messages can be exchanged in such a network system in accordance with TCP/IP (Transmission Control Protocol/ Internet Protocol). Thus, it is possible to implement various processes according to the embodiment as Web services in accordance with http and SOAP. Furthermore, communicated contents are allowed to be extended in a parallel system, such as a centronics and SCSI. Thus, as long as there is agreement between devices that will communicate each other, it is possible to implement message exchange in accordance with SOAP.

A description is given, with reference to the FIG. 41 through FIG. 53, of a copying process according to a fourth embodiment of the present invention.

In the fourth embodiment, the terminal 30 has the document process control part 300, which plays central role in cooperation with the image forming apparatuses 1000 and 1200 to perform a copying process.

Figure 41:
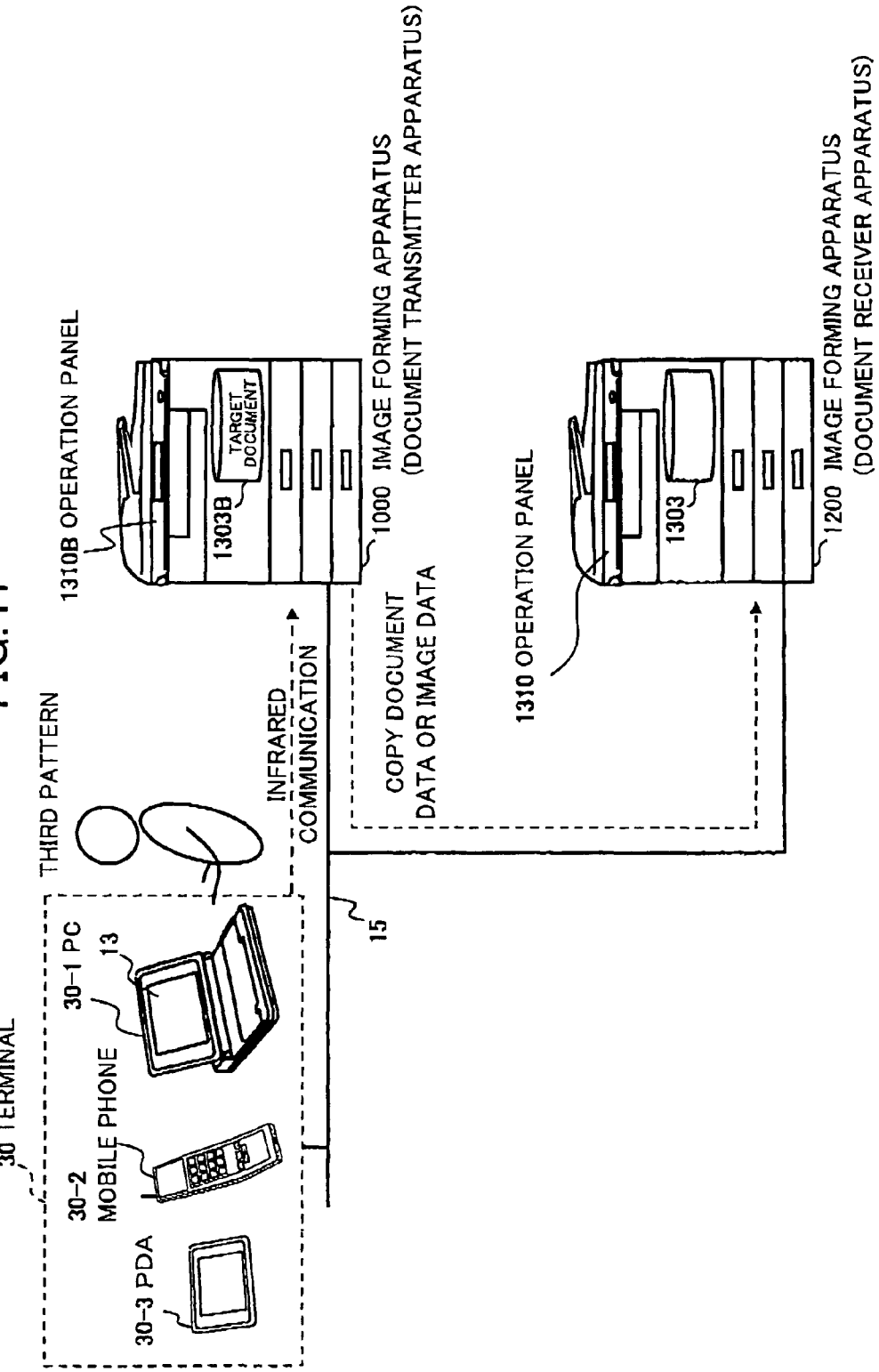
FIG. 41 is a diagram illustrating an exemplary structure of a network system according to a fourth embodiment of the present invention.

A description is given, with reference to FIG. 41, of how the terminal 30 having the document process control part 300 according to the fourth embodiment provides a Web service to other apparatuses connected via a network.

FIG. 41 shows an exemplary structure of a network system according to the fourth embodiment. In the illustrated network system, the image forming apparatus 1200, the image forming apparatus 1000, and the terminal 30 are connected to each other via a network 15. The image forming apparatus 1200 having no document process control part 300 serves as a document receiver apparatus. The image forming apparatus 1000 having no document process control part 300 serves as a document transmitter apparatus. The terminal 30 has the document process control part 300. In the fourth embodiment, the image forming apparatuses 1000 and 1200 has the same functional structures and hardware configurations as described in detail below.

Referring to FIG. 41, document data or image data (hereinafter which are collectively referred to as a document) stored in HDD 1303 of the image forming apparatus 1200 are copied to the image forming apparatus 1000 in accordance with illustrated three patterns. In the illustrative embodiment, the image forming apparatus 1000, which serves as a document transmitter apparatus, sends a document stored therein to the image forming apparatus 1200. On the other hand, the image forming apparatus 1200, which serves as a document receiver apparatus, receives the document from the image forming apparatus 1000, and the document is copied to the image forming apparatus 1200 by storing the document in HDD 1303 of the image forming apparatus 1200.

Figure 42:
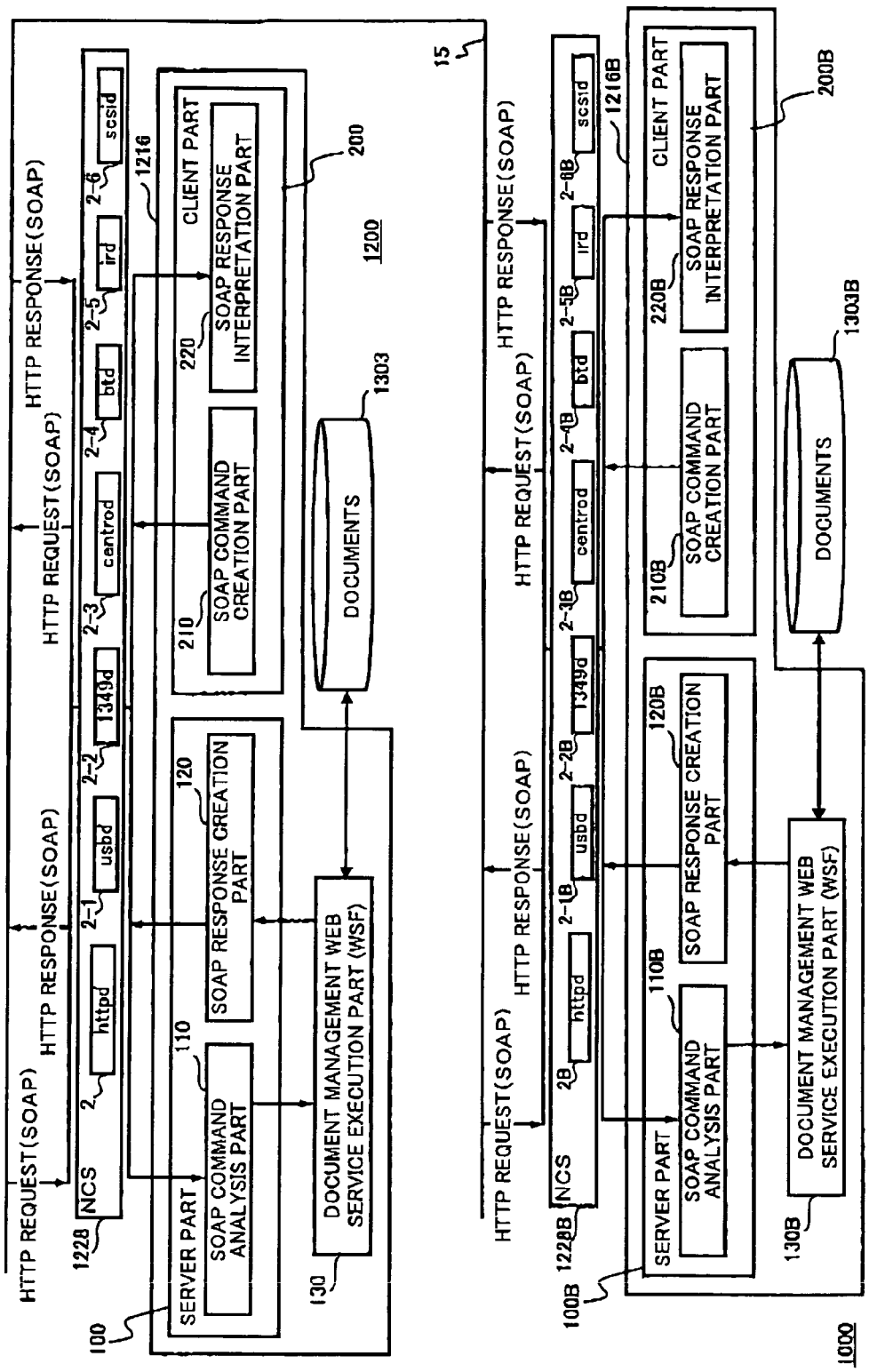
FIG. 42 is an exemplary functional structures of two image forming apparatuses having no document process control part according to the fourth embodiment.
Figure 43:
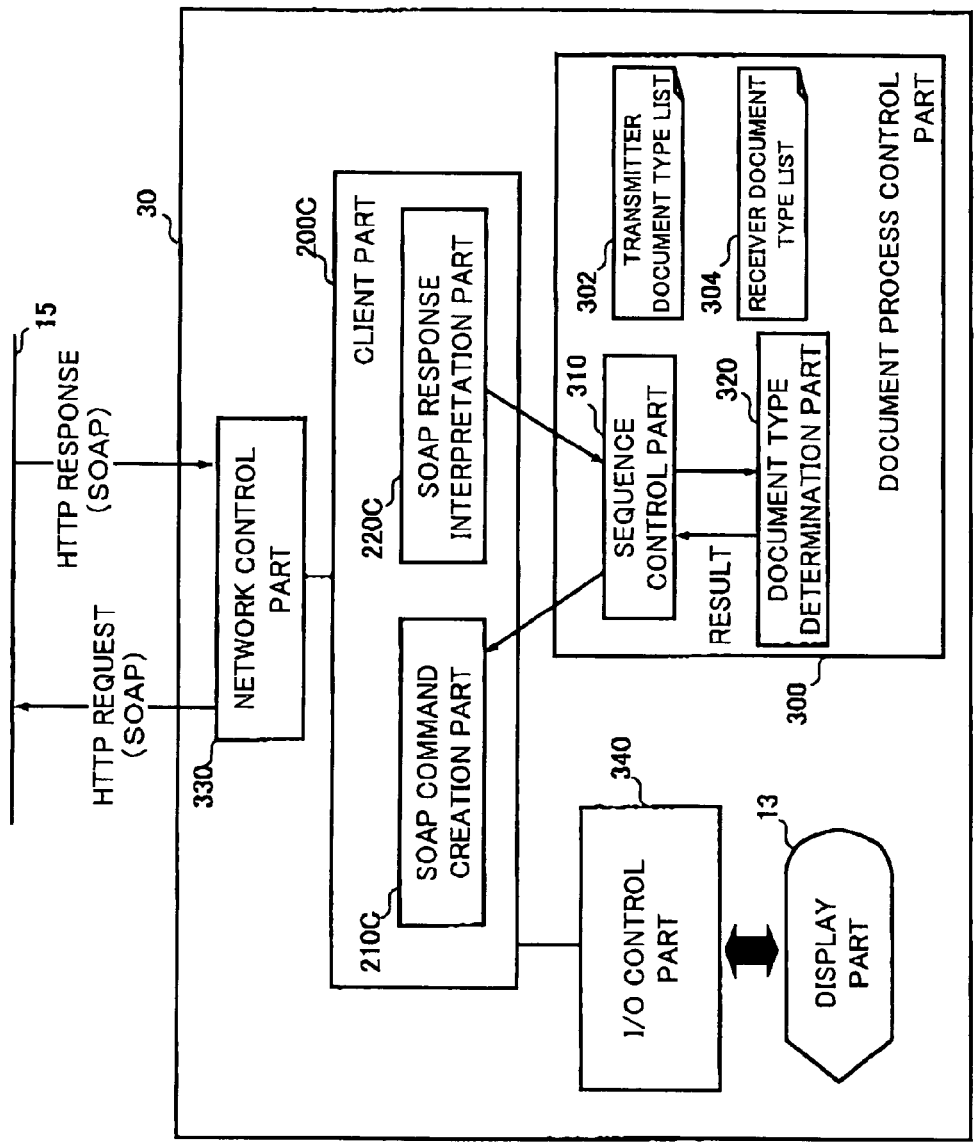
FIG. 43 is a diagram illustrating an exemplary functional structure of a terminal having a document process control part according to the fourth embodiment.

A description is given, with reference to FIG. 42 and FIG. 43, of functional structures of the image forming apparatuses 1000 and 1200 and the terminal 30 according to the fourth embodiment.

FIG. 42 shows exemplary functional structures of the image forming apparatuses 1000 and 1200 having no document process control part 300 according to the fourth embodiment. In FIG. 42, only primary functional components of the image forming apparatuses 1000 and 1200 shown in FIG. 1 are illustrated and the other functional components are omitted.

Referring to FIG. 42, the document management Web service application 1216 of the image forming apparatus 1200 comprises a server part 100, a document management Web service execution part (WSF) 130, and a client part 200.

The server part 100 controls message exchanges in accordance with SOAP. The document management Web service execution part 130, which serves as a Web service function (WSF) to provide Web services, manages documents by accessing HDD 1303 accommodating the documents. The client part 200 exchanges SOAP messages to request and provide Web services.

The server part 100 comprises a SOAP command analysis part 110 and a SOAP response creation part 120. The SOAP command analysis part 110 analyzes SOAP commands incorporated in HTTP requests. The SOAP response creation part 120 creates responses corresponding to the SOAP commands as SOAP messages incorporated in HTTP responses.

When the image forming apparatus 1200 receives an HTTP request, the SOAP command analysis part 110 analyzes a SOAP command incorporated in an HTTP request, and informs the document management Web service execution part 130 what Web service the document management Web service execution part 130 should execute. In response to receipt of the notification from the SOAP command analysis part 110, for example, the document management Web service execution part 130 stores a processed document processed in HDD 1303, updates and deletes a document stored in HDD 1303, and acquires bibliographic information regarding a document stored in HDD 1303.

The SOAP response creation part 120, depending on notification from the SOAP command analysis part 130, receives a process result of the document management Web service execution part 130 from the document management Web service execution part 130, generates a SOAP message to indicate the process result, and uses httpd 2 of NCS 1228 to send the message as an HTTP response to the network 15.

The client part 200 comprises a SOAP command creation part 210 and a SOAP response interpretation part 220. The SOAP command creation part 210 generates SOAP messages indicative of process requests in such a way that the SOAP messages are incorporated in an HTTP request. The SOAP response interpretation part 220 interprets SOAP messages incorporated in received HTTP responses.

The image forming apparatus 1000 according to the fourth embodiment has the same functional structure as that of the image forming apparatus 1200, and the description thereof is omitted. In FIG. 41, the same functional components of the image forming apparatus 1000 as those of the image forming apparatus 1200 are designated by the same reference numerals followed by the capital letter "B".

A description is given, with reference to FIG. 43, of a functional structure of the terminal 30 having the document process control part 300 according to the fourth embodiment.

FIG. 43 shows an exemplary functional structure of the terminal 30 having the document process control part 300 according to the fourth embodiment.

Referring to FIG. 43, the terminal 30, which is a personal computer controlled by CPU, comprises a network control part 330 to control communication to other apparatuses connected via the network 15 in accordance with HTTP, a client part 200C to control message exchanges in accordance with SOAP, an I/o control part 340 to control inputs and outputs of data from/to a user, a display part 13 to display data supplied from the I/O control part 340, and a document process control part 300 to control a document copying process to copy a document from the image forming apparatus 1000 to the image forming apparatus 1200 in response to a user's request to copy the document.

In the terminal 30, a user selects a target document to be copied from listed documents, which are displayed on the display part 13, stored in the image forming apparatus 1000 by means of an input device (not illustrated) such as a mouse or a keyboard, and then designates the image forming apparatus 1200 as an apparatus to which the selected document should be copied. When the user inputs data, the I/O control part 340 sends the data to the SOAP command creation part 210C. Based on the data received from the I/O control part 340, the SOAP command creation part 210C generates a SOAP command to copy the selected document from the image forming apparatus 1000 to the image forming apparatus 1200, and sends the SOAP command to the network control part 330. The network control part 330 sends the SOAP command as an HTTP request to the image forming apparatus 1200.

The network control part 330, in response to receipt of an HTTP response from the image forming apparatus 1200, sends the HTTP response to the SOAP response interpretation part 220C of the client part 200C. The SOAP response interpretation part 220C extracts a process result from the HTTP response, and sends the process result to the I/o control part 340 so as to display the process result on the display part 13. The I/O control part 340 displays the process result on the display part 13.

The document management control part 300 comprises a sequence control part 310 and a document type determination part 320. The sequence control part 310 controls a sequence of processes to copy a document stored in the image forming apparatus 1000 to the image forming apparatus 1200. The document type determination part 320 determines what document type processable to the image forming apparatuses 1000 and 1200.

The sequence control part 310, when the user selects a copying process in a screen displayed on the display part 13, instructs the SOAP command creation part 210C to send to the image forming apparatus 1000 an acquirable document type list request command to request a list of document types acquirable from the image forming apparatus 1000. Furthermore, the sequence control part 310 instructs the SOAP command creation part 210C to send to the image forming apparatus 1200 a writable document type list request command to request a list of document types writable in the image forming apparatus 1200.

The sequence control part 310, in response to receipt of the acquirable document type list and the writable document type list from the SOAP response interpretation part 220, requests the document type determination part 320 to determine a document type processable to the image forming apparatuses 1000 and 1200. Then, the sequence control part 310 sends to the SOAP command creation part 210C a copying request command to copy a selected document from the image forming apparatus 1000 to the image forming apparatus 1200 in the format of the determined document type, and displays on the display part 13 a copying completion dialog to indicate completion of the copying process depending on a response corresponding to the copying request.

The document type determination part 320 determines whether or not there is a document type processable to both the image forming apparatuses 1000 and 1200 based on a transmitter document type list 302, which includes document types acquirable from the image forming apparatus 1000, and a receiver document type list 304, which includes document types writable in the image forming apparatus 1200, and determines the best document type The document type determination part 320 informs the sequence control part 310 of the best document type.

A description is given, with reference to FIG. 44, of a PULL type document copying process according to the fourth embodiment.

In the PULL type document copying process, the image forming apparatus 1200, in response to receipt of a document copying request from a user of the terminal 30, acquires a designated document from the image forming apparatus 1000 and stores the document in HDD 1303.

FIG. 44 shows an exemplary operation of the PULL type document copying process according to the fourth embodiment.

Referring to FIG. 44, a user of the terminal 30 selects the image forming apparatus 1000 accommodating a desired document from listed apparatuses, which are displayed on the display part 13, connected to the terminal 30 via the network 15 at step S410.

At step S411, the terminal 30 sends to the image forming apparatus 1000 a document list request command to request a list of documents stored in the image forming apparatus 1000.

At step S411-2, the image forming apparatus 1000, in response to receipt of the document list request command from the terminal 30, uses the document management Web service execution part 130B to acquire the document list from HDD 1303B and sends the document list to the terminal 30.

At step S412, the terminal 30, in response to receipt of the document list from the image forming apparatus 1000, sends to the image forming apparatus 1000 a thumbnail request command to request thumbnail data to de displayed on the display part 13.

At step S412-2, when the image forming apparatus 1000 receives the thumbnail request command from the terminal 30, the document management Web service execution part 130B operates corresponding to the thumbnail request command. Then, the image forming apparatus 1000 sends to the terminal 30 the thumbnail data acquired by the document management Web service execution part 130B. For example, the thumbnail data are reduced-size image data of the top pages of documents stored in the image forming apparatus 1000.

At step S413, when the document list of the image forming apparatus 1000 is displayed in thumbnail representation on the display part 13 of the terminal 30, the user determines which document should be copied to which apparatus by dragging and dropping a thumbnail of a desired document toward a desired apparatus. In this embodiment, the user drags and drops a document stored in the image forming apparatus 1000 toward the image forming apparatus 1200.

At step S414, the terminal 30 sends to the image forming apparatus 1000 a bibliographic information request command to request bibliographic information regarding the selected document.

At step S414-2, the image forming apparatus 1000, in response to receipt of the bibliographic information request command from the terminal 30, uses the document management Web service execution part 130B to acquire the bibliographic information from HDD 1303B and sends the bibliographic information to the terminal 30.

At step S415, the terminal 30, in response to receipt of the bibliographic information from the image forming apparatus 1000, sends to the image forming apparatus 1000 a system information request command to request system information regarding the image forming apparatus 1000.

At step S415-2, the image forming apparatus 1000, in response to receipt of the system information request command from the terminal 30, sends the system information to the terminal 30.

At step S416, the terminal 30, in response to receipt of the system information from the image forming apparatus 1000, examines feasibility of the copying process using a ticket based on the system information. Then, the terminal 30 sends to the image forming apparatus 1200 a system information request command to request system information regarding the image forming apparatus 1200.

At step S416-2, the image forming apparatus 1200, in response to receipt of the system information request command from the terminal 30, sends the system information to the terminal 30.

At step S417, the terminal 30, in response to receipt of the system information from the image forming apparatus 1200, examines feasibility of the copying process using a ticket based on the system information. Then, the terminal 30 displays a copying confirmation dialog on the display part 13.

When the user chooses OK to start the copying process at step S418, the terminal 30 sends to the image forming apparatus 1000 an acquirable document type list request command to request a list of document types acquirable from the image forming apparatus 1000 at step S419.

At step S419-2, the image forming apparatus 1000, in response to receipt of the acquirable document type list request command from the terminal 30, sends the acquirable document type list to the terminal 30.

At step S420, the terminal 30, in response to receipt of the acquirable document type list from the image forming apparatus 1000, maintains the acquirable document type list as a transmitter document type list 302. Furthermore, the terminal 30 sends to the image forming apparatus 1200 a writable document type list request command to request a list of document types writable in the image forming apparatus 1200.

At step S420-2, the image forming apparatus 1200, in response to receipt of the writable document type list request command from the terminal 30, sends the writable document type list to the terminal 30.

At step S421, the terminal 30, in response to receipt of the writable document type list from the image forming apparatus 1200, maintains the writable document type list as a receiver document type list 304. Then, the sequence control part 310 of the terminal 30 uses the document type determination part 320 to determine whether or not there is a document type acquirable from the image forming apparatus 1000 and writable in the image forming apparatus 1200 based on the transmitter document type list 302 and the receiver document type list 304, and determines the best document type. Based on the determination, if there are a plurality of such document types, the document type determination part 320 determines one of the document types as the best document type. If there is no such a document type, the document type determination part 320 determines a predetermined document type as the best document type.

At step S422, the terminal 30 sends to the image forming apparatus 1000 a ticket request command to request a ticket to use the selected document stored in the image forming apparatus 1000. Here, the determined document type is included in the ticket request command.

At step S422-2, the image forming apparatus 1000, in response to receipt of the ticket request command from the terminal 30, sends the ticket to the terminal 30.

At step S423, the terminal 30, in response to receipt of the ticket from the image forming apparatus 1000, sends to the image forming apparatus 1200 a document copying request command to copy the selected document from the image forming apparatus 1000 to the image forming apparatus 1200 by authority of the ticket.

At step S424, the image forming apparatus 1200, in response to receipt of the document copying request command from the terminal 30, sends to the image forming apparatus 1000 a page image request command to request a page image of the selected document in the format of the document type designated in the ticket. In the page image request command, for example, a plurality of page images of the selected document may be designated. Alternatively, whenever the image forming apparatus 1200 receives each page image from the image forming apparatus 1000, the image forming apparatus 1200 may send to the image forming apparatus 1000 a page image request command for the next page image.

At step S425, the image forming apparatus 1200 stores the page image received from the image forming apparatus 1000 in HDD 1303.

At step S425-2, after storing of all page images of the selected document in HDD 1303, the image forming apparatus 1200 sends to the terminal 30 a document copying request completion message to indicate that the document copying request has been fulfilled.

At step S426, the terminal 30, in response to receipt of the document copying request completion message from the image forming apparatus 1200, displays on the display part 13 a copying completion dialog to indicate that the copying process has been terminated.

In the terminal 30, which serves as an operator apparatus, the SOAP command creation part 210C of the client part 200C sets request commands sent to the image forming apparatuses 1000 and 1200 as SOAP commands incorporated in messages of HTTP requests (S411, S412, S414, S415, S416, S419, S420, S422 and S423). The SOAP interpretation part 220C of the client part 200C extracts HTTP responses for process results corresponding to the HTTP requests.

In the image forming apparatus 1000, which serves as the document transmitter apparatus, the SOAP command analysis part 110B of the server part 100B analyzes received request commands as SOAP commands, and the document management Web service execution part 130B performs processes corresponding to the SOAP commands. The SOAP response creation part 120B of the server part 100B provides the terminal 30 with process results of the document management Web service execution part 130B as Web services (S411-2, S412-2, S414-2, S415-2, S419-2 and S422-2).

On the other hand, in the image forming apparatus 1200, which serves as the document receiver apparatus, the SOAP command creation part 210 of the client part 200 sets request commands sent to the image forming apparatus 1000 as SOAP commands incorporated in messages of HTTP requests (S424). The SOAP response interpretation part 220 of the client part 200 extracts HTTP responses for process results corresponding to the HTTP requests. Also, the SOAP command analysis part 110 of the server part 100 analyzes received request commands as SOAP commands, and the SOAP response creation part 120 of the server part 100 provides process results corresponding to the SOAP command as Web services to the terminal 30 (S425-2).

According to the above-mentioned PULL type document copying process, when a user of the terminal 30 having the document process control part 300 selects a document stored in the image forming apparatus 1000, the document can be copied from the image forming apparatus 1000 to the image forming apparatus 1200 by storing the document in HDD 1303 of the image forming apparatus 1200 in an appropriate document type.

A description is given, with reference to FIG. 45 through FIG. 50, of the above-mentioned individual request commands according to the fourth embodiment FIG. 45 shows an exemplary HTTP request for an acquirable document type list request command according to the fourth embodiment.

Referring to FIG. 45, a code portion 31 indicates a URL to which the HTTP request should be sent by POST method. For example, the URL "netdoc" is designated in the code portion 31. Furthermore, a code portion 32 shows a URL to indicate the purpose of the HTTP request. For example, the URL "http://foo.bar.com/netdoc/documentmanagement" is described in the code portion 32 to designate document management as the purpose of the HTTP request.

In a code portion 33, a SOAP header is provided to indicate a root element. In a code portion 34, a SOAP body is provided. The code portion 34 includes a code portion 35 ranging from <ns:documentmanagement> to </ns:documentmanagement>. In the code portion 35, a SOAP command to specify a requested process, information referred to for the process and others are described. In a code portion 50 in the SOAP body, a SOAP command "getFileVariation" is designated by sandwiching between <operation> and </operation>.

FIG. 46 shows an exemplary HTTP response corresponding to the HTTP request shown in FIG. 45.

Referring to FIG. 46, a code portion 44 is the SOAP body of the HTTP response. In code portions 52; 53 and 54, each of which ranges from <type> to </type>, three document types acquirable from the image forming apparatus 1000 are set. In the code portion 52, a compression format of image data is designated as "Tiff" by sandwiching between <format> and </format>. An image type is designated as "1 bit/dot" by sandwiching between <imageType> and </imageType>. A resolution is designated as "600×600" by sandwiching between <binary> and </binary>. In the code portion 53, a compression format of image data is designated as "Jpeg" by sandwiching between <format> and </format>. An image type is designated as "8 bit/dot" by sandwiching between <imageType> and </imageType>. A resolution is designated as "300×300" by sandwiching between <binary> and </binary>. In the code portion 54, a compression format of image data is designated as "Jpeg2000" by sandwiching between <format> and </format>. An image type is designated as "8 bit/dot" by sandwiching between <imageType> and </imageType>. A resolution is designated as "600×600" by sandwiching between <binary> and </binary>.

When the terminal 30 receives such an HTTP response, the SOAP response interpretation part 220C extracts document types from the code portions 52 through 54, and the document types {"Tiff", "1 bit/dot", 600×600}, {"Jpeg", "8 bit/dot", 300×300} and {"Jpeg2000", "8 bit/dot", 600×600} are set as a transmitter document type list 302. On the other hand, when the terminal 30 receives document types {"Tiff", "8 bit/dot", 600×600} and {"Jpeg", "8 bit/dot", 300×300}, the document types {"Tiff", "8 bit/dot", 600×600} and {"Jpeg", "8 bit/dot", 300×300} are set as a receiver document type list 304. The document type determination part 320 determines whether or not there is a document type commonly included in the transmitter document type list 302 and the receiver document type list 304. In this example, the document type determination part 320 selects the document type {"Jpeg", "8 bit/dot", 300×300}, because only the document type {"Jpeg", "8 bit/dot", 300×300} is commonly included in the transmitter type list 302 and the receiver document type list 304. The determined document type is set in an HTTP request as shown in FIG. 49 described below.

FIG. 47 shows an exemplary HTTP request for a document copying request command according to the fourth embodiment. In FIG. 47, the same code portion as those shown in FIG. 45 are designated by the same reference numerals and the description thereof is omitted.

Referring to FIG. 47, a code portion 31 indicates a URL to which the HTTP request should be sent by POST method. For example, the URL "netdoc" is written in the code portion 31. Furthermore, a code portion 32 shows a URL to indicate the purpose of the HTTP request. For example, the URL "http://foo.bar.com/netdoc/documentmanagement" is described in the code portion 32 to designate document management as the purpose of the HTTP request.

In a code portion 33, a SOAP header is provide to indicate a root element. In a code portion 34, a SOAP body is provided. The code portion 34 includes a code portion 35 ranging from <ns:documentmanagement> to </ns:documentmanagement>. In the code portion 34, a SOAP command to specify a requested process, information referred to for the process and others are provided. In the document copying request command using a ticket, a ticket number is specified in a code portion 36 ranging from <ticketId> to </ticketId>, and a SOAP command is specified in a code portion 37 ranging from <operation> to </operation>. For example, "456" and "insertFileByTicket" are designated as the ticket number and the SOAP command, respectively, in the illustration.

FIG. 48 shows an exemplary HTTP response corresponding to the HTTP request shown in FIG. 47 according to the fourth embodiment. In FIG. 48, the same code portions as those shown in FIG. 46 are designated by the same reference numerals and the description thereof is omitted.

Referring to FIG. 48, a code portion 42 indicates that the HTTP request shown in FIG. 47 has been successfully fulfilled. In a code portion 43, a SOAP header is provided to indicate a root element. In a code portion 44, a SOAP body is provided. The code portion 44 includes a code portion 45 ranging from <ns:documentmanagementResponse> to </ns:documentmanagementResponse>. In the code portion 45, "success" to indicate that the requested process has been successfully terminated is described.

FIG. 49 shows an exemplary HTTP request for a page image request command according to the fourth embodiment. In FIG. 49, the same code portions as those shown in FIG. 45 are designated by the same reference numerals and the description thereof is omitted.

Referring to FIG. 49, a code portion 34 is the SOAP body of the HTTP request. In a code portion 59, the document type is specified by sandwiching between <type> and </type>. In a code portion 60, the SOAP command is specified by sandwiching between <operation and </operation>. For example, the document type {"Jpeg", "8 bit/dot", 300×300}, which is designated in the code portion 53 in FIG. 46, may be designated provided in the HTTP response. Also, "getFile(TicketID)" is specified as the SOAP command in the code portion.

FIG. 50 shows an exemplary HTTP response corresponding to the HTTP request shown in FIG. 49 according to the fourth embodiment. In FIG. 50, the same code portions as those shown in FIG. 46 are designated by the same reference numerals and the description thereof is omitted.

Referring to FIG. 50, a code portion 61 indicates that there are a plurality of differently formatted data items in the HTTP response. In a code portion 66, "XX_boundary" indicates a boundary between the data item. In a code portion 62, text data information is provided. For example, the text data information may include a text description type, a code type and the length of the text data. In a code portion 63, "success" to indicate that the page image request command has been successfully fulfilled is provided by sandwiching between <result> and </result>.

On the other hand, in a code portion 64, image data information is provided. For example, the image data information may include an image data type, a transferred data type such as "text" or "binary", and the length of the image data. Subsequently, image data 65 are provided. For example, if the data type is "Tiff" and the transferred data type is "binary", the binary Tiff image data 65 are provided.

In order to copy a document stored in the image forming apparatus 1000, the image forming apparatus 1200 extracts the binary Tiff image data from the HTTP response shown in FIG. 50 and stores the image data in HDD 1303.

In the above description, the HTTP request incorporating image data is sent to the image forming apparatus 1200. However, the image data may be transmitted and received, for example, in accordance with file transfer protocol (ftp3).

In the PULL type document copying sequence according to the fourth embodiment of the present invention, the following SOAP commands are used.

TABLE 3

| SOAP command | Operation |
| --- | --- |
| getList | get a document list |
| getThumbnail | get thumbnail images |
| getFileInfo | get file bibliographic information |
| getSystemInfo | get system information |
| getFileVariation | get an acquirable or writable document type list |
| getCopyTicket | get a ticket to copy a document |
| copyFileByTicket | copy document data by a ticket |
| getFile(TicketID) | get a document corresponding to a ticket ID |

These SOAP commands are designated by sandwiching between <operation> and </operation> in a SOAP body as described with reference to FIG. 45, FIG. 47 and FIG. 49.

A description is given, with reference to FIG. 51, of a PUSH type document copying process according to the fourth embodiment.

In the PUSH type document copying process, the image forming apparatus 1000, in response to receipt of a document writing request from a user of the terminal 30, sends to the image forming apparatus 1200 an HTTP request, which includes a designated document, to request the image forming apparatus 1200 to store the attached document in HDD 1303.

FIG. 51 shows an exemplary operation of the PUSH type document copying process according to the fourth embodiment.

Referring to FIG. 51, a user of the terminal selects the image forming apparatus 1000 accommodating a desired document from listed apparatuses, which are displayed on the display part 13, connected to the terminal 30 via the network 15 at step S430.

At step S431, the terminal 30 sends to the image forming apparatus 1000 a document list request command to request a list of documents stored in the image forming apparatus 1000.

At step S431-2, the image forming apparatus 1000, in response to receipt of the document list request command from the terminal 30, uses the document management Web service execution part 130B to acquire the document list from HDD 1303B and sends the document list to the terminal 30.

At step S432, the terminal 30, in response to receipt of the document list from the image forming apparatus 1000, sends to the image forming apparatus 1000 a thumbnail request command to request thumbnail data to de displayed on the display part 13.

At step S432-2, when the image forming apparatus 1000 receives the thumbnail request command from the terminal 30, the document management Web service execution part 130B operates corresponding to the thumbnail request command. Then, the image forming apparatus 1000 sends to the terminal 30 the thumbnail data acquired by the document management Web service execution part 130B. For example, the thumbnail data are reduced-size image data of the top pages of documents stored in the image forming apparatus 1000.

At step S433, when the document list of the image forming apparatus 1000 is displayed in thumbnail representation on the display part 13 of the terminal 30, the user determines which document should be copied to which apparatus by dragging and dropping a thumbnail of a desired document toward a desired apparatus. In this embodiment, the user drags and drops a document stored in the image forming apparatus 1000 toward the image forming apparatus 1200.

At step S434, the terminal 30 sends to the image forming apparatus 1000 a bibliographic information request command to request bibliographic information regarding the selected document.

At step S434-2, the image forming apparatus 1000, in response to receipt of the bibliographic information request command from the terminal 30, uses the document management Web service execution part 130B to acquire the bibliographic information from HDD 1303B and sends the bibliographic information to the terminal 30.

At step S435, the terminal 30, in response to receipt of the bibliographic information from the image forming apparatus 1000, sends to the image forming apparatus 1000 a system information request command to request system information regarding the image forming apparatus 1000.

At step S435-2, the image forming apparatus 1000, in response to receipt of the system information request command from the terminal 30, sends the system information to the terminal 30.

At step S436, the terminal 30, in response to receipt of the system information from the image forming apparatus 1000, examines feasibility of the copying process using a ticket based on the system information. Then, the terminal 30 sends to the image forming apparatus 1200 a system information request command to request system information regarding the image forming apparatus 1200.

At step S436-2, the image forming apparatus 1200, in response to receipt of the system information request command from the terminal 30, sends the system information to the terminal 30.

At step S437, the terminal 30, in response to receipt of the system information from the image forming apparatus 1200, examines feasibility of the copying process using a ticket based on the system information. Then, the terminal 30 displays a copying confirmation dialog on the display part 13.

When the user chooses OK to start the copying process at step S438, the terminal 30 sends to the image forming apparatus 1000 an acquirable document type list request command to request a list of document types acquirable from the image forming apparatus 1000 at step S439.

At step S439-2, the image forming apparatus 1000, in response to receipt of the acquirable document type list request command from the terminal 30, sends the acquirable document type list to the terminal 30.

At step S440, the terminal 30, in response to receipt of the acquirable document type list from the image forming apparatus 1000, maintains the acquirable document type list as a transmitter document type list 302. Furthermore, the terminal 30 sends to the image forming apparatus 1200 a writable document type list request command to request a list of document types writable in the image forming apparatus 1200.

At step S440-2, the image forming apparatus 1200, in response to receipt of the writable document type list request command from the terminal 30, sends the writable document type list to the terminal 30.

At step S441, the terminal 30, in response to receipt of the writable document type list from the image forming apparatus 1200, maintains the writable document type list as a receiver document type list 304. Then, the sequence control part 310 of the terminal 30 uses the document type determination part 320 to determine whether or not there is a document type acquirable from the image forming apparatus 1000 and writable in the image forming apparatus 1200 based on the transmitter document type list 302 and the receiver document type list 304, and determines the best document type. Based on the determination, if there are a plurality of such document types, the document type determination part 320 determines one of the document types as the best document type. If there is no such a document type, the document type determination part 320 determines a predetermined document type as the best document type.

At step S442, the terminal 30 sends to the image forming apparatus 1200 a document writing ticket request command to request a ticket to write documents in the image forming apparatus 1200.

At step S442-2, the image forming apparatus 1200, in response to receipt of the document writing ticket request command from the terminal 30, sends the ticket to the terminal 30.

At step S443, the terminal 30, in response to receipt of the document writing ticket from the image forming apparatus 1200, sends to the image forming apparatus 1000 a document writing request command to write the selected document stored in the image forming apparatus 1000 in the image forming apparatus 1200 by authority of the ticket. At this time, the determined document type is designated in the document writing request command.

At step S444, the image forming apparatus 1000, in response to receipt of the document writing request command from the terminal 30, sends to the image forming apparatus 1200 an empty file creation request command to request the image forming apparatus 1200 to create an empty file.

At step S444-2, the image forming apparatus 1200, in response to receipt of the empty file creation request command from the image forming apparatus 1000, creates an empty file and sends the file ID of the file to the image forming apparatus 1000.

At step S445, the image forming apparatus 1000, in response to receipt of the file ID from the image forming apparatus 1200, sends to the image forming apparatus 1200 a page image writing request command to write a page image in the file identified by the file ID by authority of the ticket.

At step S446, the image forming apparatus 1200, in response to receipt of the page image writing request command from the image forming apparatus 1000, uses the document management Web service execution part 130 to store the page image received from the image forming apparatus 1000 in the file.

At step S446-2, after storing of all page images of the selected document, the image forming apparatus 1200 sends to the image forming apparatus 1000 a page image writing request completion message. In the page image writing request command, for example, a plurality of page images of the selected document may be designated. Alternatively, whenever the image forming apparatus 1200 receives each page image from the image forming apparatus 1000, the image forming apparatus 1200 may iteratively send to the image forming apparatus 1000 a page image request command for the next page image.

At step S446-4, the image forming apparatus 1000, in response to receipt of the page image writing request completion message from the image forming apparatus 1200, sends to the terminal 30 a document writing request completion message to indicate that the document writing request has been fulfilled.

At step S447, the terminal 30, in response to receipt of the document writing request completion message from the image forming apparatus 1000, displays on the display part 13 a copying completion dialog to indicate that the copying process has been terminated.

In the terminal 30, which serves as an operator apparatus, the SOAP command creation part 210C of the client part 200C sets request commands sent to the image forming apparatuses 1000 and 1200 as SOAP commands incorporated in messages of HTTP requests (S431, S432, S434, S435, S436, S439, S440, S442 and S443). The SOAP response interpretation part 220C of the client part 200C extracts HTTP responses for process results corresponding to the HTTP requests.

In the image forming apparatus 1200, which serves as the document receiver apparatus, the SOAP command analysis part 110 of the server part 100 analyzes received request commands as SOAP commands, and the document management Web service execution part 130 operates corresponding to the SOAP commands The SOAP response creation part 120 of the server part 100 provides the terminal 30 and the image forming apparatus 1000 with process results of the document management Web service execution part 130 as Web services (S436-2, S440-2, S442-2, S444-2 and S446-2).

On the other hand, in the image forming apparatus 1000, which serves as the document transmitter apparatus, the SOAP command creation part 210B of the client part 200B sets request commands sent to the image forming apparatus 1200 as SOAP commands incorporated in messages of HTTP requests (S444 and S445). The SOAP response interpretation part 220B of the client part 200B extracts HTTP responses for process results corresponding to the HTTP requests. Also, the SOAP command analysis part 110B of the server part 100B analyzes received request commands as SOAP commands, and the SOAP response creation part 120B of the server part 100B provides process results corresponding to the SOAP command as Web services to the terminal 30 (S431-2, S432-2, S434-2, S435-2 and S439-2).

According to the above-mentioned PUSH type document copying sequence, when a user of the terminal 30 having the document process control part 300 selects a document stored in the image forming apparatus 1000, the document can be copied from the image forming apparatus 1000 to the image forming apparatus 1200 by storing the document in HDD 1303 of the image forming apparatus 1200 in an appropriate document type.

A description is given, with reference to FIG. 52 and FIG. 53, of the above-mentioned individual request commands according to the fourth embodiment.

FIG. 52 shows an exemplary HTTP request for a page image writing request command according to the fourth embodiment. In FIG. 52, the same portion as those of FIG. 45 are designated by the same reference numerals and the description thereof is omitted.

Referring to FIG. 52, a code portion 81 indicates that there are a plurality of differently formatted data items in the HTTP request. In a code portion 86, "XX_boundary" indicates a boundary between the data item. In a code portion 82, text data information is provided. For example, the text data information may include a text description type, a code type, and the length of the text data. In a code portion 80, a SOAP command is specified by sandwiching between <operation> and </operation>. For example, if "putFile(FileID)" is designated as the SOAP command, a page image stored in the image forming apparatus 1000 is requested to be written in a file designated by FileID.

On the other hand, in a code portion 84, image data information is provided. For example, the image data information may include an image data type, a transferred data type, such as "text" and "binary", the length of the image data. Subsequently, image data 85 are provided. For example, if the image data type is "Tiff" and the transferred data type is "binary", the image data 85 are provided as binary Tiff image data.

In response to receipt of such an HTTP request shown in FIG. 52, the image forming apparatus 1200 can extract binary Tiff image data from the HTTP request and fulfill the page image writing request by writing the extracted image data in HDD 1303.

FIG. 53 shows an exemplary HTTP response corresponding to the HTTP request shown in FIG. 52 according to the fourth embodiment. In FIG. 53, the same code portions as those shown in FIG. 46 are designated by the same reference numerals and the description thereof is omitted.

Referring to FIG. 53, a code portion 44 includes a code portion 87 ranging from <ns:documentmanagementResponse> to </ns:documentmanagementResponse>. In the code portion 87, a process result of the page image writing request is provided. In a code portion 88 ranging from <result> to </result>, for example, "success" is provided to indicate that the page image writing request has been fulfilled.

In this example, the HTTP request incorporating image data is sent to the image forming apparatus 1200. However, the image data may be transmitted and received, for example, in accordance with file transfer protocol (ftp3).

In the PUSH type document copying process according to the fourth embodiment of the present invention, the following SOAP commands are used.

TABLE 4

| SOAP command | Operation |
| --- | --- |
| getList | get a document list |
| getThumbnail | get thumbnail images |
| getFileInfo | get file bibliographic information |
| getSystemInfo | get system information |
| getFileVariation | get an acquirable or writable document type list |
| getInsertTicket | get a ticket to write (insert) a document |
| insertFileByTicket | write (insert) document data by a ticket |
| createDoc | create an empty document |
| putFile(FileID) | write a document in a file specified a file ID |

These SOAP commands are designated by sandwiching between <operation> and </operation> in the SOAP body as described with reference to FIG. 45, FIG. 47, FIG. 49 and FIG. 52.

In the fourth embodiment, the screens shown in FIG. 16 through FIG. 19 according to the first embodiment are provided to a user of the terminal 30. Thus, the description thereof is omitted.

Figure 55:
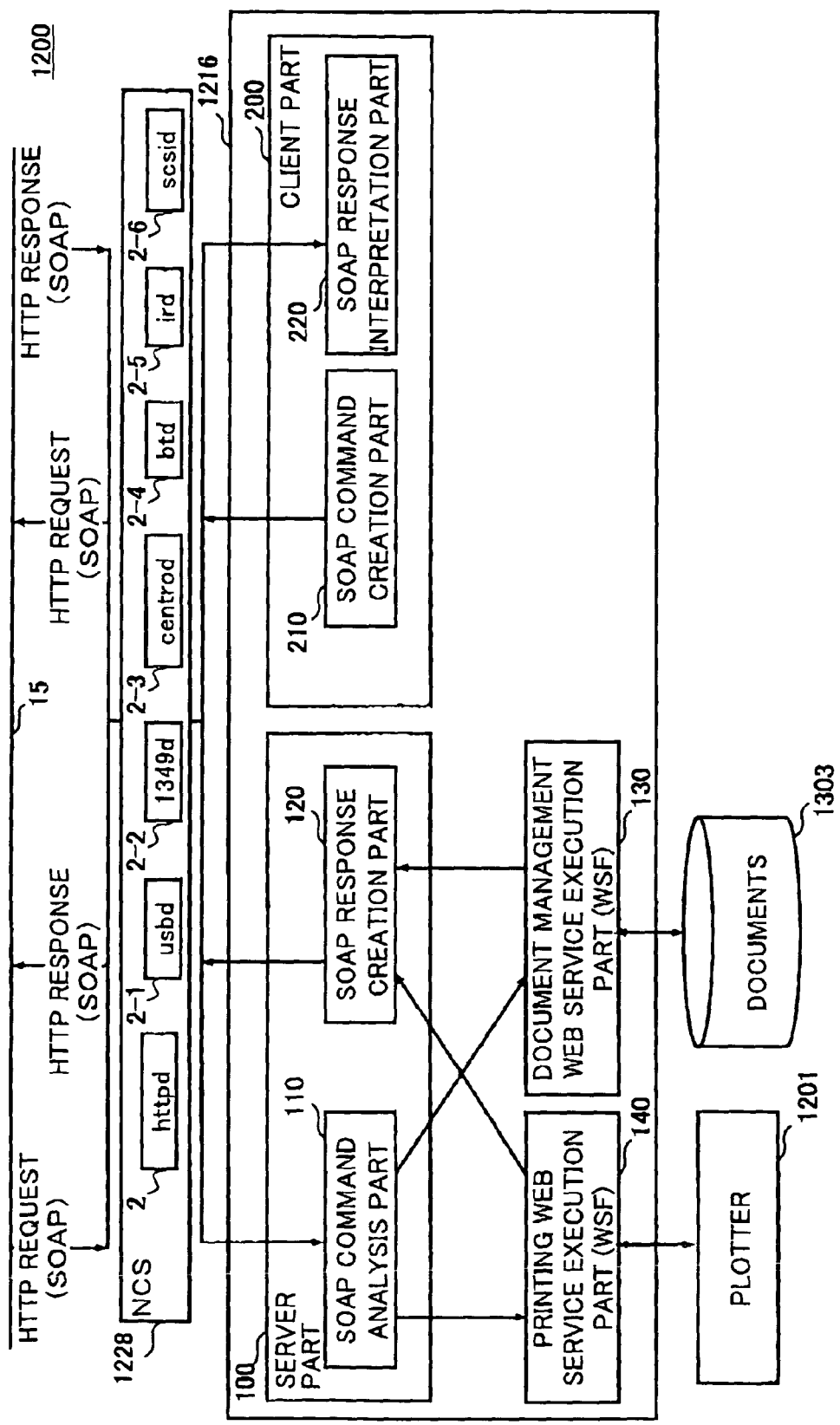
FIG. 55 is a diagram illustrating an exemplary functional structure of an image forming apparatus according to the fifth embodiment.

A description is given, with reference to FIG. 54 through FIG. 56, of a document copying process according to a fifth embodiment of the present invention.

In the fifth embodiment, a document stored in the image forming apparatus 1000 is printed out in the image forming apparatus 1200 in cooperation with the image forming apparatuses 1000 and 1200 and the terminal 30 having the document process control part 300.

FIG. 54 shows an exemplary structure of a network system according to the fifth embodiment.

Referring to FIG. 54, the image forming apparatus 1200 prints out document data or image data (hereinafter which are referred to as a document) stored in HDD 1303B of the image forming apparatus 1000. Namely, the image forming apparatus 1000, which serves as a document transmitter apparatus, sends a document stored therein to the image forming apparatus 1200. On the other hand, the image forming apparatus 1200, which serves as a document receiver apparatus, produces a copy 4 of the document received from the image forming apparatus 1000.

A description is given, with reference to FIG. 55, of a functional structure of the image forming apparatus 1200 according to the fifth embodiment.

FIG. 55 shows an exemplary functional structure of the image forming apparatus 1200 according to the fifth embodiment. In FIG. 21, the same components as those in FIG. 4 are designated by the same reference numerals and the description thereof is omitted. Also, only primary functional components of the image forming apparatus 1200 are illustrated and the other components are omitted.

Referring to FIG. 55, the document management Web service application 1216 of the image forming apparatus 1200 differs from the document management Web service application 1216 according to the fourth embodiment in that the document management Web service application 1216 according to the fifth embodiment further includes a printing Web service execution part 140. The printing Web service execution part 140, which serves as a Web service function (WSF) to provide Web services, prints out a selected document by means of the plotter 1201.

On the other hand, the image forming apparatus 1000 and the terminal 30 have the same functional structures and hardware configurations as those according to the fourth embodiment. Namely, the image forming apparatus 1000 has the functional structure shown in FIG. 42, and the terminal 30 having the document process control part 300 has the functional structure shown in FIG. 55.

A description is given, with reference to FIG. 56, of a document printing process according to the fifth embodiment.

FIG. 56 shows an exemplary operation of a PULL type document printing sequence according to the fifth embodiment.

Referring to FIG. 55, a user of the terminal 30 selects the image forming apparatus 1000 accommodating a desired document from listed apparatuses, which are displayed on the display part 13, connected to the terminal 30 via the network 15 at step S510.

At step S511, the terminal 30 sends to the image forming apparatus 1000 a document list request command to request a list of documents stored in the image forming apparatus 1000.

At step S511-2, the image forming apparatus 1000, in response to receipt of the document list request command from the terminal 30, uses the document management Web service execution part 130B to acquire the document list from HDD 1303B and sends the document list to the terminal 30.

At step S512, the terminal 30, in response to receipt of the document list from the image forming apparatus 1000, sends to the image forming apparatus 1000 a thumbnail request command to request thumbnail data to de displayed on the display part 13.

At step S512-2, when the image forming apparatus 1000 receives the thumbnail request command from the terminal 30, the document management Web service execution part 130B operates corresponding to the thumbnail request command. Then, the image forming apparatus 1000 sends to the terminal 30 the thumbnail data acquired by the document management Web service execution part 130B. For example, the thumbnail data are reduced-size image data of the top pages of documents stored in the image forming apparatus 1000.

At step S513, when the document list of the image forming apparatus 1000 is displayed in thumbnail representation on the display part 13 of the terminal 30, the user determines which apparatus should print out which document by dragging and dropping a thumbnail of a desired document toward a desired apparatus. In this embodiment, the user drags and drops a document stored in the image forming apparatus 1000 toward the image forming apparatus 1200.

At step S514, the terminal 30 sends to the image forming apparatus 1000 a bibliographic information request command to request bibliographic information regarding the selected document.

At step S514-2, the image forming apparatus 1000, in response to receipt of the bibliographic information request command from the terminal 30, uses the document management Web service execution part 130B to acquire the bibliographic information from HDD 1303B and sends the bibliographic information to the terminal 30.

At step S515, the terminal 30, in response to receipt of the bibliographic information from the image forming apparatus 1000, sends to the image forming apparatus 1200 a system information request command to request system information regarding the image forming apparatus 1200.

At step S515-2, the image forming apparatus 1200, in response to receipt of the system information request command from the terminal 30, sends the system information to the terminal 30.

At step S516, the terminal 30, in response to receipt of the system information from the image forming apparatus 1200, examines feasibility of the printing process using a ticket. Then, the terminal 30 sends to the image forming apparatus 1000 an acquirable document type list request command to request a list of document types acquirable from the image forming apparatus 1000.

At step S516-2, the image forming apparatus 1000, in response to receipt of the acquirable document type list request command from the terminal 30, sends the acquirable document type list to the terminal 30.

At step S517, the terminal 30, in response to receipt of the acquirable document type list from the image forming apparatus 1000, maintains the acquirable document type list as a transmitter document type list 302. Furthermore, the terminal 30 sends to the image forming apparatus 1200 a printable document type list request command to request a list of document types printable in the image forming apparatus 1200.

At step S517-2, the image forming apparatus 1200, in response to receipt of the printable document type list request command from the terminal 30, sends the printable document type list to the terminal 30.

At step S518, the terminal 30, in response to receipt of the printable document type list from the image forming apparatus 1200, maintains the printable document type list as a receiver document type list 304. Then, the terminal 30 displays a copying or printing confirmation dialog, as described with respect to the second embodiment, on the display part 13.

When the user chooses OK to start the printing process at step S519, the sequence control part 310 of the terminal 30 uses the document type determination part 320 to determine whether or not there is a document type acquirable from the image forming apparatus 1000 and printable in the image forming apparatus 1200 based on the transmitter document type list 302 and the receiver document type list 304, and determines the best document type at step S520. Based on the determination, if there are a plurality of such document types, the document type determination part 320 determines one of the document types as the best document type. If there is no such a document type, the document type determination part 320 determines a predetermined document type as the best document type.

At step S521, the terminal 30 sends to the image forming apparatus 1000 a ticket request command to request a ticket to use documents stored in the image forming apparatus 1000.

At step S521-2, the image forming apparatus 1000, in response to receipt of the ticket request command from the terminal 30, sends the ticket to the terminal 30.

At step S522, the terminal 30, in response to receipt of the ticket from the image forming apparatus 1000, sends to the image forming apparatus 1200 a printing attribute information request command to request printing attribute information to indicate whether or not the selected document should be double-sided printed or single-sided printed.

At step S522-2, the image forming apparatus 1000, in response to receipt of the printing attribute information request command from the terminal 30, sends the printing attribute information to the terminal 30.

At step S523, the terminal 30, in response to receipt of the printing attribute information from the image forming apparatus 1000, sends to the image forming apparatus 1200 a job creation request command to create a job for the printing process.

At step S523-2, the image forming apparatus 1200, in response to receipt of the job creation request command from the terminal 30, creates the job for the printing process and sends to the terminal 30 a job ID to identify the job.

At step S524, the terminal 30 sends to the image forming apparatus 1200 a printing attribute setting request command to set printing attributes.

At step S524-2, the image forming apparatus 1200, in response to receipt of the printing attribute setting request command from the terminal 30, sets the printing attributes and sends to the terminal 30 a printing setting completion message to indicate that the printing attributes have been set.

At step S525, the terminal 30, in response to receipt of the printing attribute setting completion message from the image forming apparatus 1200, sends to the image forming apparatus 1200 a document printing request command to print the selected document by authority of the ticket acquired at step S521-2.

At step S524, the image forming apparatus 1200, in response to receipt of the document printing request command from the terminal 30, sends to the image forming apparatus 1000 a page image request command to request a page image of the document in the format of the document type designated in the ticket.

At step S526-2, the image forming apparatus 1000, in response to receipt of the page image request command from the image forming apparatus 1200, sends the page image to the image forming apparatus 1200. In the page image request command, for example, a plurality of page images of the selected document may be designated. Alternatively, whenever the image forming apparatus 1200 receives each page image from the image forming apparatus 1000, the image forming apparatus 1200 may iteratively send to the image forming apparatus 1000 a page image request command for the next page image.

At step S527, after the image forming apparatus 1200 receives all page images of the selected document from the image forming apparatus 1000, the printing Web service execution part 140 uses the plotter 1201 to print out the page images.

At step S527-2, after completion of the printing process, the image forming apparatus 1200 sends to the terminal 30 a printing request completion message to indicate that the printing request has been fulfilled.

At step S528, the terminal 30, in response to receipt of the printing completion message from the image forming apparatus 1200, displays on the display part 13 a printing completion dialog to indicated that the printing process has been terminated.

In the terminal 30, which serves as an operator apparatus, the SOAP command creation part 210C of the client part 200C sets request commands sent to the image forming apparatuses 1000 and 1200 as SOAP commands incorporated in messages of HTTP requests (S511, S512, S514, S515, S516, S517, S521, S522, S523, S524 and S525). The SOAP interpretation part 220C of the client part 200C extracts HTTP responses for process results corresponding to the HTTP requests.

In the image forming apparatus 1000, which serves as the document transmitter apparatus, the SOAP command analysis part 110B of the server part 100B analyzes received request commands as SOAP commands, and the document management Web service execution part 130B operates corresponding to the SOAP commands. The SOAP response creation part 120B of the server part 100 provides the terminal 30 or the image forming apparatus 1200 with process results of the document management Web service execution part 130B as Web services (S511-2, S512-2, S514-2, S516-2, S521-2, S522-2 and S524-2).

On the other hand, in the image forming apparatus 1200, which serves as the document receiver apparatus, the SOAP command creation part 210 of the client part 200 sets request commands sent to the image forming apparatus 1000 as SOAP commands incorporated in messages of HTTP requests (S526). The SOAP response interpretation part 220 of the client part 200 extracts HTTP responses for process results corresponding to the HTTP requests. Also, the SOAP command analysis part 110 of the server part 100 analyzes received request commands as SOAP commands, and the SOAP response creation part 120 of the server part 100 provides process results corresponding to the SOAP command as Web services to the terminal 30 (S515-2, S517-2, S523-2, S524-2, S525-2 and S527-2).

According to the above-mentioned PULL type document copying sequence, when a user of the terminal 30 having the document process control part 300 selects a document stored in the image forming apparatus 1000, the document stored in the image forming apparatus 1000 can be printed in the image forming apparatus 1200 by means of the plotter 1201.

In the fifth embodiment, the screens shown in FIG. 16 through FIG. 19 according to the second embodiment are provided to a user of the terminal 30. Thus, the description thereof is omitted.

In the fourth and fifth embodiment of the present invention, when the terminal 30 having the document process control part 300 requests a selected document stored in the image forming apparatus 1000 in the format of a document type that is determined based on document types processable to the image forming apparatuses 1000 and 1200, the corresponding image processing process can be performed in the image forming apparatus 1200 in cooperation with the apparatuses connected to each other via the network. For example, if the size of a document that the image forming apparatus 1000, which serves as the document transmitter apparatus, accommodates is greater than the maximal size of documents that the image forming apparatus 1200, which serves as the document receiver apparatus, can store, the document process control part 300 of the terminal 30 can use an image scaling function thereof to send a reduced-size page image to the image forming apparatus 1200 based on determination of the document type determination part 320.

Also, since the document process control part 300 flexibly controls cooperation with the image forming apparatuses 1000 and 1200 depending on types of processes such as a copying process and a printing process, it is possible to perform various types of processes through cooperation with apparatuses connected via a network.

In the fourth and fifth embodiments, the copying process and the printing process that are performed through cooperation with apparatuses connected via a network are described. However, the present invention is not limited to these processes. The present invention is applicable to file management, scanner control and so on. Furthermore, the present invention is applicable to process information regarding the image forming apparatuses 1000 and 1200.

Also, the image forming apparatuses 1000 and 1200 and the terminal 30 according to the embodiments are not limited to communication via a fixed line LAN (Local Area Network). In other words, although physical layers differs in a network system, such as a wireless LAN and Bluetooth, SOAP messages can be exchanged in such a network system in accordance with TCP/IP (Transmission Control Protocol/Internet Protocol). Thus, it is possible to implement various processes according to the embodiments as Web services in accordance with http and SOAP. Furthermore, communicated contents are allowed to be extended in a parallel system, such as a centronics and SCSI. Thus, as long as there is agreement between devices that will communicate each other, it is possible to implement message exchange in accordance with SOAP.

The present invention is not limited to the specifically disclosed embodiments, and variations and modifications may be made without departing from the scope of the present invention.

What is claimed is:

1. An image forming apparatus configured to serve as a document destination apparatus for receiving and printing first image data or a first document stored in an other image forming apparatus, and the image forming apparatus further configured to serve as a document source apparatus for transmitting second image data or a second document stored therein to the other image forming apparatus, the image forming apparatus comprising:

a communication unit configured to communicate with the other image forming apparatus connected via a network;

a document storage unit configured to store the second image data or the second document;

a printing unit configured to print the first image data or the first document received from the other image forming apparatus via the communication unit;

a document management unit configured to, when the image forming apparatus is serving as the document destination apparatus, transmit a print request to the other image forming apparatus, receive the first image data or the first document stored in the other image forming apparatus, and to print the received first image data or the first document by the printing unit, and the document management unit being further configured to, when the image forming apparatus is serving as the document source apparatus, transmit the second image data or the second document in response to receipt of a print request from the other image forming apparatus, for printing the second image data or the second document stored in the image forming apparatus, by a printing unit of the other image forming apparatus; and wherein the document management unit is further configured to, when the image forming apparatus is serving as the document source apparatus, transmit to the image forming apparatus a list of the second image data or the second document stored in the document storage unit in response to a list request from the other image forming apparatus, and to transmit to the other image forming apparatus thumbnail data of the second image data or the second document in response to a thumbnail request from the other image forming apparatus.

2. The image forming apparatus according to claim 1, wherein the network is one of a wired LAN and a wireless LAN.

3. The image forming apparatus according to claim 1, wherein the printing unit of the image forming apparatus is configured to print out the first image data or the first document onto at least one sheet, and the printing unit of the other image forming apparatus is configured to print out the second image data or the second document onto at least one sheet.

4. The image forming apparatus according to claim 1, wherein the document management unit is further configured to, when the image forming apparatus is serving as the document destination apparatus, transmit to the other image forming apparatus a request for a list of the first image data or the first document stored in the other image forming apparatus and to receive the list of the first image data or the first document from the other image forming apparatus.

5. The image forming apparatus according to claim 4, wherein the document management unit is further configured to, when the image forming apparatus is serving as the document destination apparatus, transmit to the other image forming apparatus a request for thumbnail data of the first image data or the first document and to receive the thumbnail data of the first image data or the first document from the other image forming apparatus.

6. The image forming apparatus according to claim 5, further comprising:
- a display unit configured to display the received list of the first image data or the first document stored in the other image forming apparatus and the received thumbnail data of the first image data or the first document stored in the other image forming apparatus.

7. The image forming apparatus according to claim 6, wherein the display unit includes a user interface for a user to select a desired object from the first image data, first document, second image data, and second document, and to indicate whether the desired object is to be print out by the printing unit of the image forming apparatus or the printing unit of the other image forming apparatus.

8. An image forming method, implemented on an image forming apparatus configured to serve as a document destination apparatus for receiving and printing first image data or a first document stored in an other image forming apparatus, and the image forming apparatus being further configured to serve as a document source apparatus for transmitting second image data or a second document stored therein to the other image forming apparatus, the method comprising:

- communicating, via a communication unit, with the other image forming apparatus connected via a network;
- storing, at a document storage unit, the second image data or the second document;
- transmitting, when the image forming apparatus is serving as the document destination apparatus, a print request to the other image forming apparatus for receiving the first image data or the first document stored in the other image forming apparatus;
- printing, at a printing unit, the first image data or the first document received from the other image forming apparatus via the communication unit;
- transmitting, when the image forming apparatus is serving as the document source apparatus, the second image data or the second document in response to receipt of a print request from the other image forming apparatus for printing the second image data or the second document stored in the image forming apparatus by a printing unit of the other image forming apparatus; and
- wherein when the image forming apparatus is serving as the document source apparatus, transmitting to the other image forming apparatus a list of the second image data or the second document stored in the document storage unit in response to a list request from the other image forming apparatus, and transmitting to the other image forming apparatus thumbnail data of the second image data or the second document in response to a thumbnail request from the other image forming apparatus.

\* \* \* \* \*